(12) United States Patent
Hunter et al.

(10) Patent No.: US 7,588,151 B2
(45) Date of Patent: *Sep. 15, 2009

(54) AUTOMATED HIGH-THROUGHPUT SEED SAMPLE HANDLING SYSTEM AND METHOD

(75) Inventors: James L. Hunter, Ankeny, IA (US); Andrew S. Nickerson, Des Moines, IA (US); Lyndon J. Schroeder, Urbandale, IA (US); Ronald D. Rushing, Windsor Heights, IA (US); C. Fred Hood, Naples, FL (US)

(73) Assignee: Pioneer Hi-Bred International, Inc., Johnston, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/860,068

(22) Filed: Sep. 24, 2007

(65) Prior Publication Data

US 2008/0035532 A1    Feb. 14, 2008

Related U.S. Application Data

(62) Division of application No. 10/731,208, filed on Dec. 9, 2003, now Pat. No. 7,290,665, which is a division of application No. 09/776,403, filed on Feb. 2, 2001, now Pat. No. 6,706,989.

(51) Int. Cl.
*B07C 5/02* (2006.01)

(52) U.S. Cl. .................. 209/3.3; 209/577; 209/276; 209/287; 209/938; 209/939

(58) Field of Classification Search ............. 209/3.3, 209/577, 576, 938, 939, 587, 580, 581, 384; 111/100; 47/58.1 SE, 58.1 IS
See application file for complete search history.

(56) References Cited

U.S. PATENT DOCUMENTS

| | | | |
|---|---|---|---|
| 1,057,877 A | 4/1913 | Peeples | |
| 3,682,303 A | 8/1972 | Feterl | |
| 4,288,320 A * | 9/1981 | Wilson | 209/382 |
| 4,602,716 A | 7/1986 | Barla-Szabo et al. | |
| 4,697,709 A | 10/1987 | Codding | |
| 5,135,114 A | 8/1992 | Satake et al. | |
| 5,607,061 A | 3/1997 | Felden | |
| 5,669,511 A | 9/1997 | Satake et al. | |

(Continued)

*Primary Examiner*—Patrick H Mackey
*Assistant Examiner*—Mark Hageman
(74) *Attorney, Agent, or Firm*—McKee, Voorhees & Sease, P.L.C.

(57) ABSTRACT

A method and apparatus for processing seed or seed samples includes an autonomous sorter which sorts seed by pre-programmed criteria. Optional features can include a counter to autonomously ensure the correct number of seeds to a seed package, a cleaning device, a sheller, and a label applicator. A conveyance path, controlled automatically, can move the seed to appropriate and desired stations during the processing while maintaining the sample segregating from other samples. Validation of the sample can be pre-required and information about the sample can be derived and stored for further use.

17 Claims, 76 Drawing Sheets

U.S. PATENT DOCUMENTS

| | | |
|---|---|---|
| 5,733,592 A | 3/1998 | Wettstein et al. |
| 5,751,421 A | 5/1998 | Wright |
| 5,813,542 A | 9/1998 | Cohn |
| 5,893,218 A | 4/1999 | Hunter |
| 5,957,304 A | 9/1999 | Dawson |
| 5,979,252 A | 11/1999 | Precetti |
| 5,986,230 A | 11/1999 | Novak et al. |
| 5,991,025 A | 11/1999 | Wright |
| 6,085,443 A | 7/2000 | Hunter |
| 6,150,158 A | 11/2000 | Bhide et al. |
| 6,230,419 B1 | 5/2001 | Hunter |
| 6,248,968 B1 | 6/2001 | Suzuki et al. |
| 6,582,159 B2 | 6/2003 | McKinnis |
| 6,705,827 B2 | 3/2004 | Keller et al. |
| 6,706,989 B2 | 3/2004 | Hunter et al. |

* cited by examiner

INFORMATION PROCESS FLOW

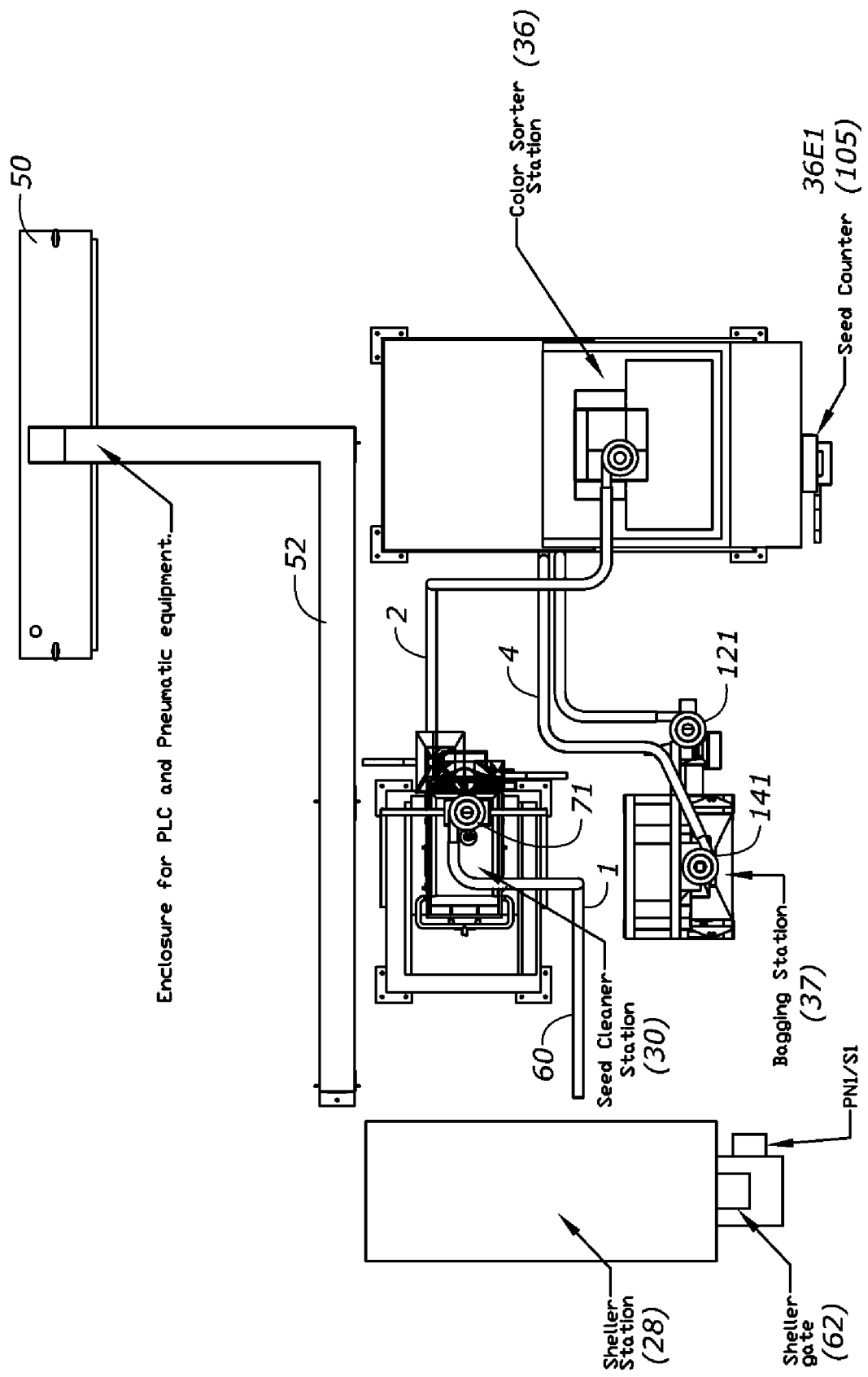

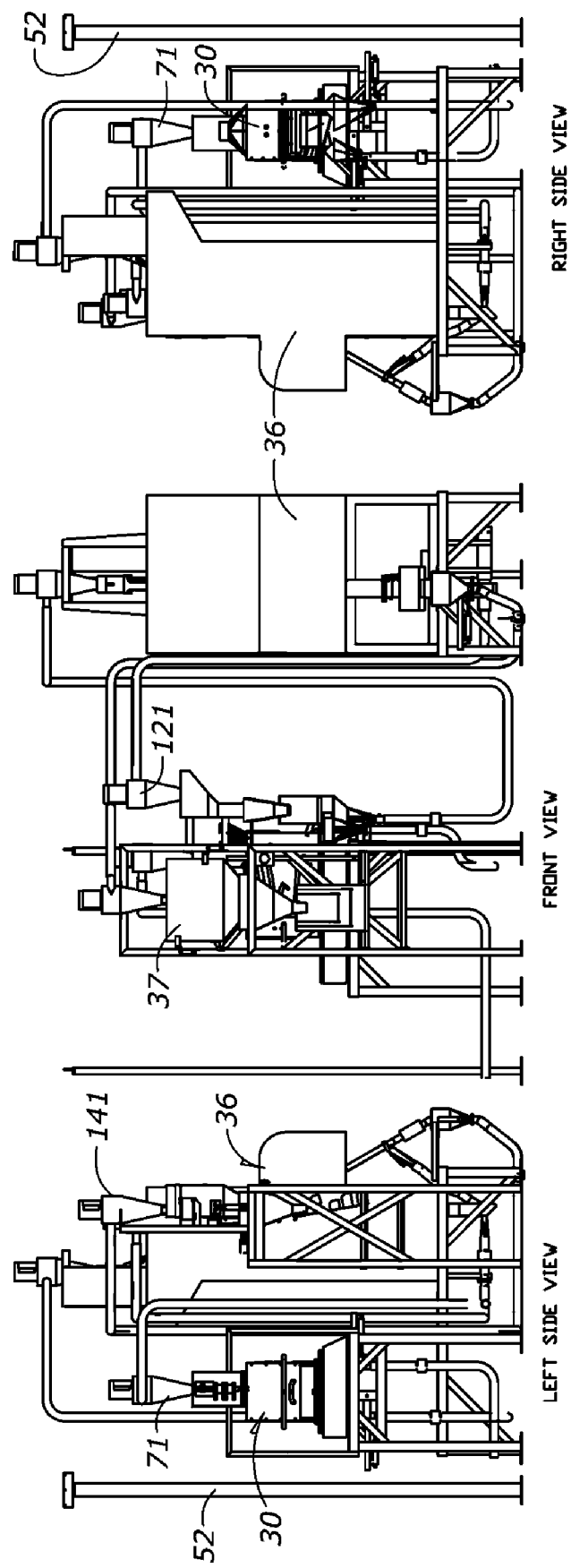

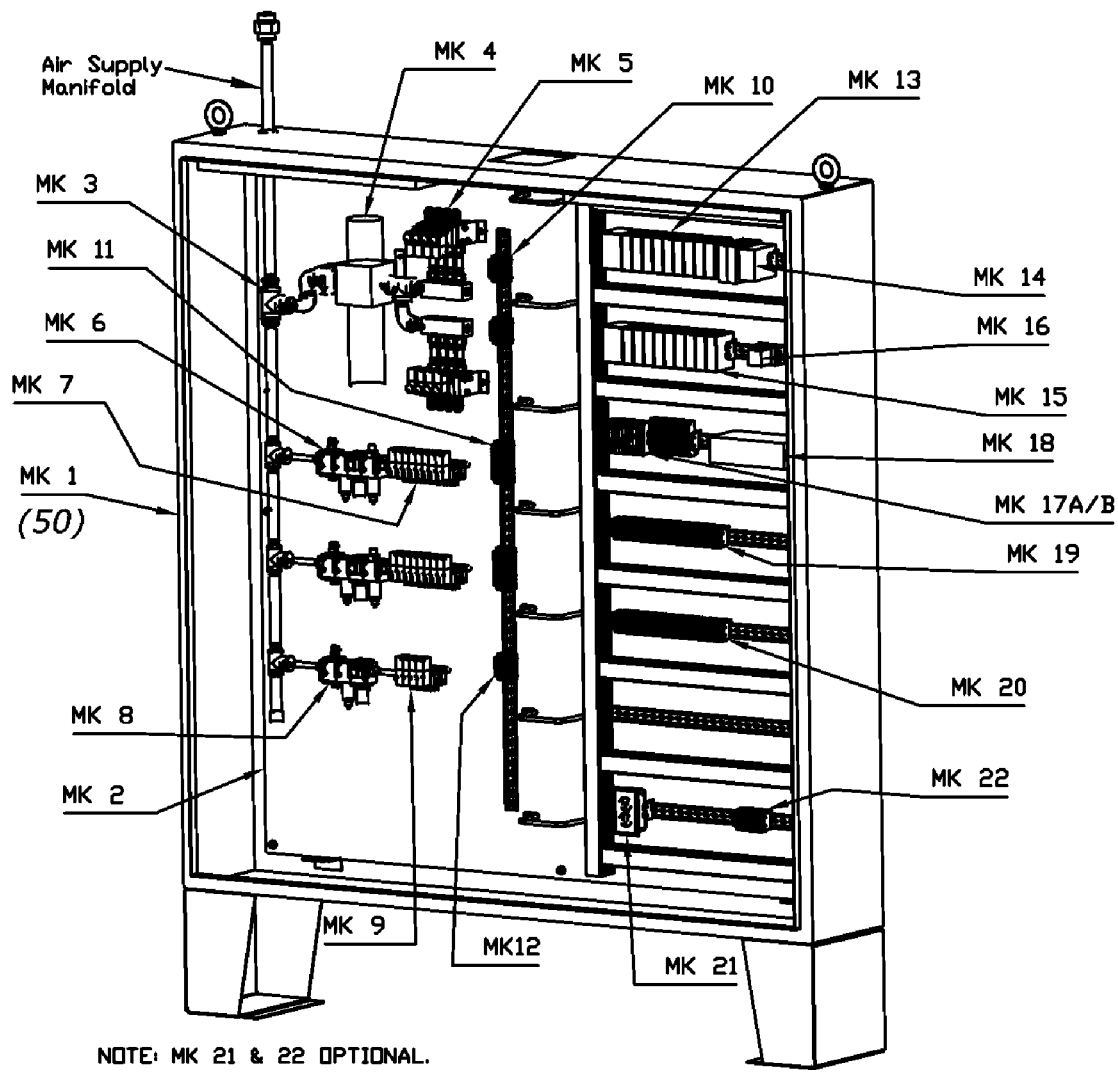

| 23 | 012890 | CONDENSATE DRAIN SYSTEM |
|---|---|---|
| 22 | 012892 | COUNTER WIRING BLOCK |
| 21 | 012891 | SERVICE OUTLET |
| 20 | 012891 | WIRING BLOCK SENSOR INPUT TERMINAL BLOCK |
| 19 | 012891 | WIRING BLOCK OUTPUT TERMINAL |
| 18 | 012891 | POWER SUPPLY PS1 |
| 17 | 012892 | (A/B) FUSE BLOCKS |
| 16 | 012891 | RELAY & FUSE SHAKER RELAY K1 |
| 15 | 012892 | I/O BASE 2 |
| 14 | 012892 | ANALOG SIGNAL MODULES PS2 ANALOG INPUT |
| 13 | 012891 | I/O BASE 1 |
| 12 | 012891 | AIR JET VALVE ASSEMBLY WIRING BLOCK |
| 11 | 012891 | PNEUMATIC CYLINDER VALVE ASSEMBLY WIRING BLOCK |
| 10 | 012891 | AIR TRANSPORT VALVE ASSEMBLY WIRING BLOCK |
| 9 | 012890 | AIR JET ASSEMBLY |
| 8 | 012890 | AIR JET REGULATOR/FILTER |
| 7 | 012890 | PNEUMATIC CYLINDER VALVE ASSEMBLY |
| 6 | 012889 | PNEUMATIC CYLINDER REGULATOR/FILTER/OILER |
| 5 | 012889 | AIR TRANSPORT VALVE ASSEMBLY |
| 4 | 012889 | AIR TRANSPORT REGULATOR |
| 3 | 012889 | AIR DISTRIBUTION MANIFOLD |
| 2 | 012888 | PANEL |
| 1 | 012888 | ENCLOSURE |
| MK | PID# | DESCRIPTION |

Fig. 8

RUNTIME OPERATIONAL HIERARCHY

SYSTEM SETTINGS

| STATION OPERATION TIMES | | AIR TRANSPORT TIMES | |
|---|---|---|---|
| SHELLING | 5.0 | SHELLING | 8.0 |
| SIZING | 4.0 | SIZING CLEAN | 10.0 |
| SORTING | 7.5 | SIZING DIRTY | 3.0 |
| SHAKER START DELAY | 20.0 | SORTING CLEAN | 9.0 |
| | | SORTING DIRTY | 3.0 |
| BUCKET DISCHARGE TIMES | | BAGGING DIRTY | 3.0 |
| SIZING FEED BKT STAGE 1 | 2.0 | | |
| SIZING FEED BKT STAGE 2 | 0.5 | | |
| BAGGING CLEAN | 4.0 | CONTINUOUS MODE | |
| BAGGING DIRTY | 3.0 | | |

ISO – 7 OZ.   CURRENT PRODUCT SELECTED   OK

| ISO SHELLER | | | | |
|---|---|---|---|---|
| THINK & DO CONNECTION<br>OBJECT NAME<br>RUN TIME ID | | RUNTIME CONTROL<br>⊙ CE RUNTIME<br>⊙ DESKTOP TUNTIME | | |
| TAG NAMES (CASE SENSITIVE) | | | | |
| SHELLER ID<br>STRSHELLER | BAGGING DONE FLAG<br>FLGREAYTOBAG | EMPTY BAG ID<br>STREMPTYBAG | BAG WEIGHT<br>FPWEIGHTVALUE | |
| BAG MOISTURE<br>FPMOISTUREVALUE | SAVE BAG FLAG<br>FLGSAVEBAG | EMPTY DONE FLAG<br>FLGEMPTYBAGDONE | PRESIZING ID<br>STRSIZERTOP | |
| SIZING ID<br>STRSIZER | CONNECTION LINK FLAG<br>FLAGWATCHDOG | SCANNED BAG ID<br>STRSCANNED | SCANNED BAG STATE<br>NUMSTAGEDSAMPLESTATUS | |
| SORTING ID<br>STRSORTER | BAGGING ID<br>STRBAGGER | BAG COUNT<br>NUMFINALSEEDCOUNT | PRODUCT NAMES<br>STRPRODUCTNAMES | |
| PRODUCT MODES<br>FLGPRODUCTMODES | CURRENT PRODUCT<br>CNTRPRODUCTINDEX | TARGET COUNT<br>NUMTARGETCOUNT | PRODUCT REFRESH FLAG<br>FLGPRODUCTCHANGE | |
| RUN | BOXES | PRODUCT SETUP | HW SETUP | |

*Fig. 21*

LABEL SETUP

| LABEL FIELD | DATABASE FIELD |
|---|---|
| BARCODE | BARCODE SEARCH |
| LOCID | LOC |
| GMO | GMO |
| EXPID | EXPID |
| ENTRY | ENTRY |
| RANGE | RANGE |
| PLOT | NONE |
| BOXID | BOXID |

14

[ SUGGEST ]   [ OK ]   [ CANCEL ]

*Fig. 23A*

| PRINT | FULL | BOX ID | BAG COUNT | SHIPPED | RANGE |
|---|---|---|---|---|---|
| ☒ | ☐ | AG #1 | | | |
| ☒ | ☐ | CL #1 | | | |
| ☒ | ☐ | GC #1 | | | |
| ☒ | ☐ | UNKNOWN #1 | | | |
| ☒ | ☐ | WW #1 | | | |

| SELECT ALL | NOT SHIPPED | PRINT MANIFEST | PRINT | EXIT |
|---|---|---|---|---|

| RUN | TODAY | PRODUCT SETUP | HARDWARE SETUP |
|---|---|---|---|

ISO SHELLER

*Fig. 24*

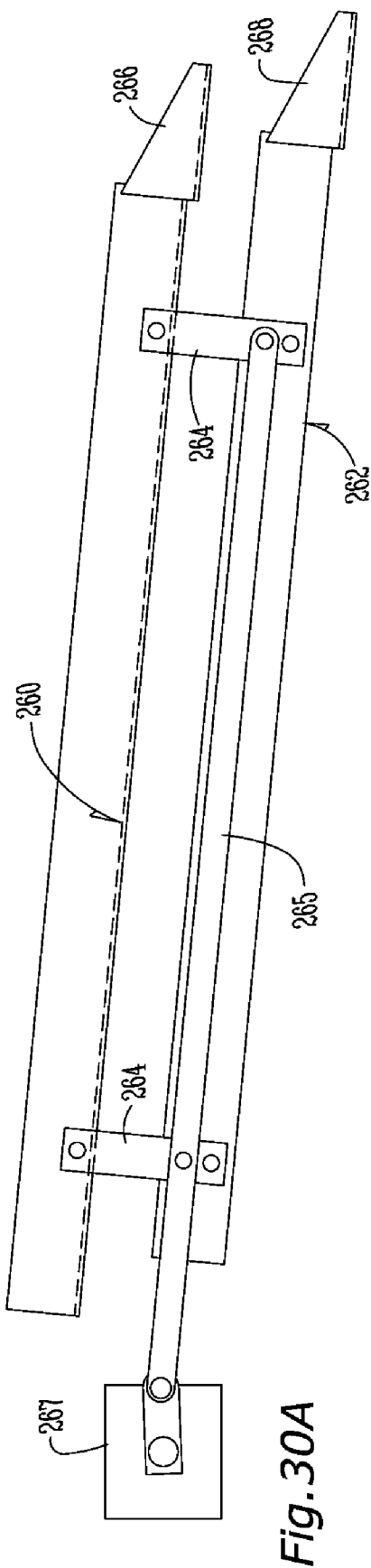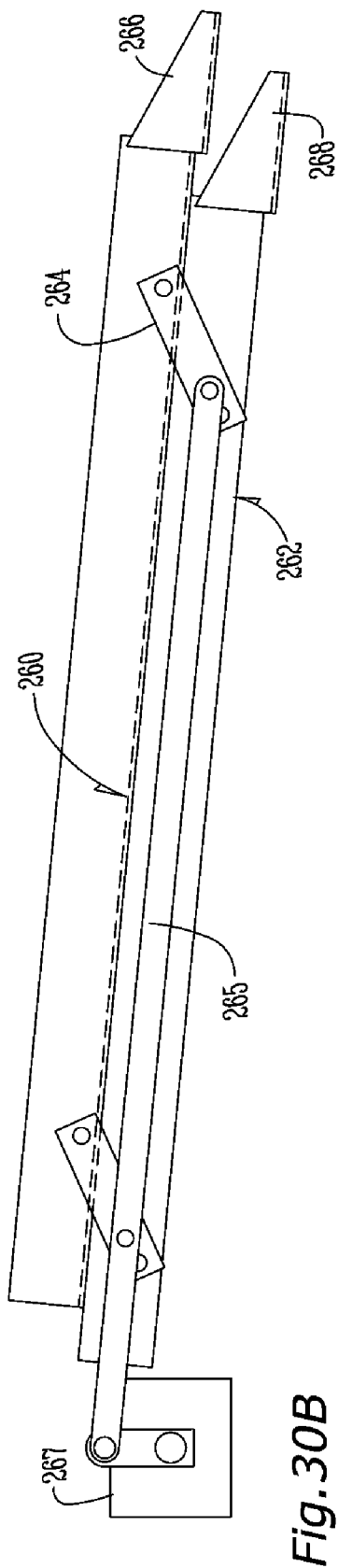
Fig. 30A
Fig. 30B

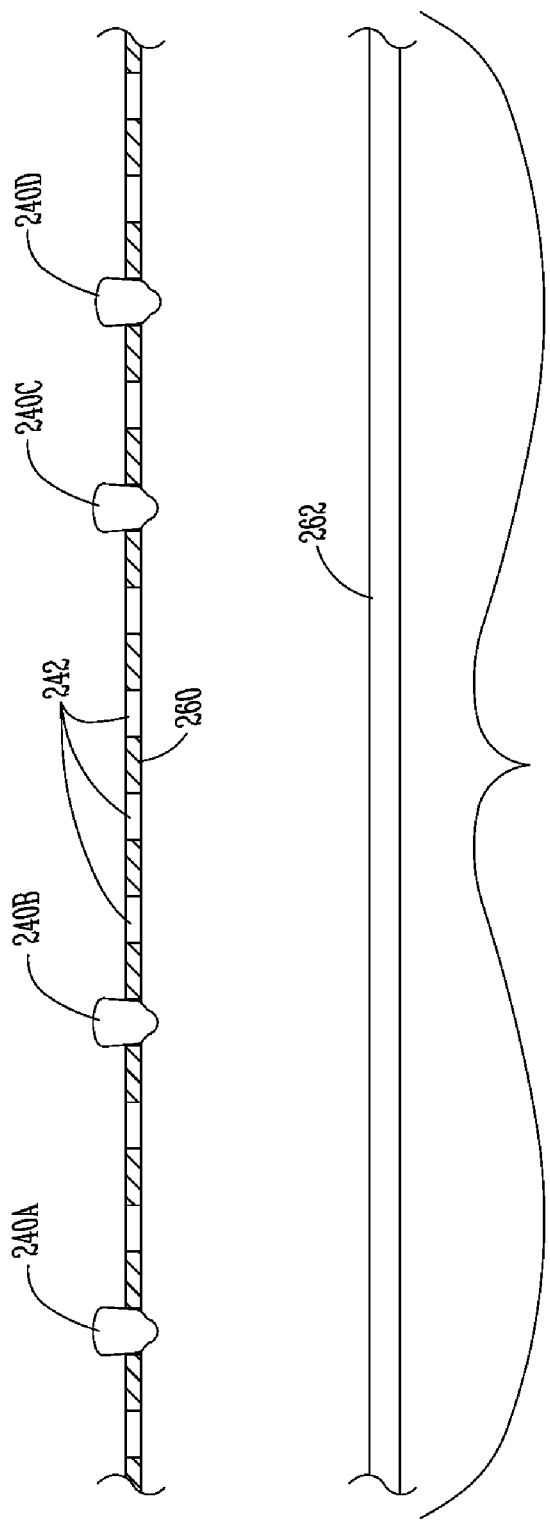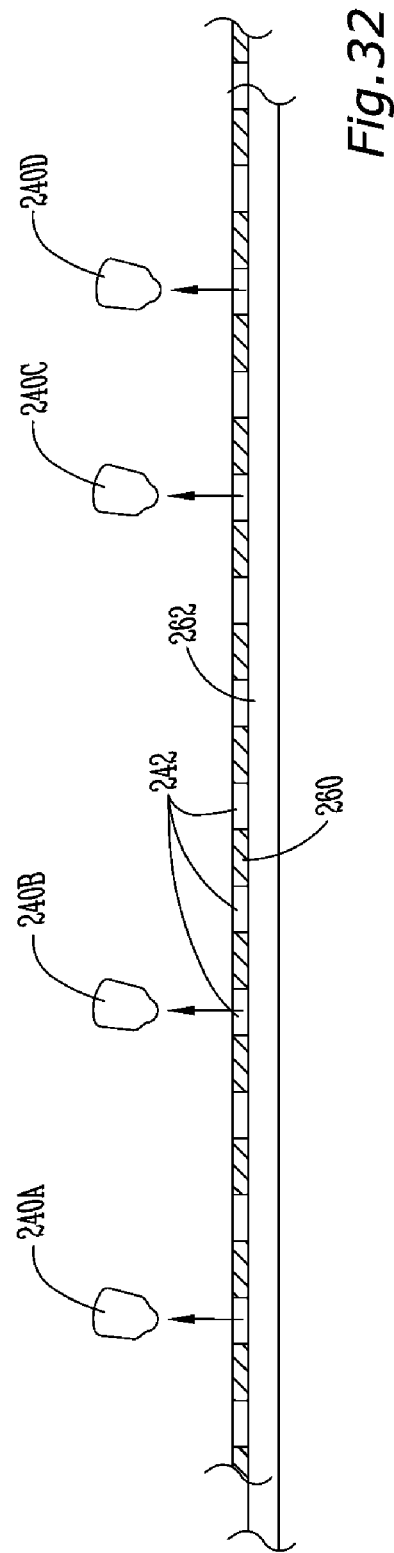

AUTOMATED HIGH-THROUGHPUT SEED SAMPLE HANDLING SYSTEM AND METHOD

CROSS-REFERENCE TO RELATED APPLICATIONS

This application is a Divisional Application of U.S. Ser. No. 10/731,208 filed Dec. 9, 2003, which is a Divisional Application of U.S. Ser. No. 09/776,403 filed Feb. 2, 2001, now U.S. Pat. No. 6,706,989, herein incorporated by reference in its entirety.

I. BACKGROUND OF THE INVENTION

A. Field of the Invention

The present invention relates to handling seed, and in particular, to automatic processing of previously harvested seed samples used in plant breeding programs and applications.

B. Problems in the Art

As is well known in the art, corn breeding is an arduous science. The harvesting, handling, and ultimate processing of corn seed samples into packages is an exacting and labor intensive process. Strict standards exist with regard to the same. One important part is the harvesting and handling of breeding seeds. Not only is it crucial to keep track of such things as particular characteristics of the seeds (e.g. genotype, inbred identification, where they were grown); each seed and each seed sample must be carefully handled and evaluated, so that there is a high probability the selected seeds will germinate and so that there is no contamination of the set of seeds comprising the sample of seeds. Only those that meet certain criteria (e.g. undamaged, not diseased, correct characteristics) are used for further breeding activities.

For example, breeding, product development, and product characterization/commercialization processes require the production, evaluation, and use of many samples of corn (*Zea Mays*). Each sample consists of from one to many ears of corn. Typically, corn plants are grown to maturity in nurseries, and then conditioned and processed in the following separate steps: artificially dried in seed dryers, shelled, the seed cleaned and sized, and then packaged either for replanting or shipment to other locations for yield testing or evaluation for additional breeding crosses. This process must be conducted so that there is no intermingling or cross-contamination of seed samples, and must include a step for removing such things as inert matter, excessively small or large seed, and damaged or diseased seed. This process, from shelling through packaging, is currently substantially manual in nature, and processes samples at the rate of 15-20 samples/person-hour. Each of the steps is usually conducted separately, with non-integrated devices or machinery.

For example, seed samples are conventionally processed as follows. Corn ears are harvested in the field and then placed in plastic mesh bags having some identifying tag. These bags are then dried in dryer bins. When dry, they are manually unloaded and run through a sheller. The shelled seed is then cleaned using any of a number of different methods ranging from cylindrical screens made out of hardware cloth, to flat oscillating screens, or plastic buckets with screen bottoms.

All of these approaches seek to remove small seed and debris. The semi-finished seed is then manually inspected and any damaged or diseased kernels are removed. The seed is then packaged and shipped to other nurseries or counted out into small envelopes in preparation for planting.

All of the seed transfers between pieces of equipment occur by hand, the cleaning operation is performed manually, and the transfer to a package occurs manually. The current manual system requires about 8 people and 8 hours to shell 1000 samples, each containing 8 to 10 ears. If a nursery has to process 4000 samples per day, it will need either 2 shellers operating for two 8 hour shifts with 16 people per shift, or 4 shellers and 32 people to staff the process for one 8 hour shift. It is a significant management challenge to hire, train, and manage 32 part time employees and to make sure that no errors or mistakes occur because of fatigue, operator error, or boredom.

It can therefore be seen that there is a significant need in the art for an improvement in such processing of seed corn. Similar methods are used to process other types of seed samples. It is therefore a principal object of the present invention to provide a seed conditioning process and system which improves over the state of the art. Other objects, features and advantages of the present invention include a conditioning process and system for seed samples which:

(a) provides significant improvement in the time needed to process seeds;
(b) maintains or exceeds quality of current processing methods;
(c) reduces labor costs;
(d) reduces errors or mistakes;
(e) can be substantially or completely automated;
(f) is flexible, can be varied according to need, and allows integration of a plurality of seed processing or conditioning functions;
(g) provides good discrimination between desirable and undesirable seeds;
(h) allows for accurate tracking and identification during and after processing of the seeds;
(i) is economical and efficient; and
(j) is durable;
(k) allows non-destructive, careful handling of seeds and seed samples;
(l) allows communication between those that need to use seed samples and the processing of the samples to assist in the efficiency and intelligence of a wider system involving use of the seed samples;
(m) can include automatic notification or communication of intelligence about the processing and the seed samples to those wanting or needing to know such information;
(n) allows for automated or machine assisted decisions to assist in efficiency and accuracy of the seed sample processing.
(o) Is integratable with a number of functions or processes to reduce labor, expense, time and errors in processing seed and seed samples.

These and other objects, features, and advantages of invention will become more apparent with reference to the accompanying specification and claims.

II. SUMMARY OF THE INVENTION

A seed or seed sample handling process and system includes automated handling of previously harvested seeds, by assigning or validating an identifier to a set of seeds, automatically performing one or more operations on the set of seed, and accumulating an end product and storing information about the end product correlated to the identifier. Optionally, the end product can be selected seeds of the set of seeds meeting certain pre-defined criteria. A possible feature of the invention includes validating the identity of a harvested seed sample, tracking the sample through a seed conditioning process, and ensuring its purity and identity as it is packaged. A still further possible feature of the invention includes deriving information about the seed sample during the conditioning process which can be correlated to the sample. As an example, a discrimination device or method can be used to analyze the seeds and discriminate between them or derive a characteristic of the seed, such as moisture. Optionally, the deriving information can be added to a pre-existing knowledge base about the seed from which the sample is taken and conditioned.

The apparatus, system and method can be substantially automated and can condition one batch at a time from start to finish, or condition multiple batches serially. Still further automated functions can be added. The conditioning system and the derived information can be used in a substantially automated system of conditioning seed samples and administrating an inventory of a plurality of seed samples; validating requests for certain seed samples, confirming and maintaining purity and identification of requested samples, and packaging and preparing requested samples for shipment to designated recipients.

III. BRIEF DESCRIPTION OF THE DRAWINGS

FIG. 1 is a diagrammatic view of a system according to a preferred embodiment of the invention.

FIGS. 2A-C is a flow chart of a method according to a preferred embodiment of the invention.

FIG. 7A is a top plan view of FIG. 6.

FIG. 7B is a right side plan view of FIG. 7A.

FIG. 7C is front plan view of FIG. 7A.

FIG. 7D is a left side plan view of FIG. 7A.

FIG. 8 is perspective view of an embodiment of a control enclosure cabinet of FIG. 4 and certain internal components.

Figure 9A:
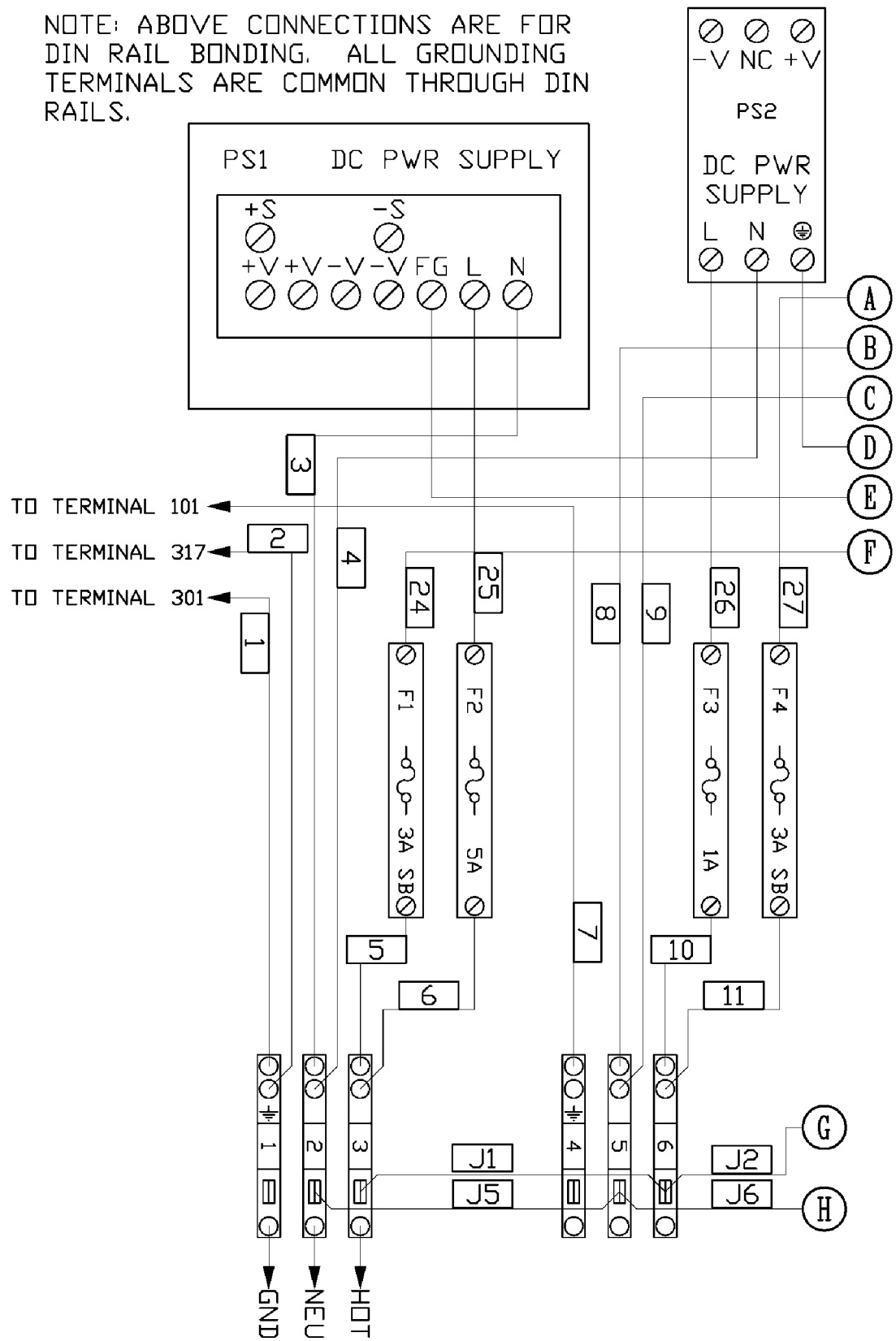
Figure 9B:
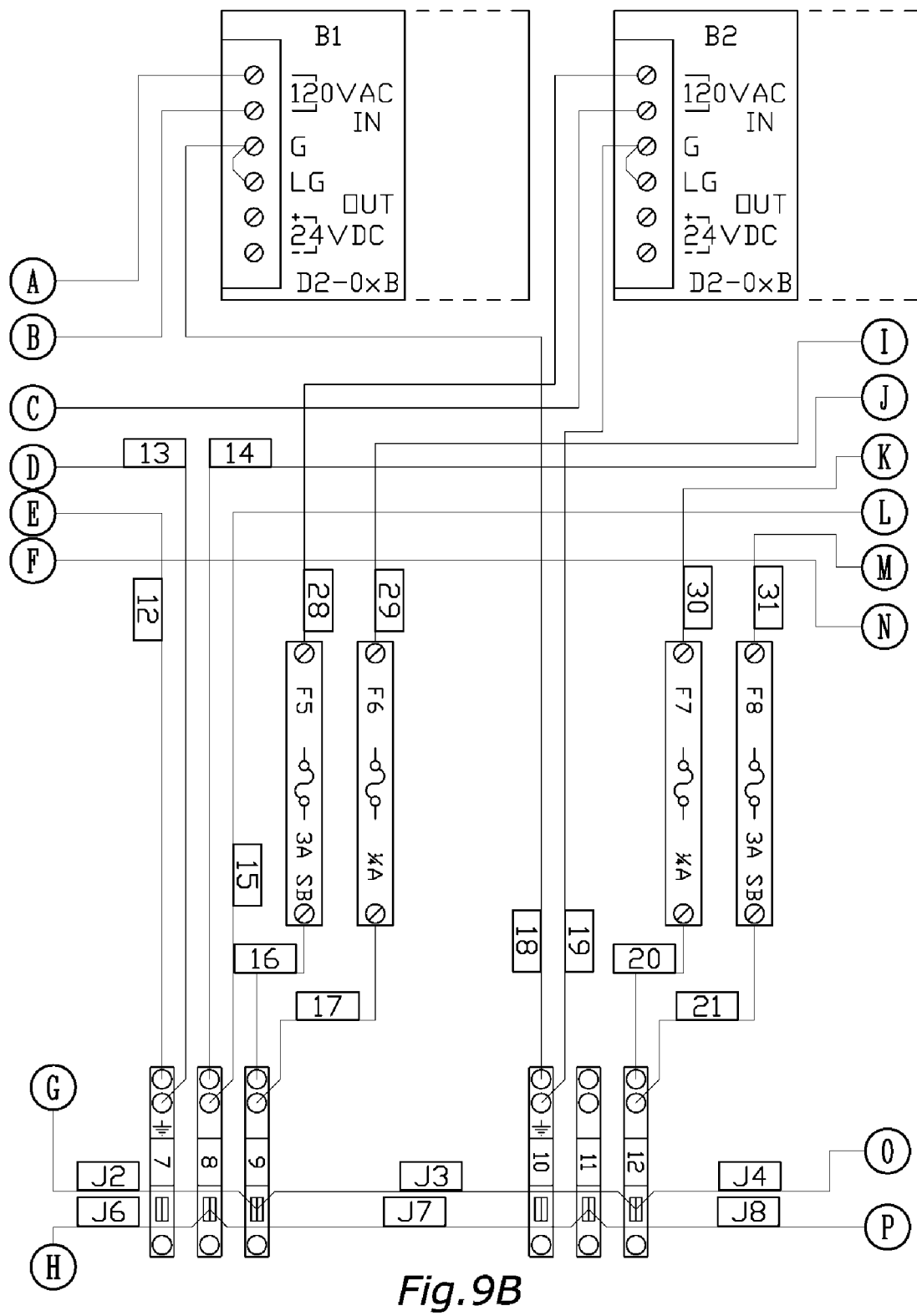
Figure 9C:
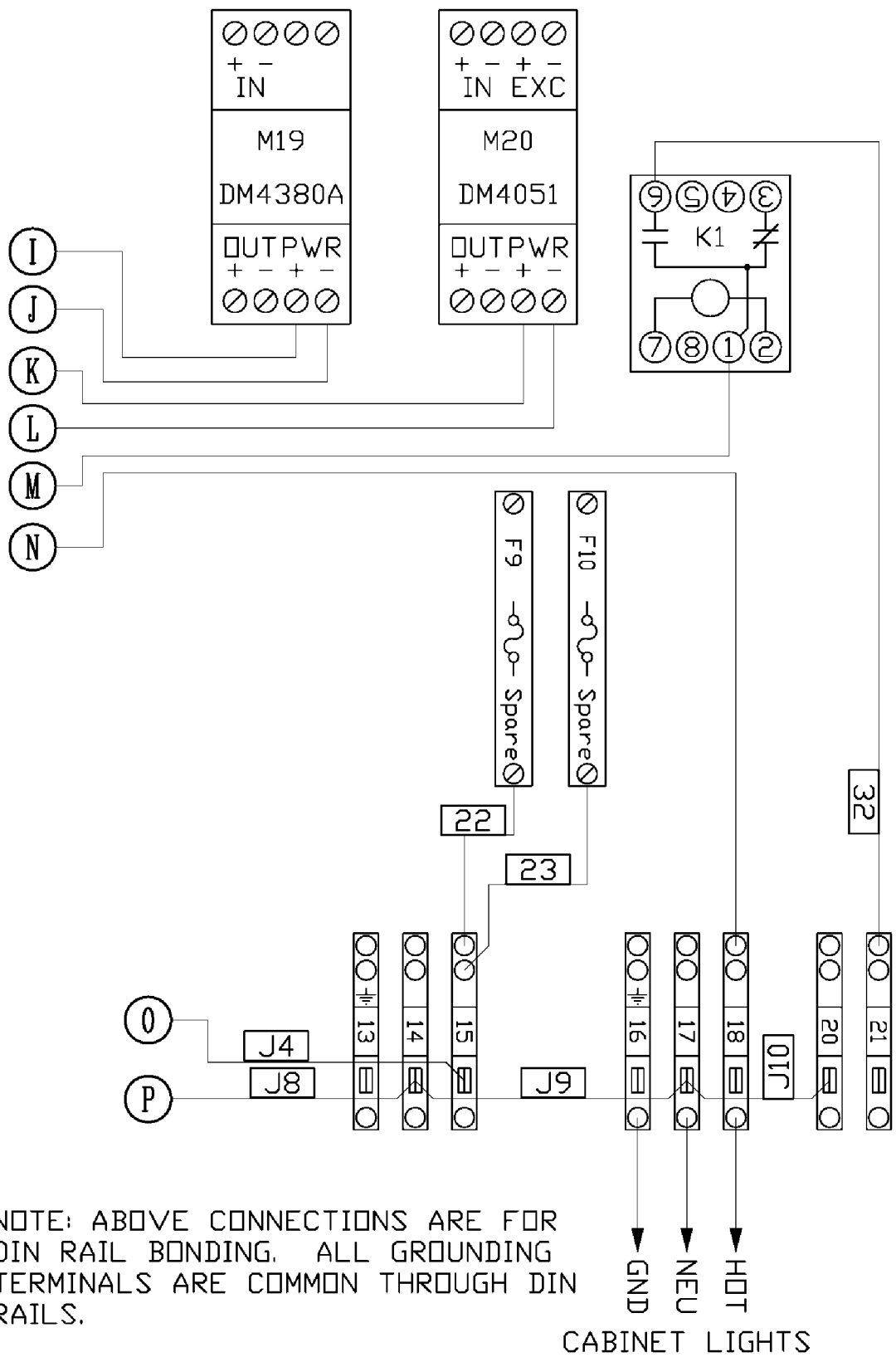

FIG. 9, in its subparts A-C, is an electrical schematic of AC power distribution for the control circuitry of FIG. 8.

Figure 10A:
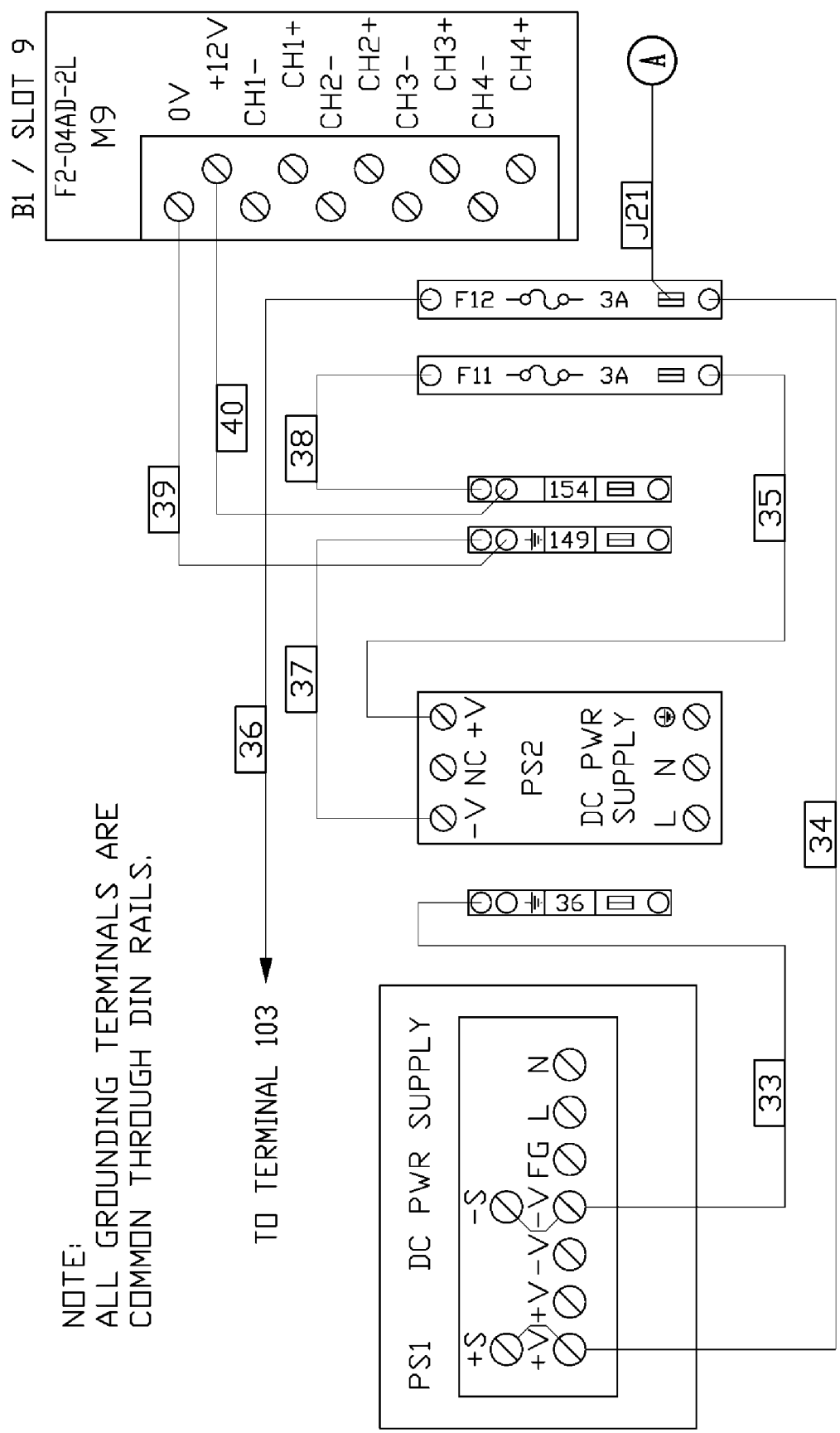
Figure 10B:
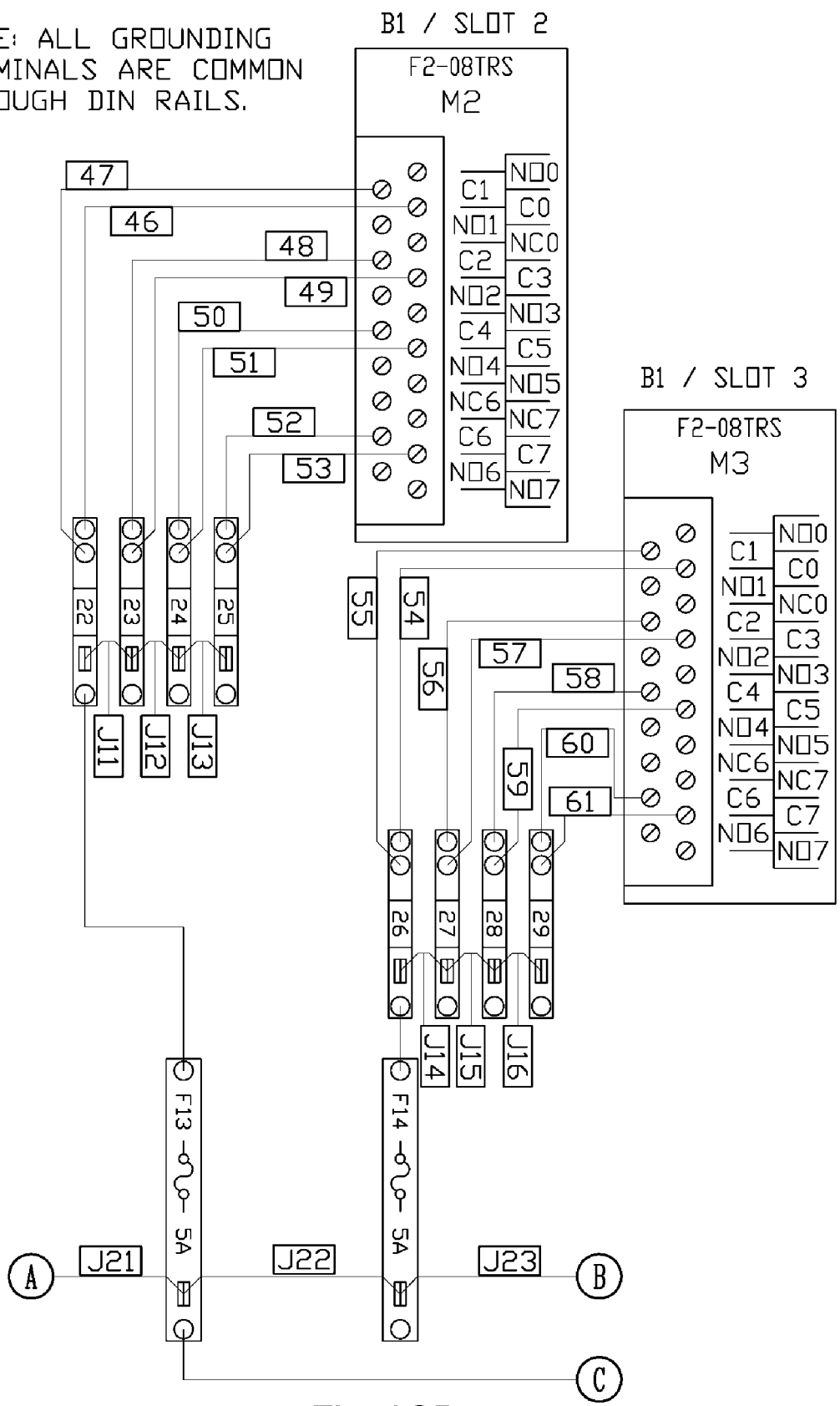
Figure 10C:
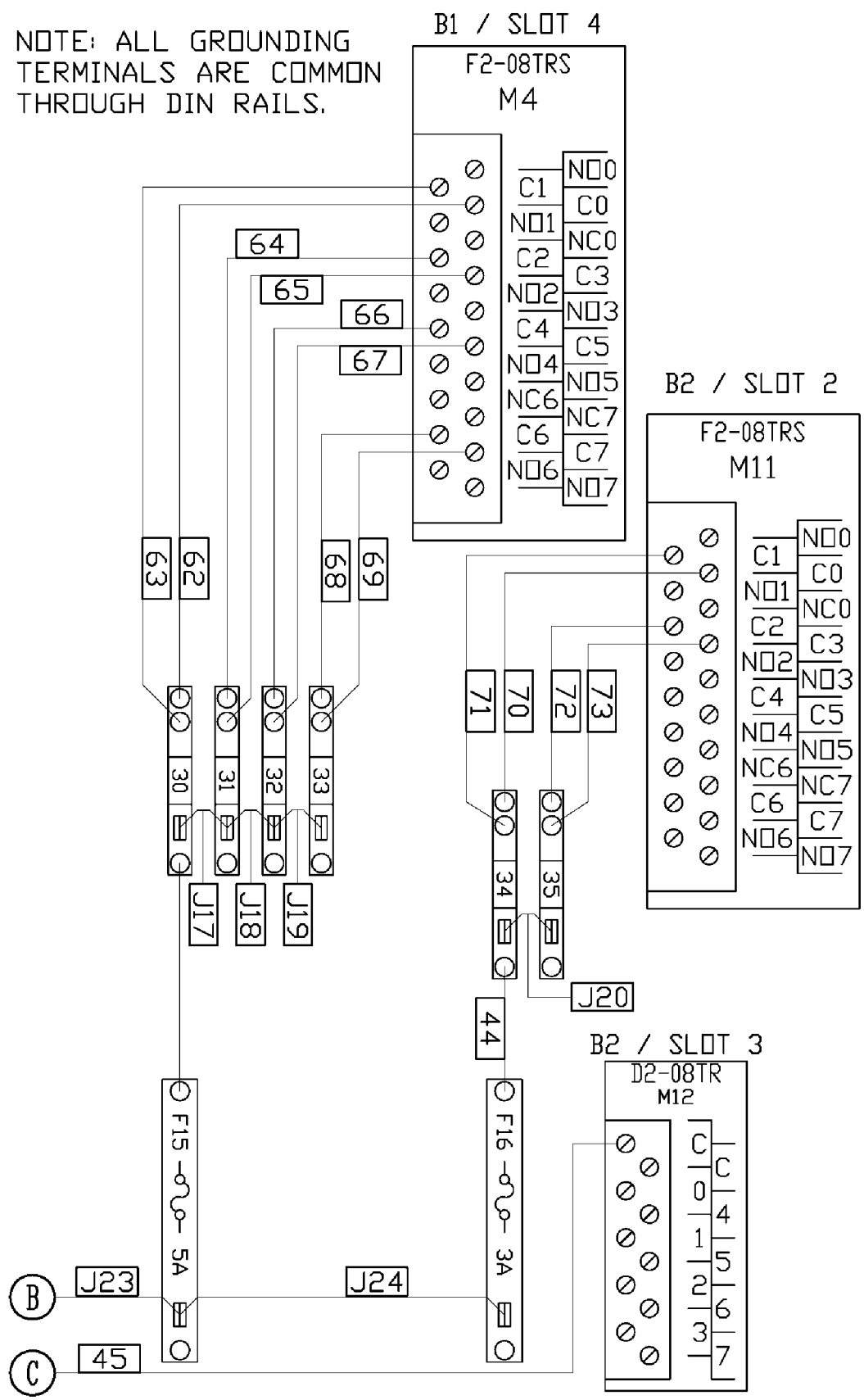

FIG. 10, in its subparts A-C, is an electrical schematic of DC power distribution for the control circuitry of FIG. 8.

Figure 11A:
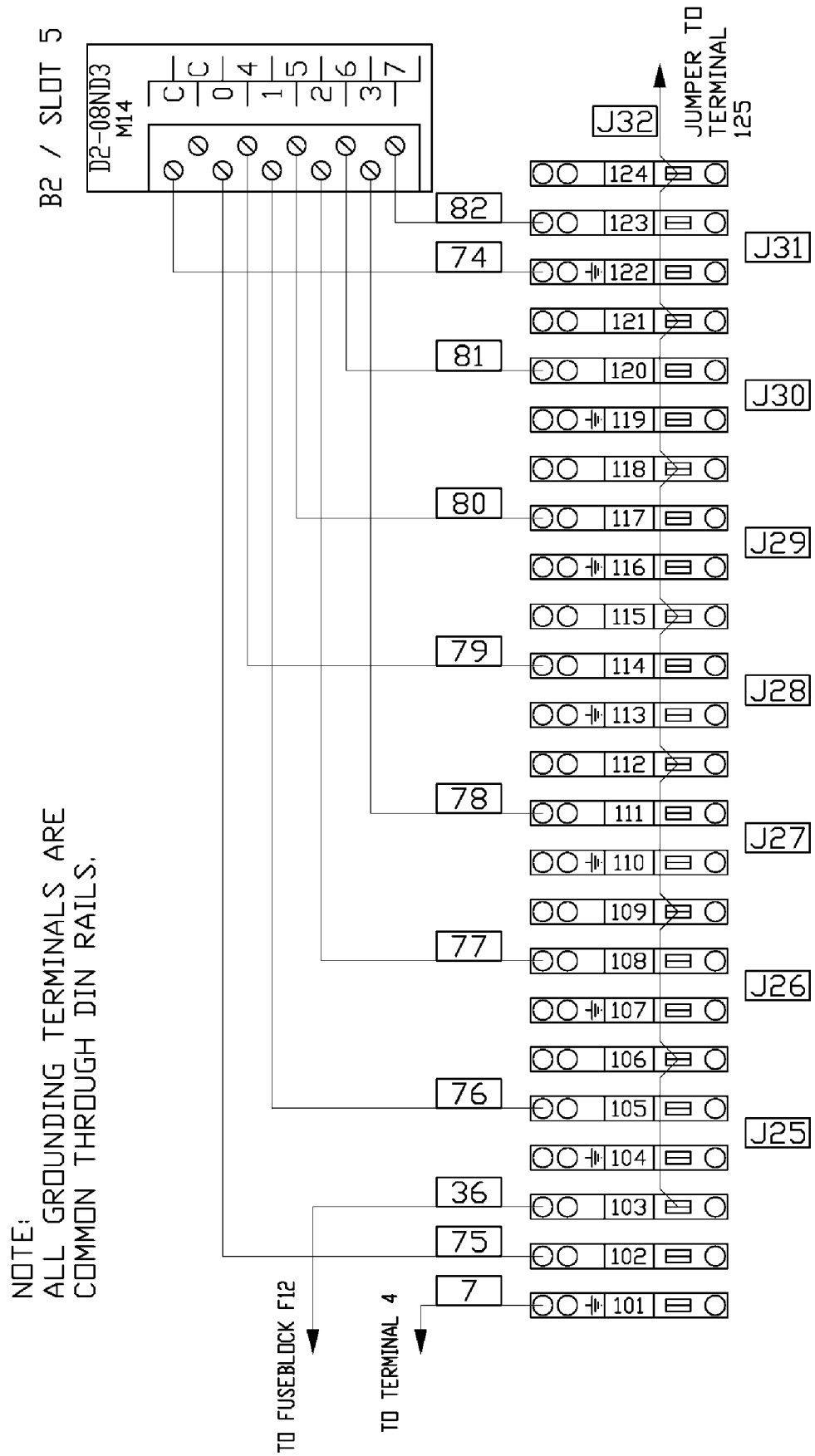
Figure 11B:
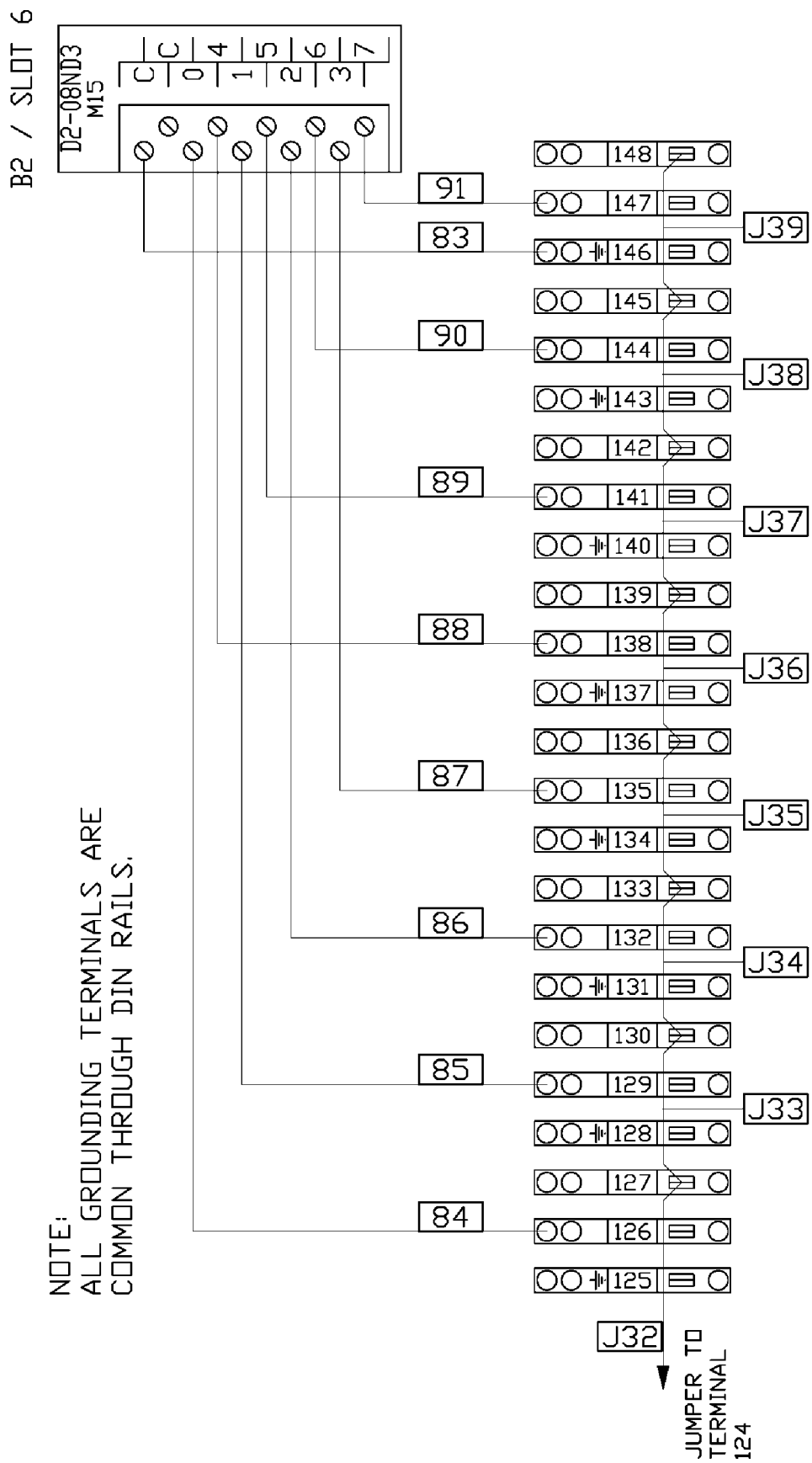
Figure 11C:
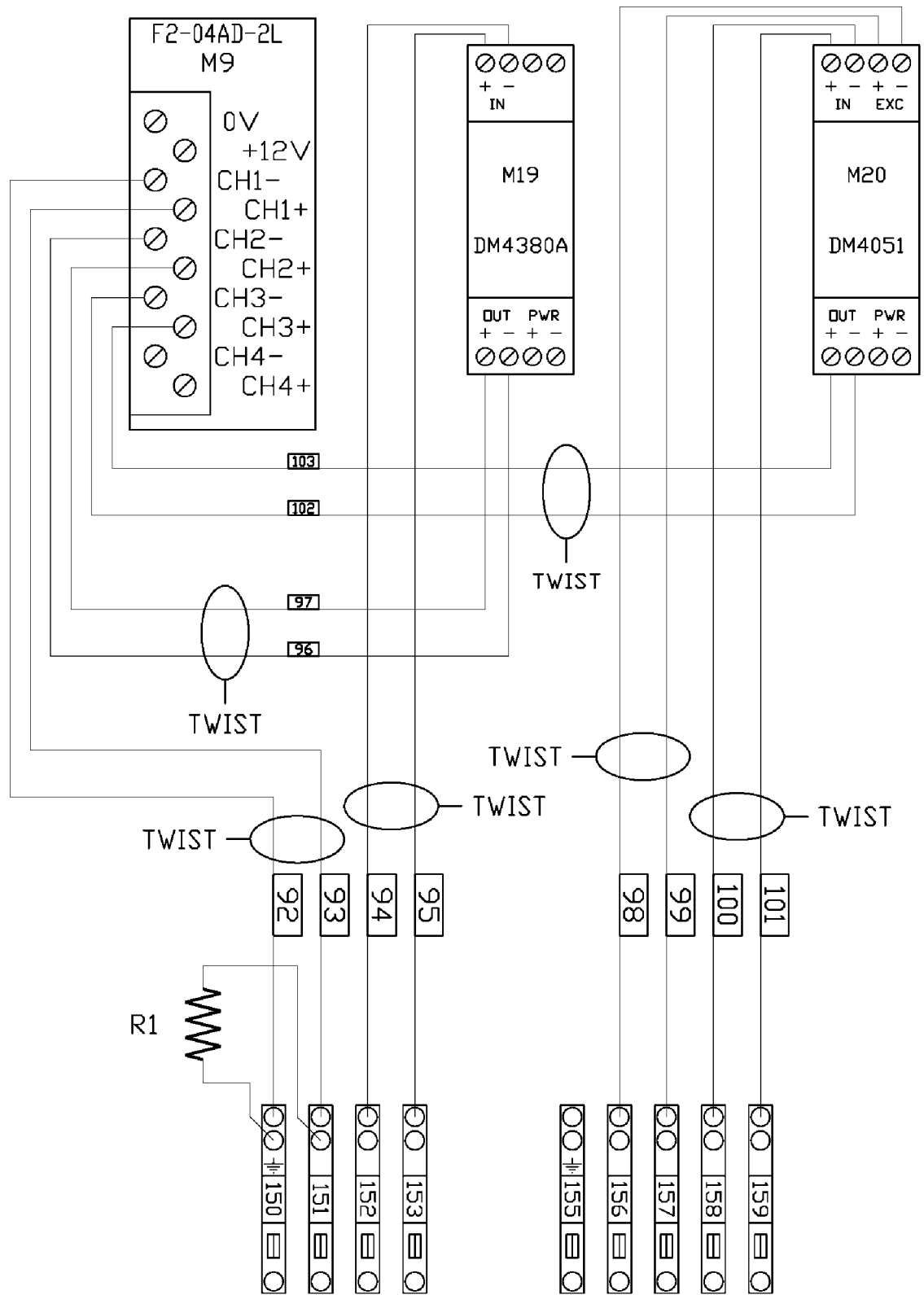
Figure 12A:
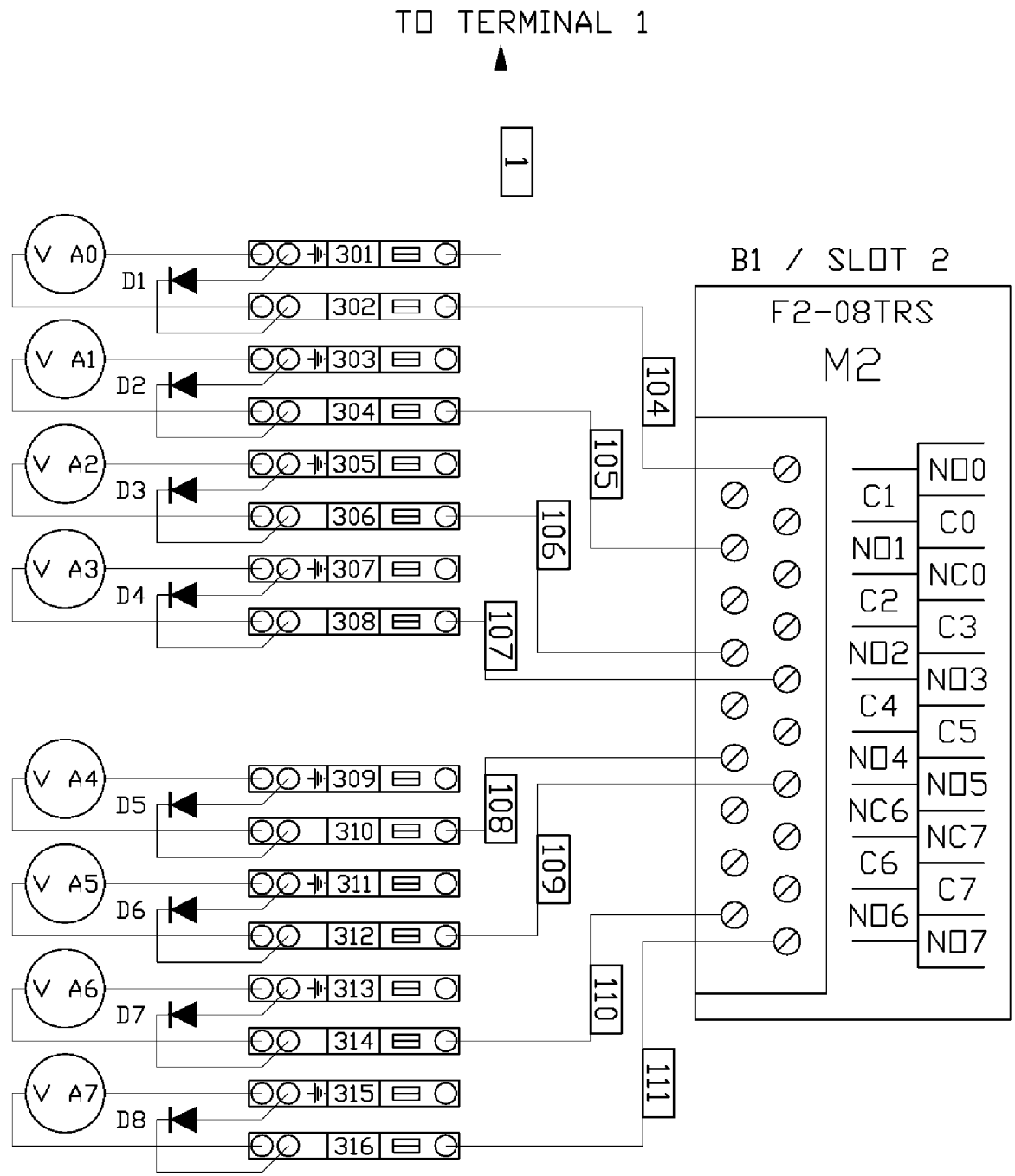
Figure 12B:
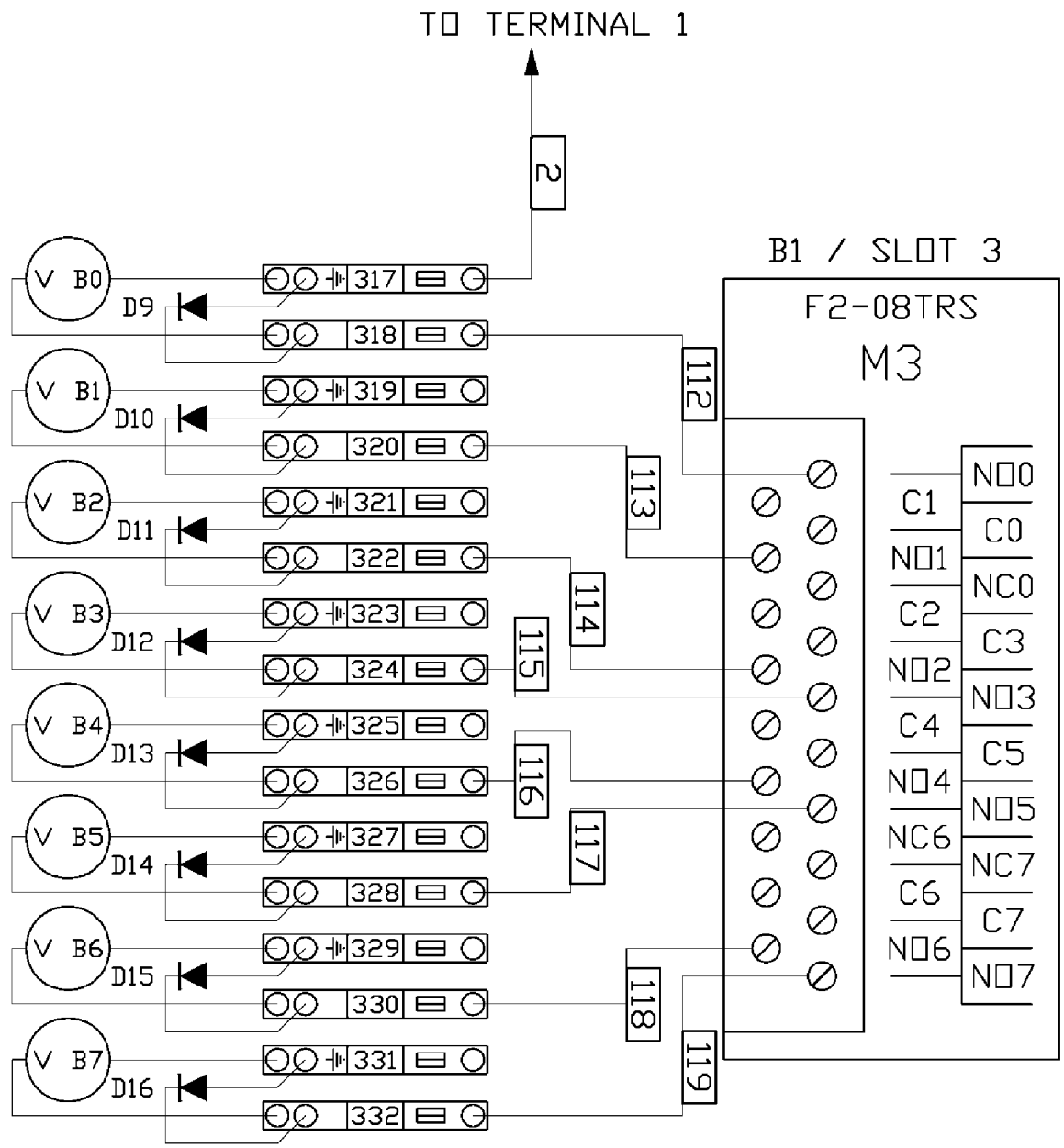
Figure 12C:
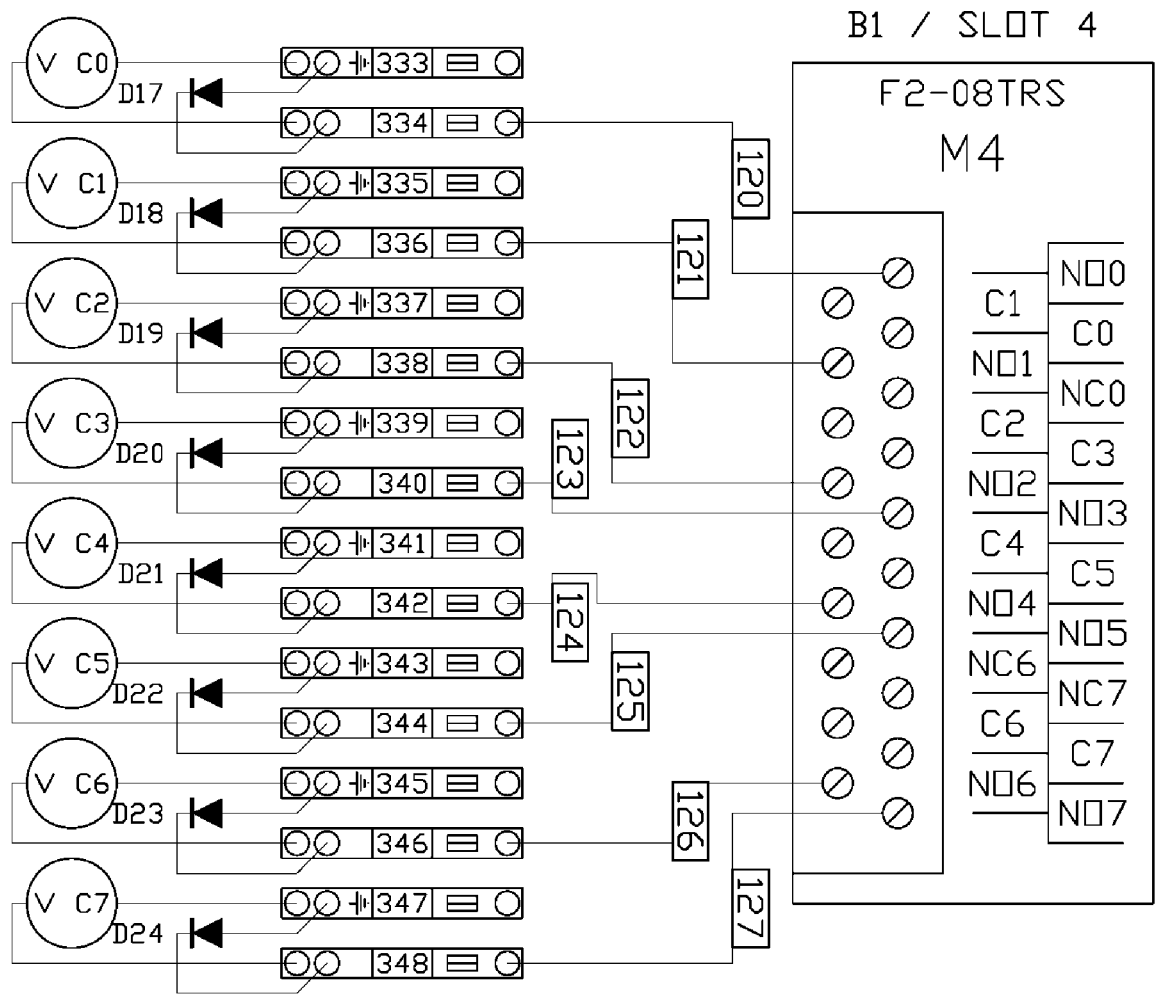
Figure 12D:
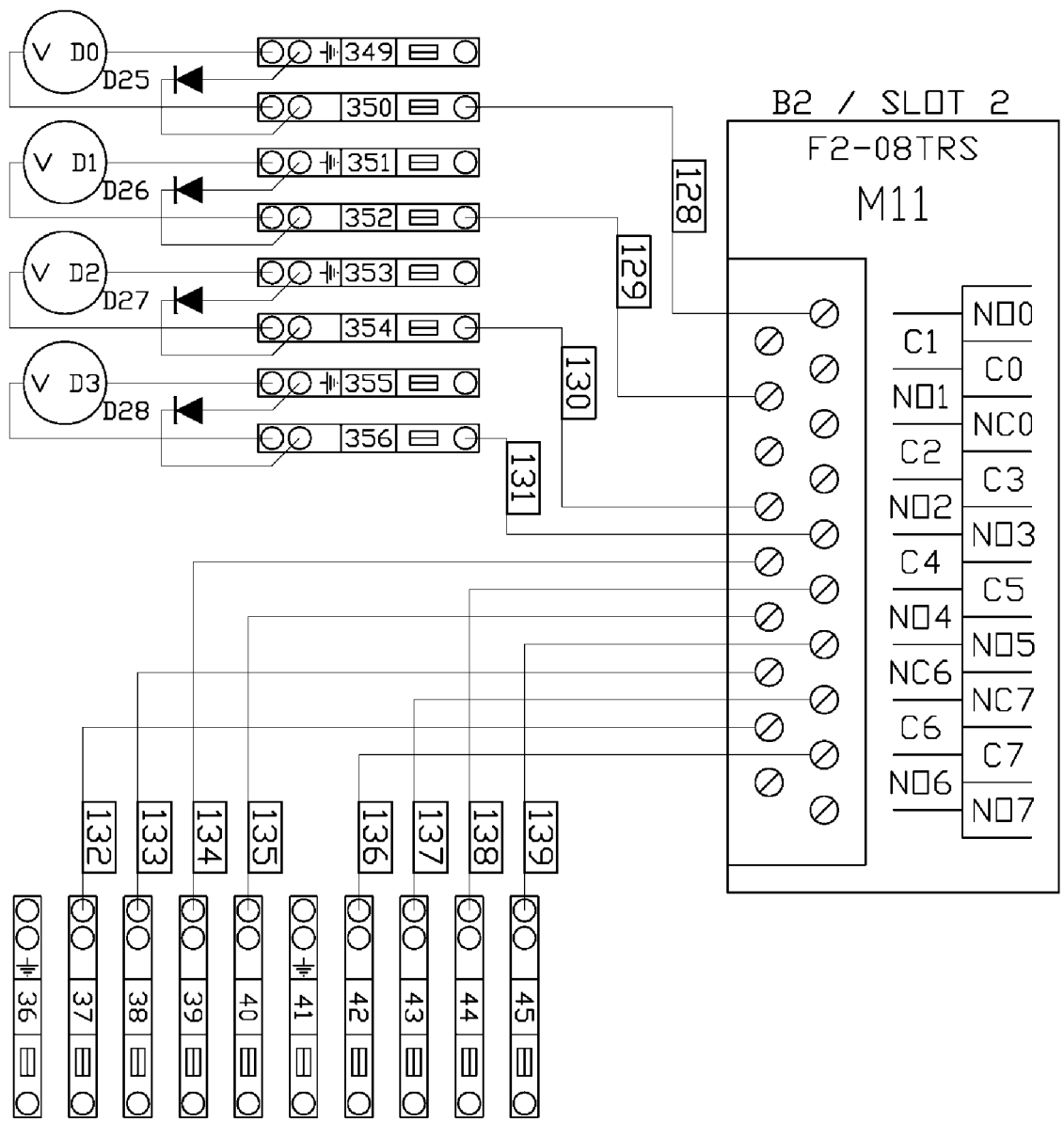
Figure 12E:
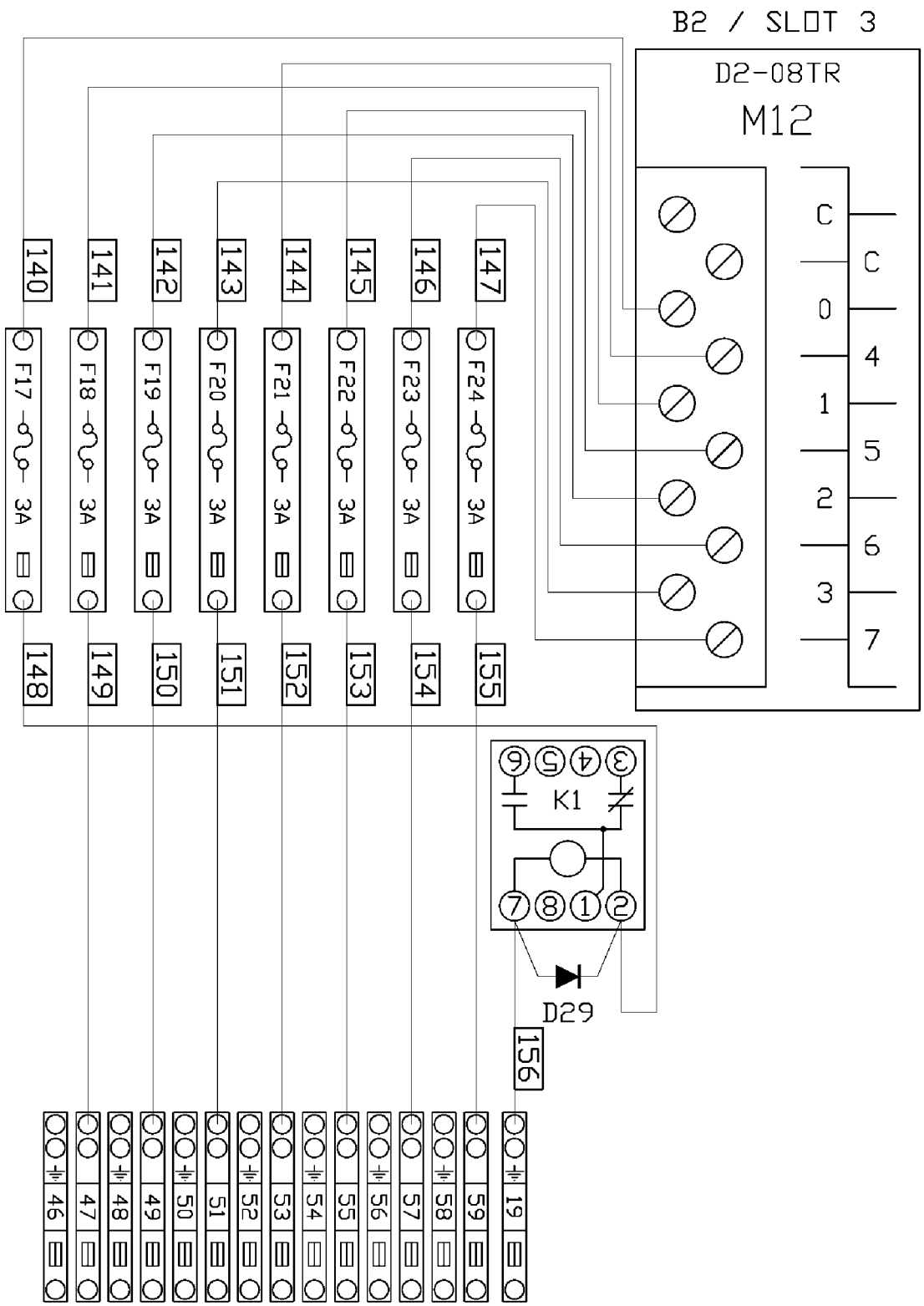

FIG. 11, in its subparts A-C, is an electrical schematic of input wiring for the control circuitry of FIG. 8.

FIG. 12, in its subparts A-E, is an electrical schematic of output wiring for the control circuitry of FIG. 8.

Figure 13A:
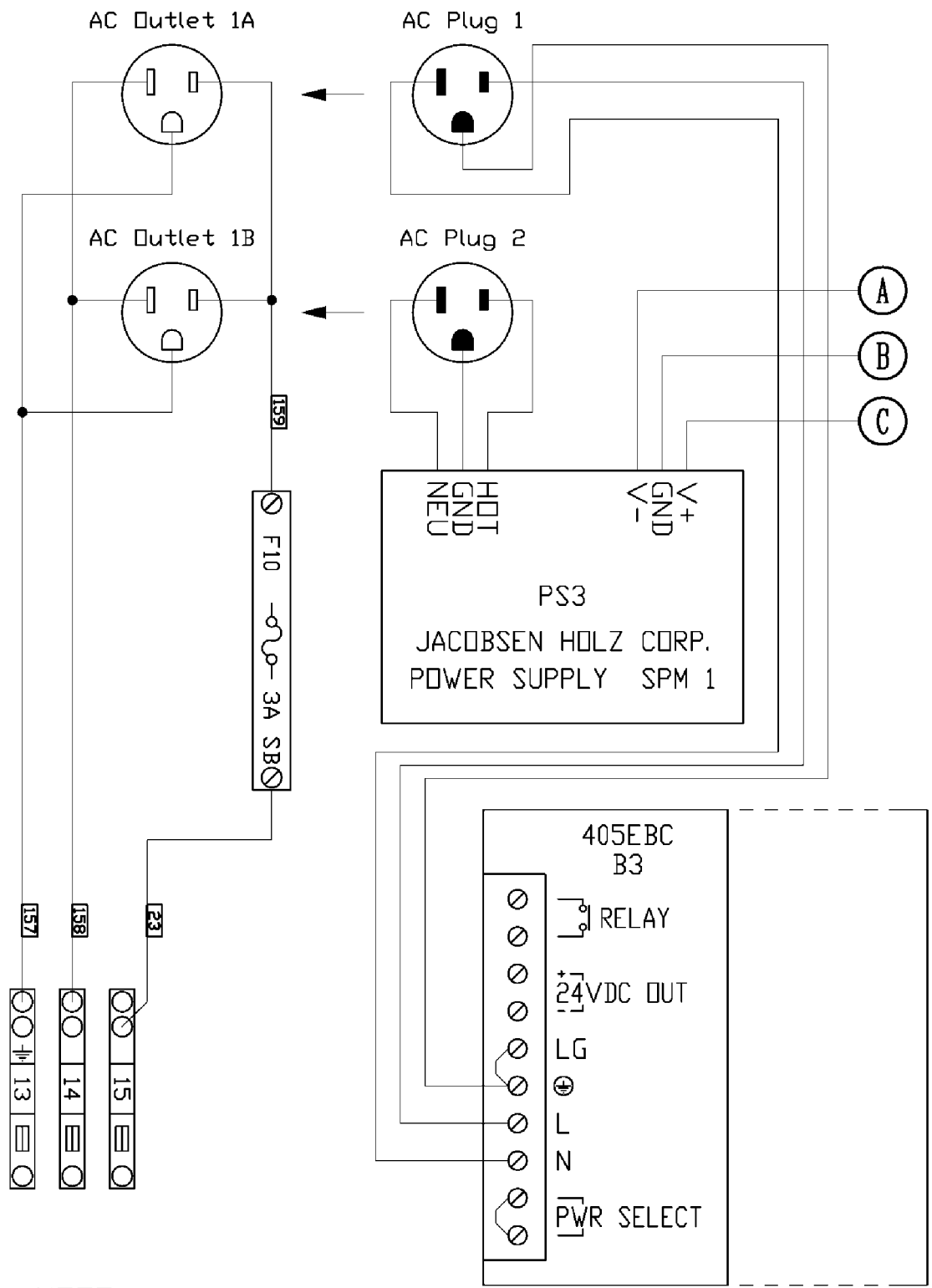
Figure 13B:
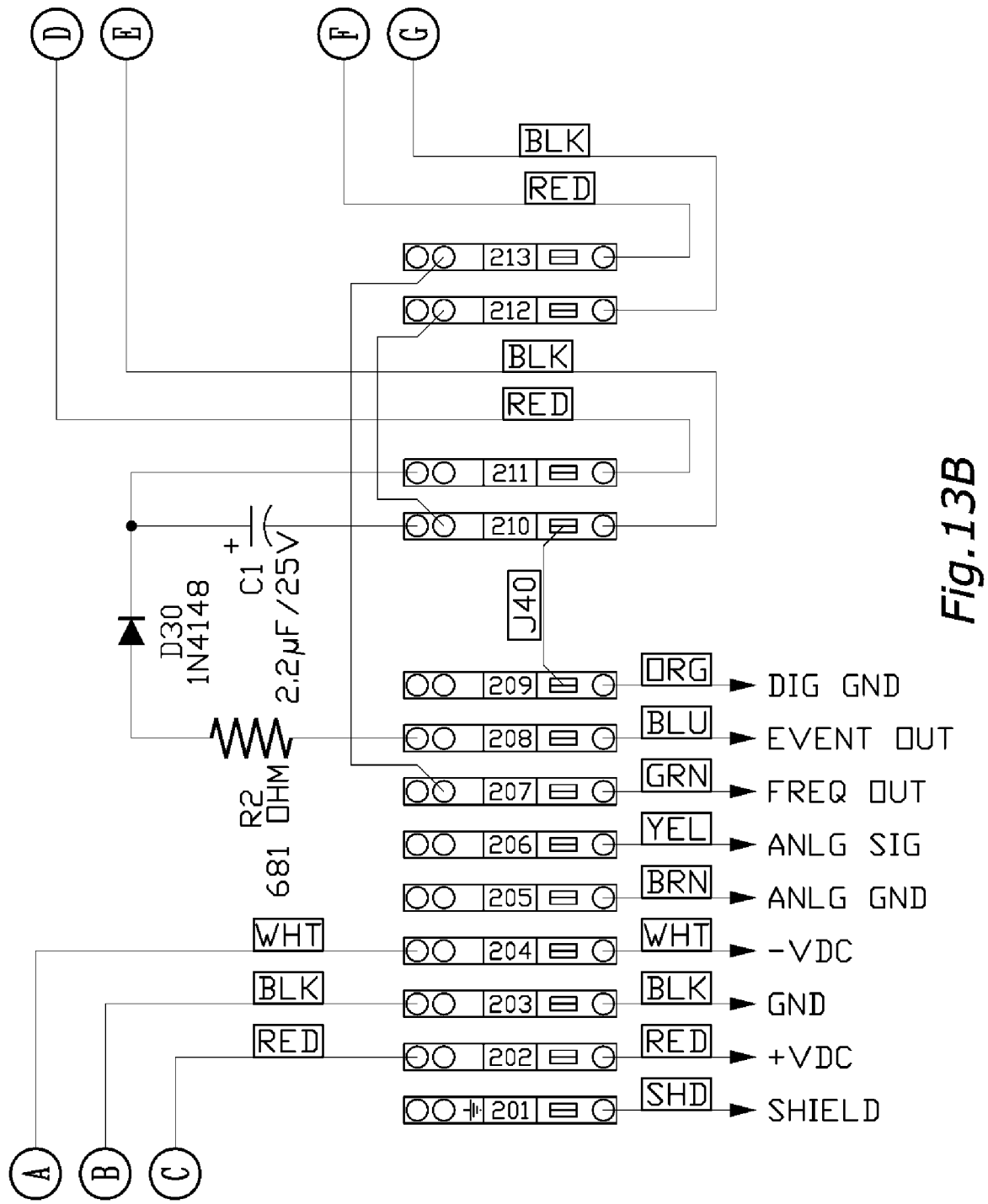
Figure 13C:
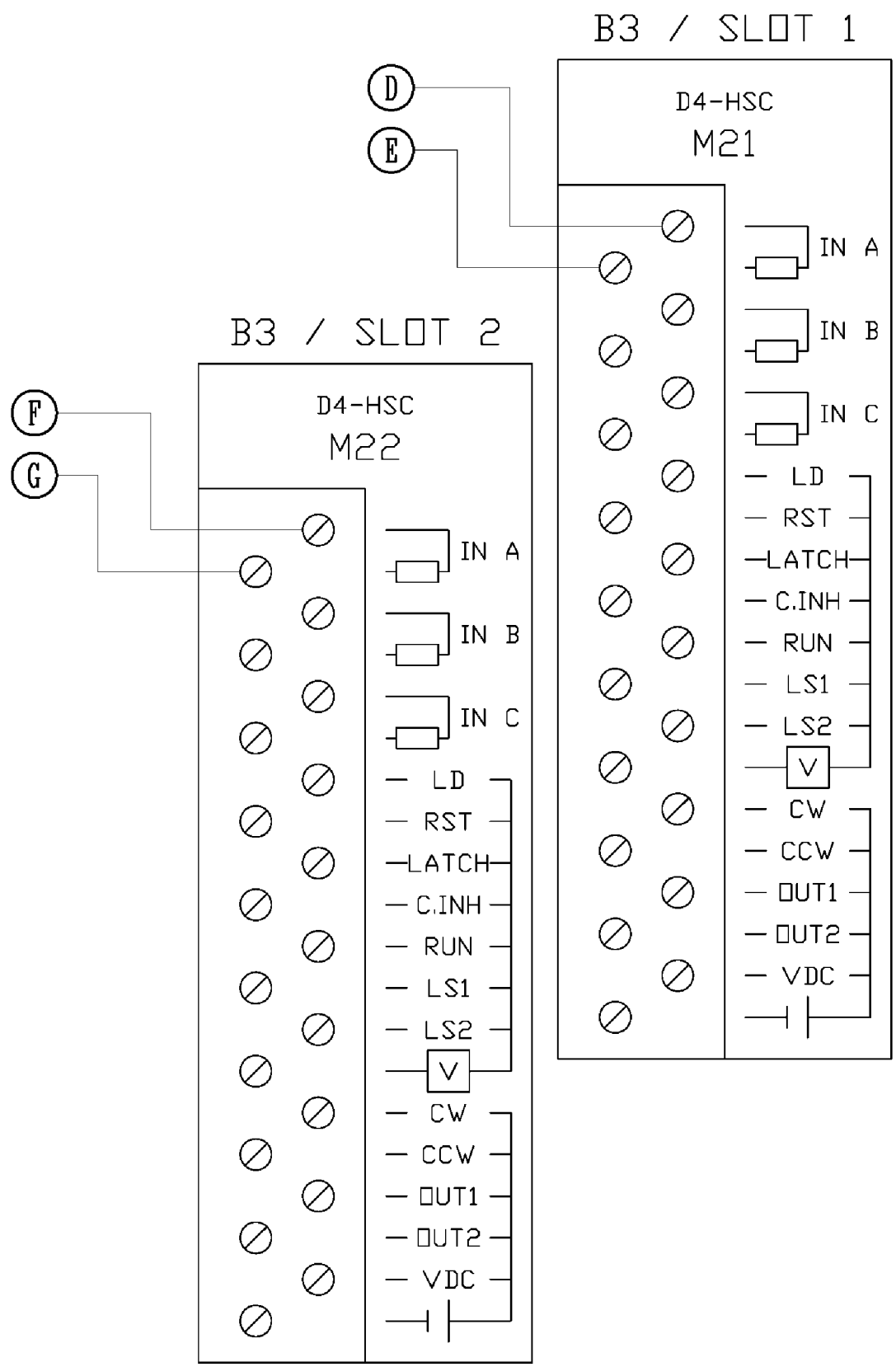

FIG. 13, in its subparts A-C, is an electrical schematic of a seed counting subsystem for the control circuitry of FIG. 8.

Figure 14:
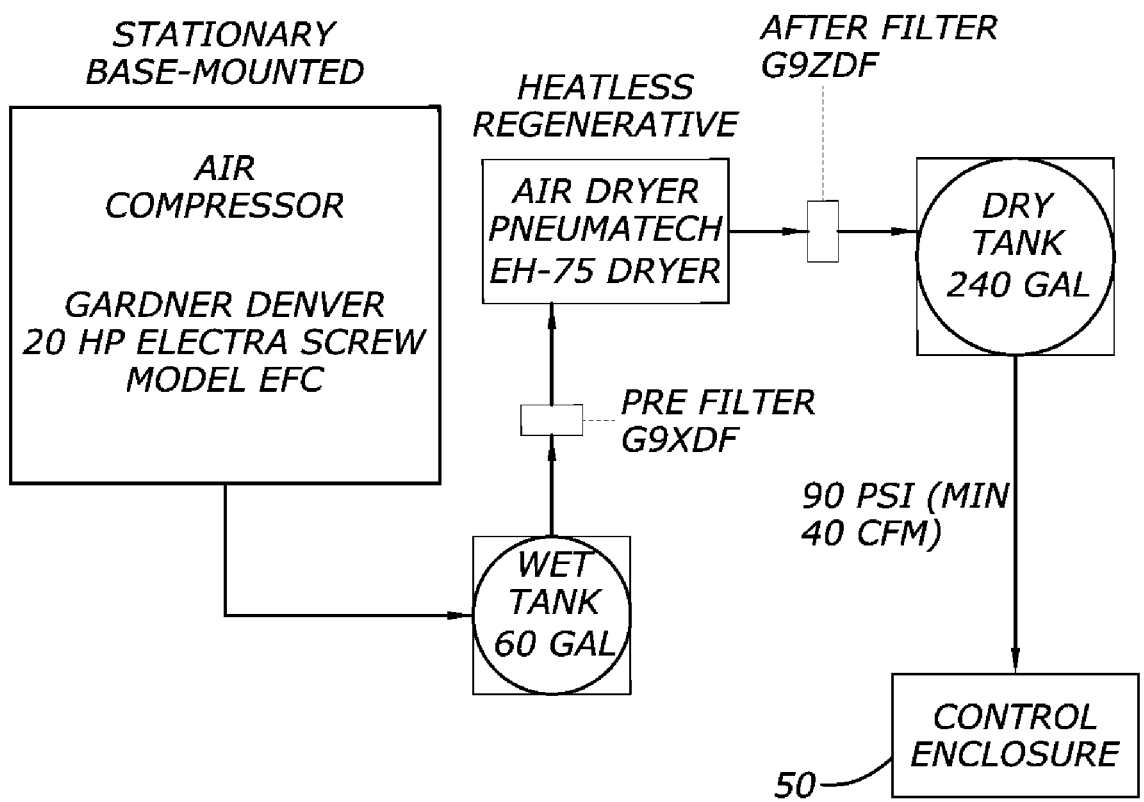

FIG. 14 is a diagrammatic view of pneumatic power source for use with the control circuitry of FIG. 8.

Figure 6:
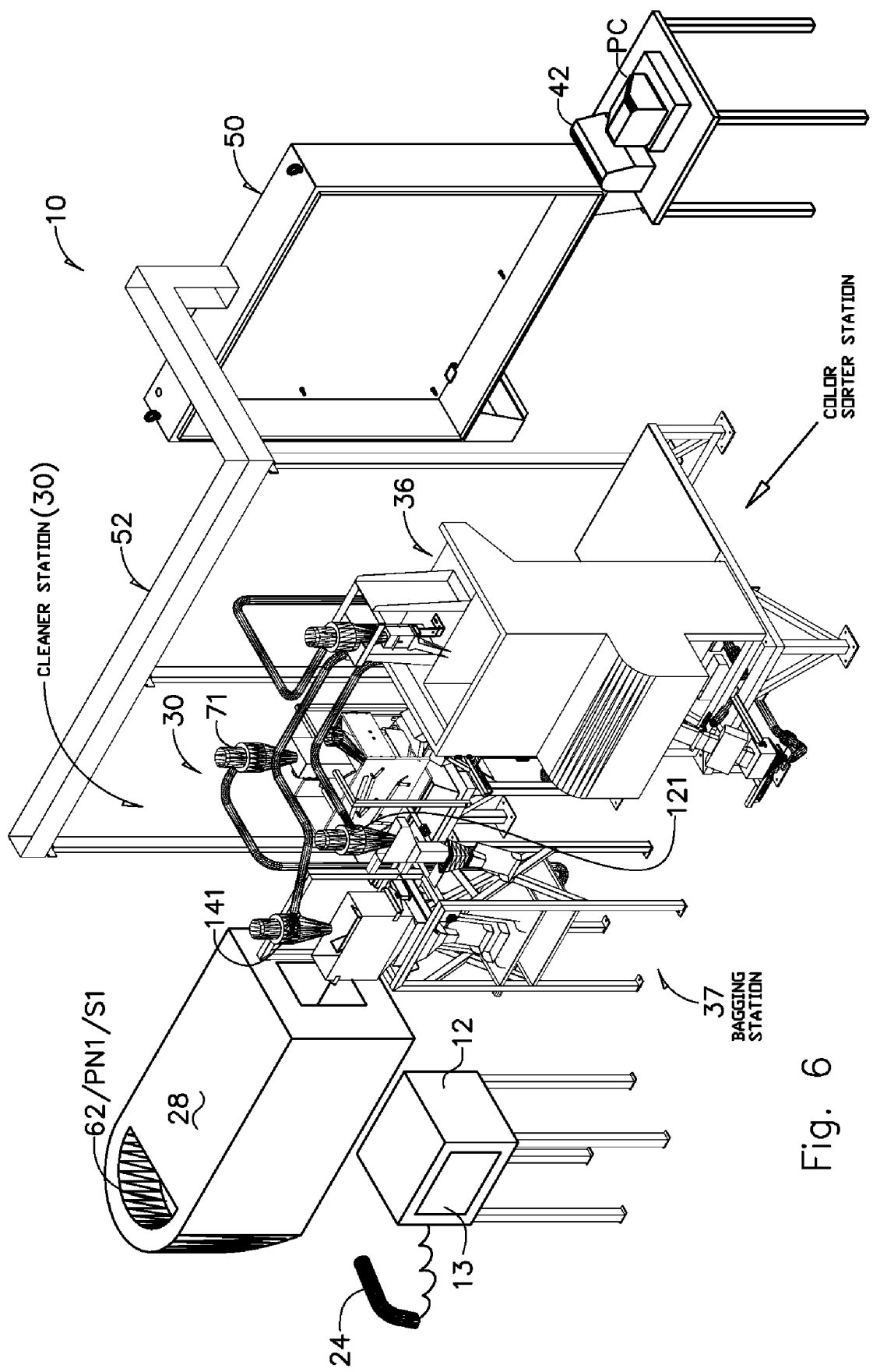
FIG. 6 is a perspective view of an embodiment of the system of FIG. 1.
Figure 15:
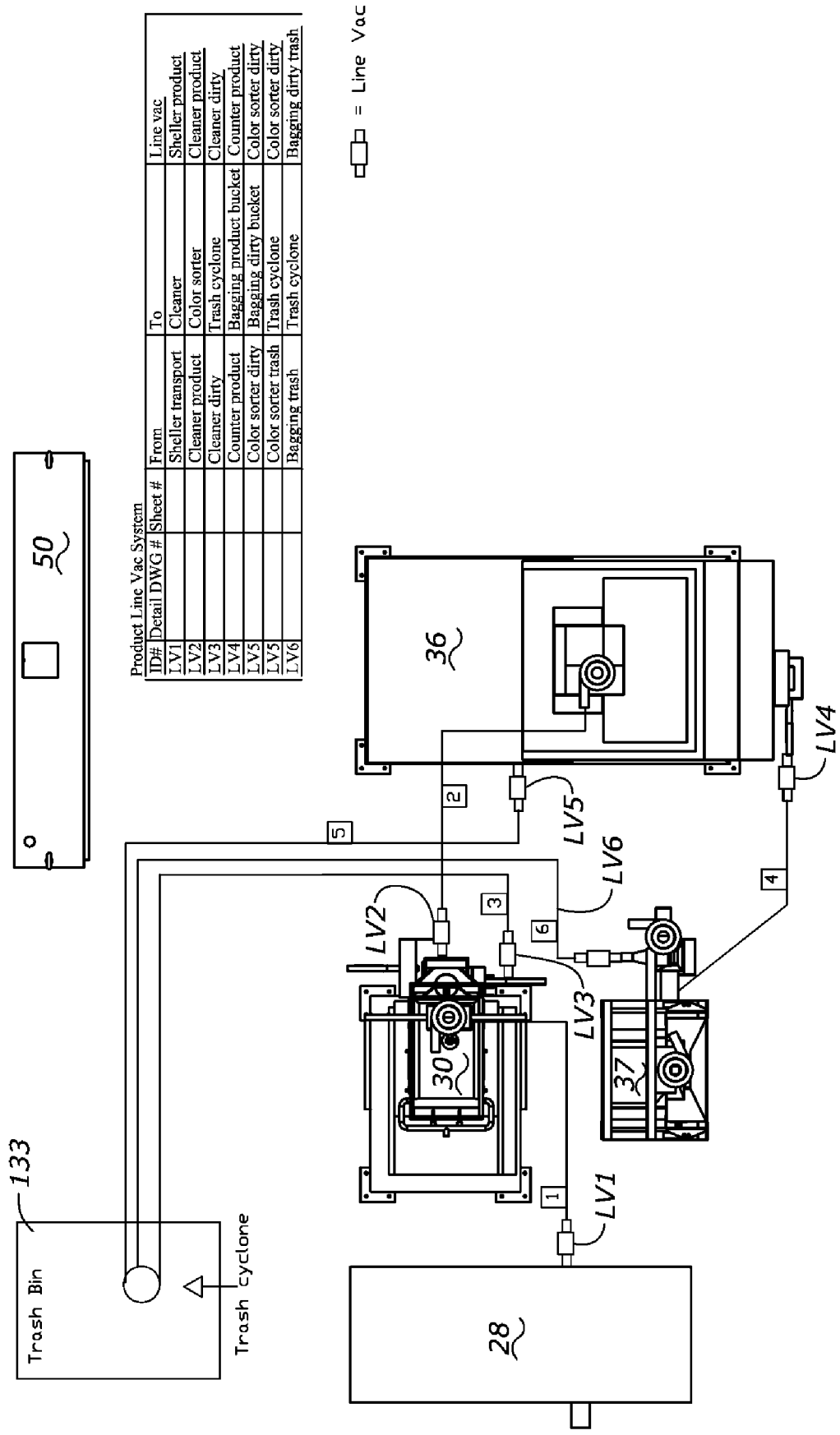

FIG. 15 is a diagrammatic view of product line vac lines in the system of FIG. 6.

Figure 16:
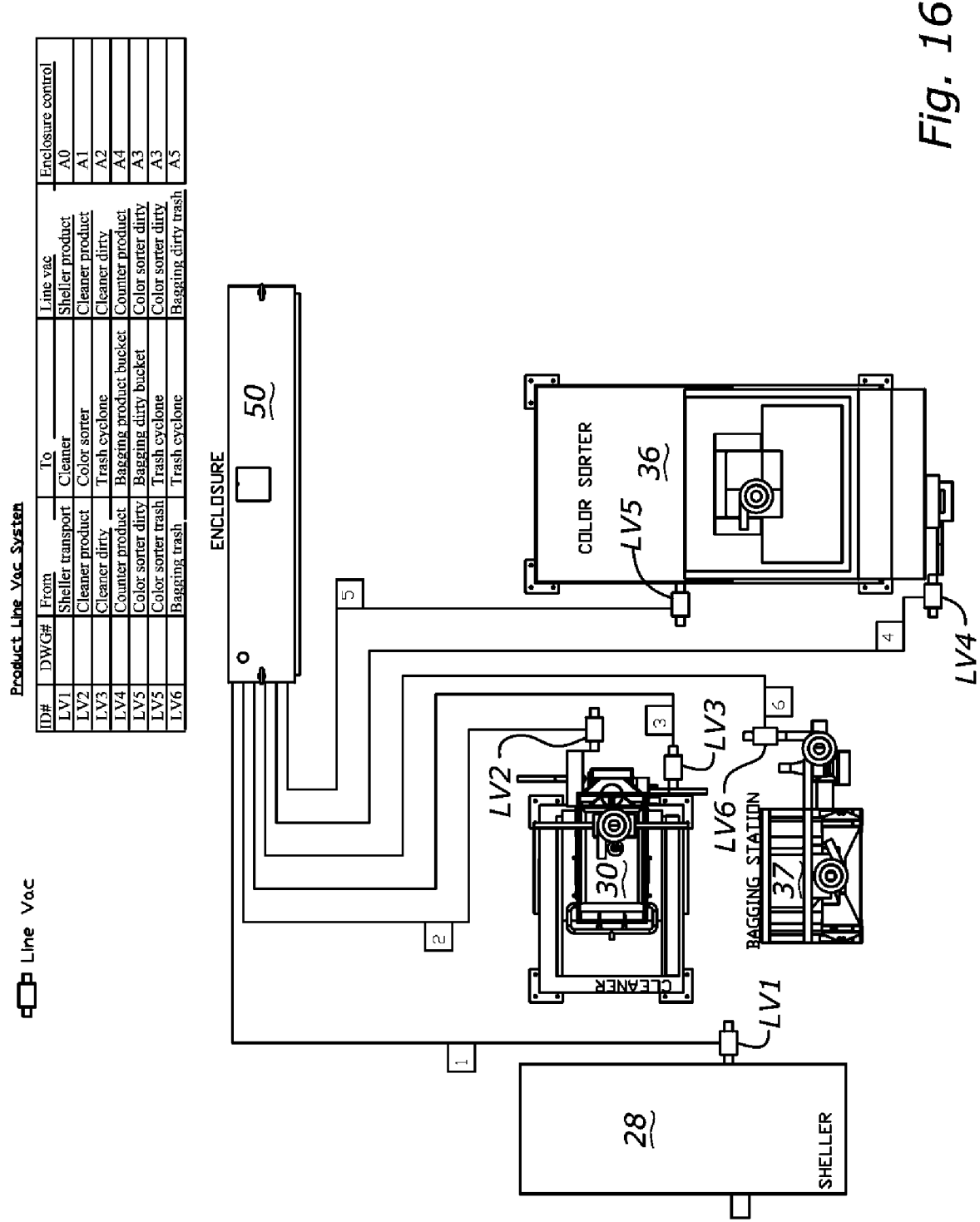

FIG. 16 is a diagrammatic view of product line vacuum control lines for the pneumatic lines of FIG. 15.

Figure 17:
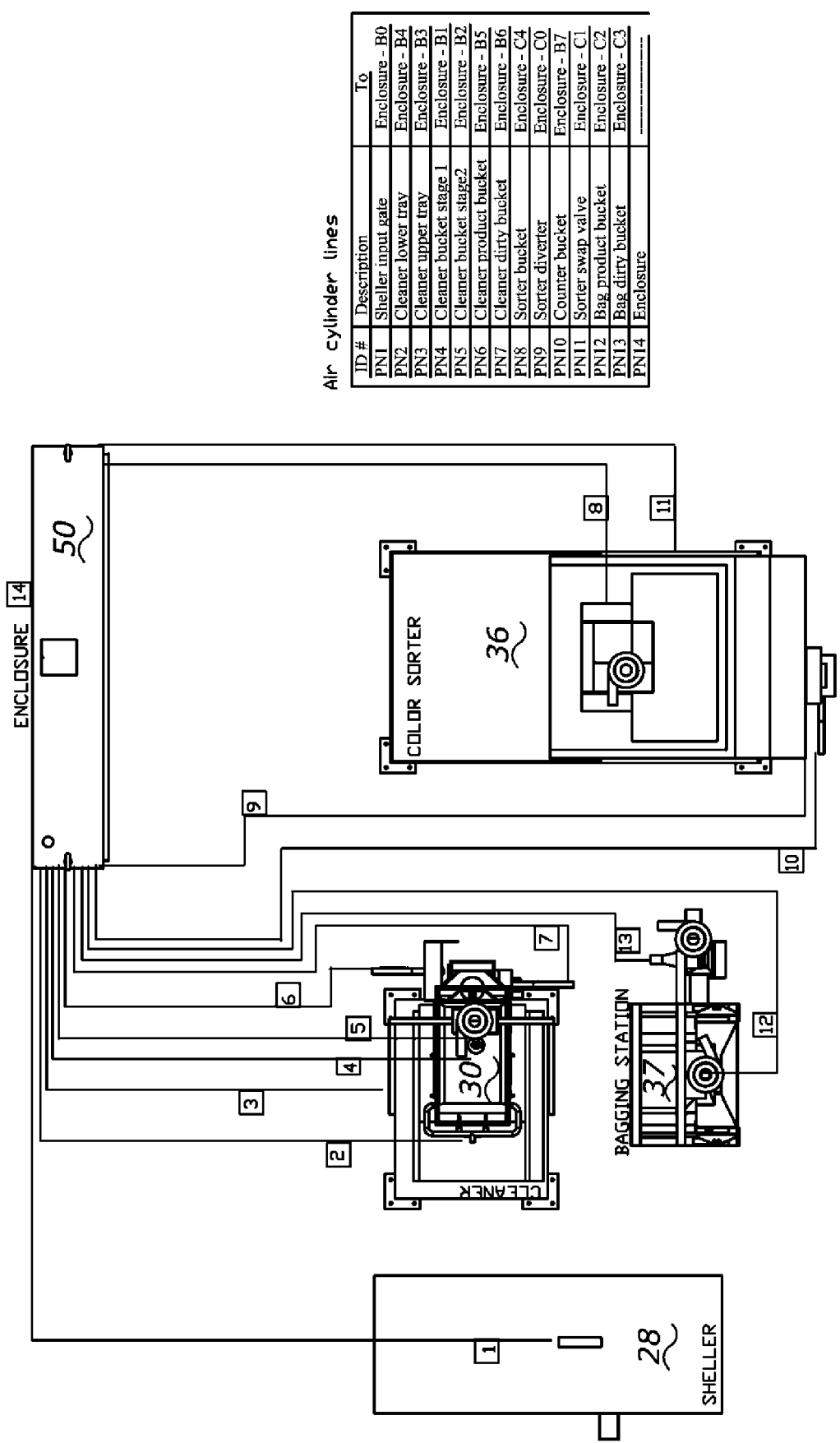

FIG. 17 is a diagrammatic view of the pneumatic cylinder control lines for pneumatic cylinders for the system of FIG. 3.

Figure 18:
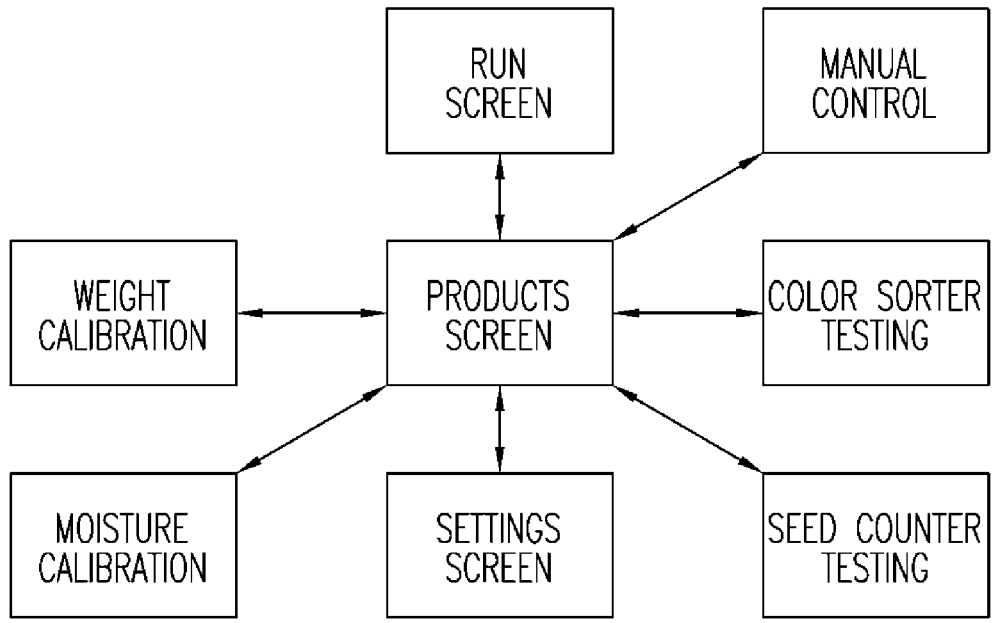

FIG. 18 is a block diagram showing the relationship between various user interface screens of one embodiment of the present invention.

Figure 1:
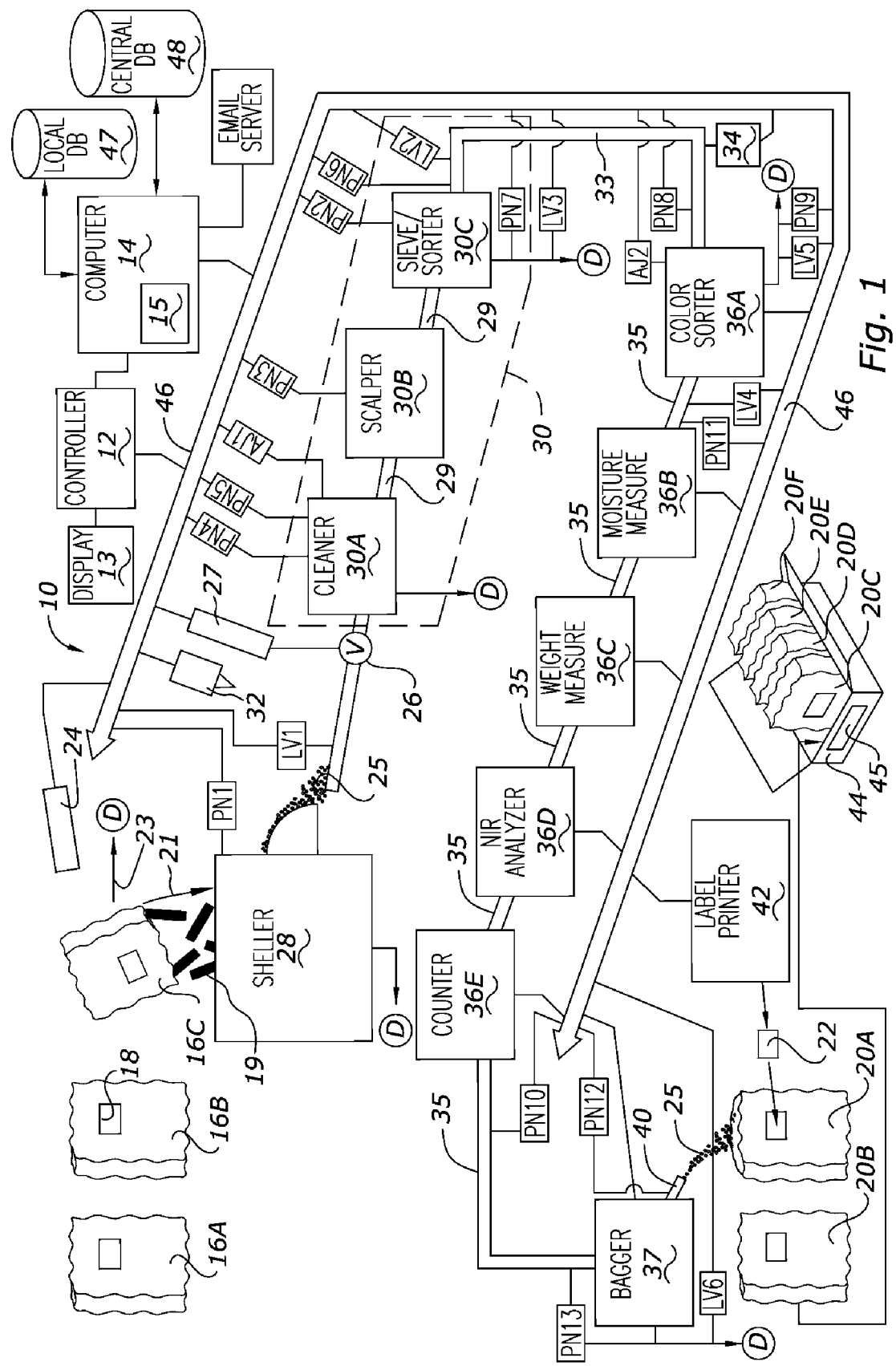
Figure 19A:
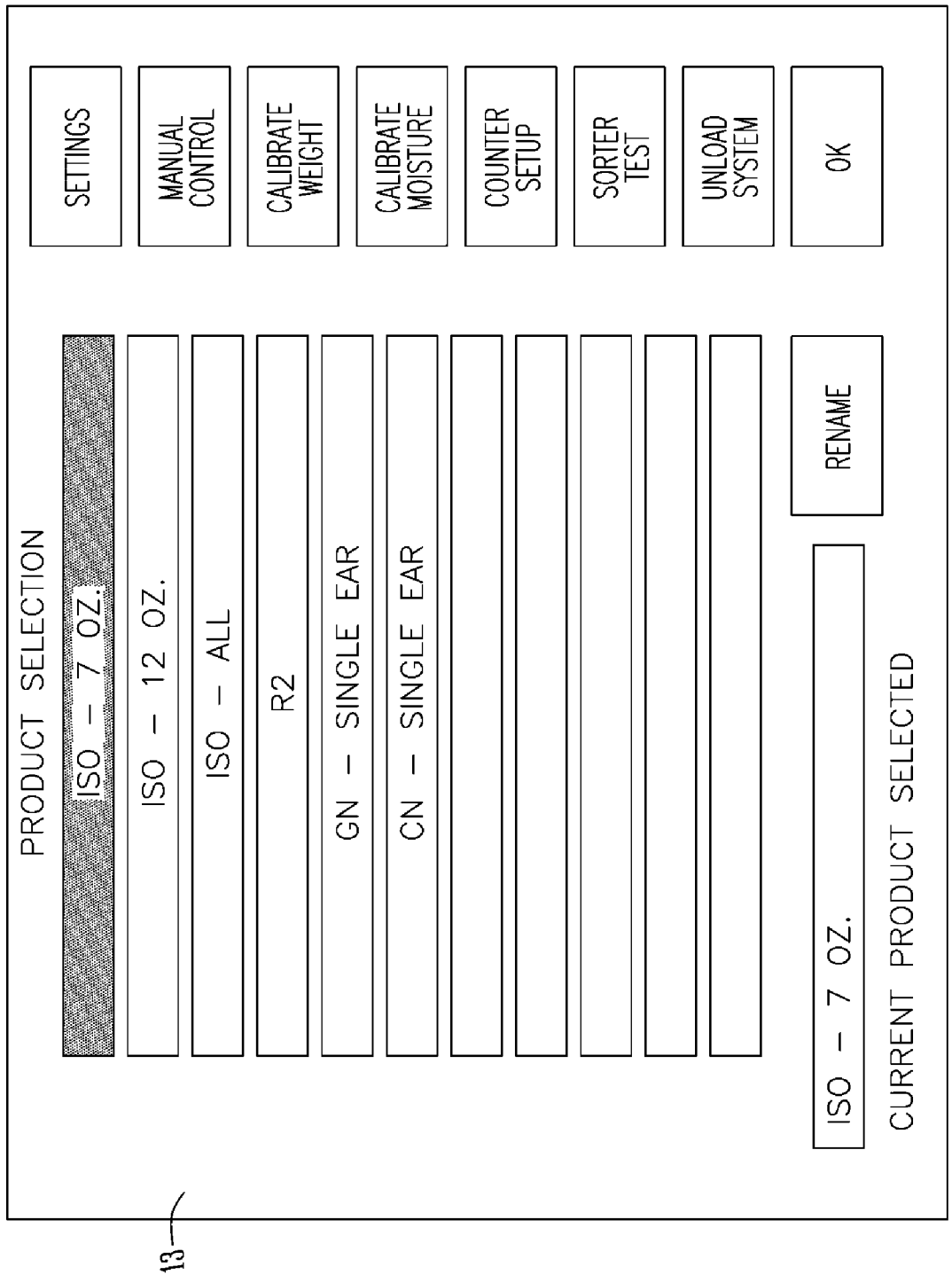

FIG. 19A is a graphic user interface (GUI) presented to an operator of a system according to FIG. 1 permitting a user to select particular types of seed or products.

Figure 19B:
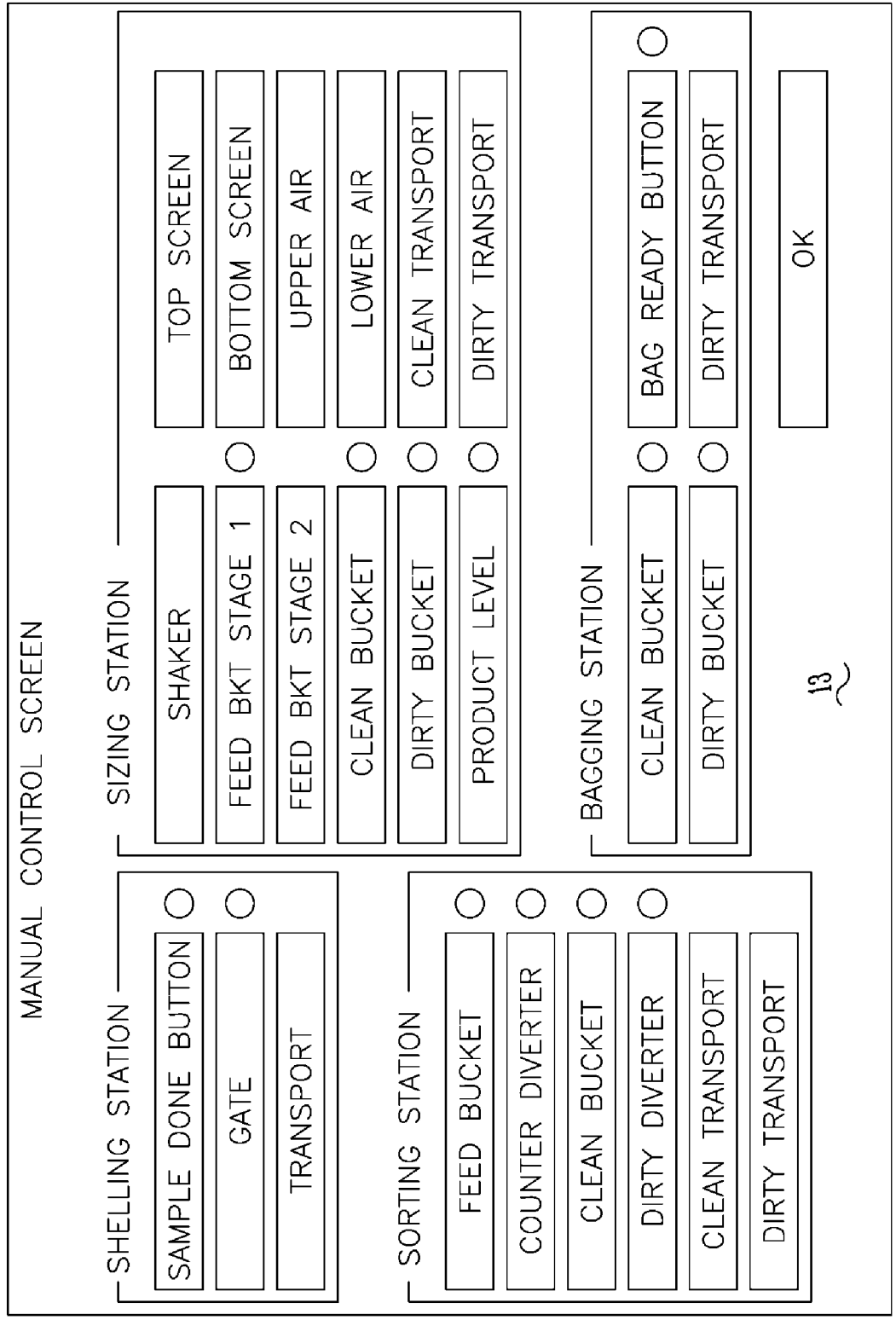

FIG. 19B is a GUI showing the system settings.

FIG. 19C is a GUI of system settings for a particular type of seed or product showing the accompanying processing times.

Figure 20:
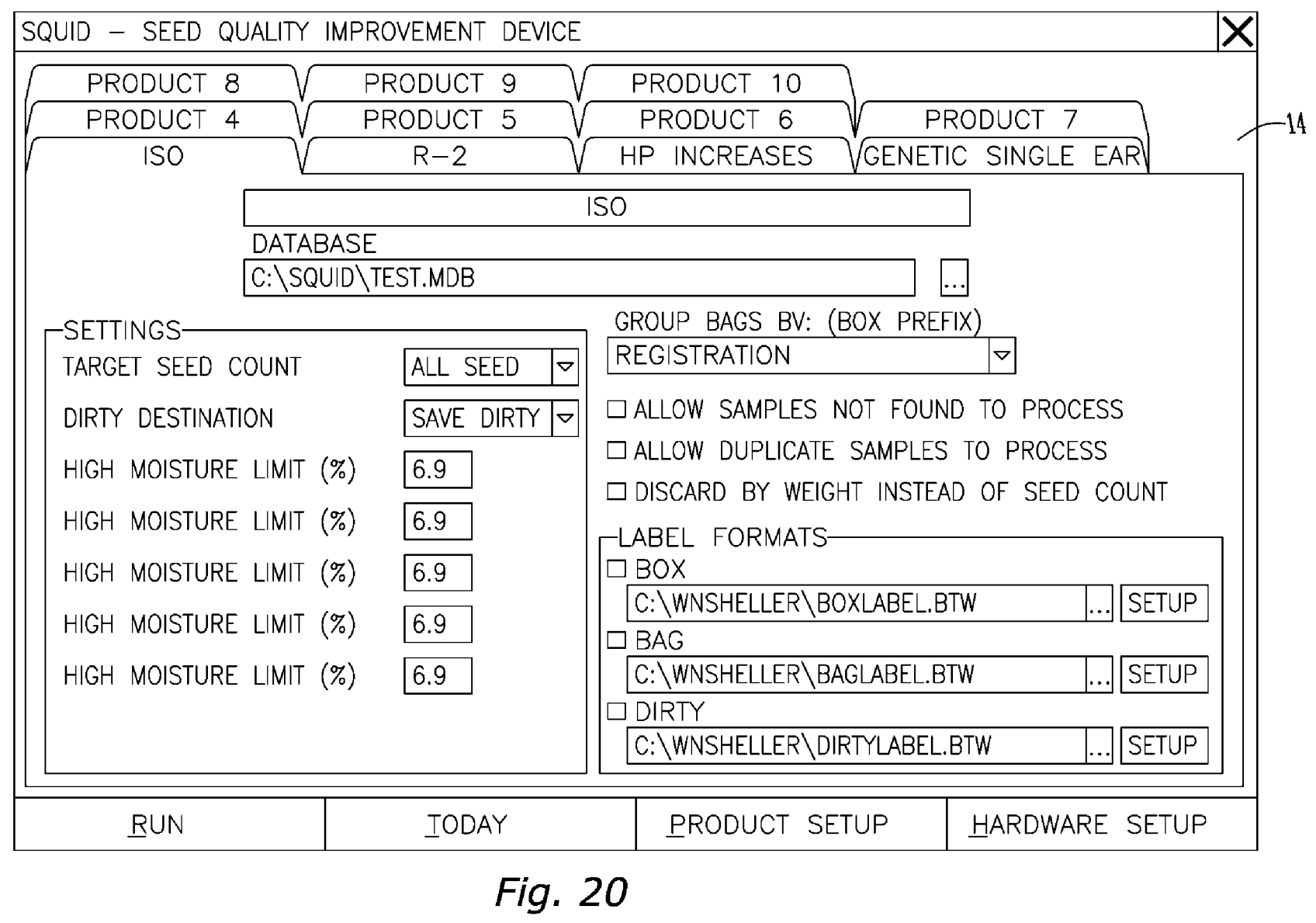

FIG. 20 is a GUI of set up screen to initialize the system for a certain type of seed or product.

FIG. 21 is a GUI for hardware set up for the system.

Figure 22:
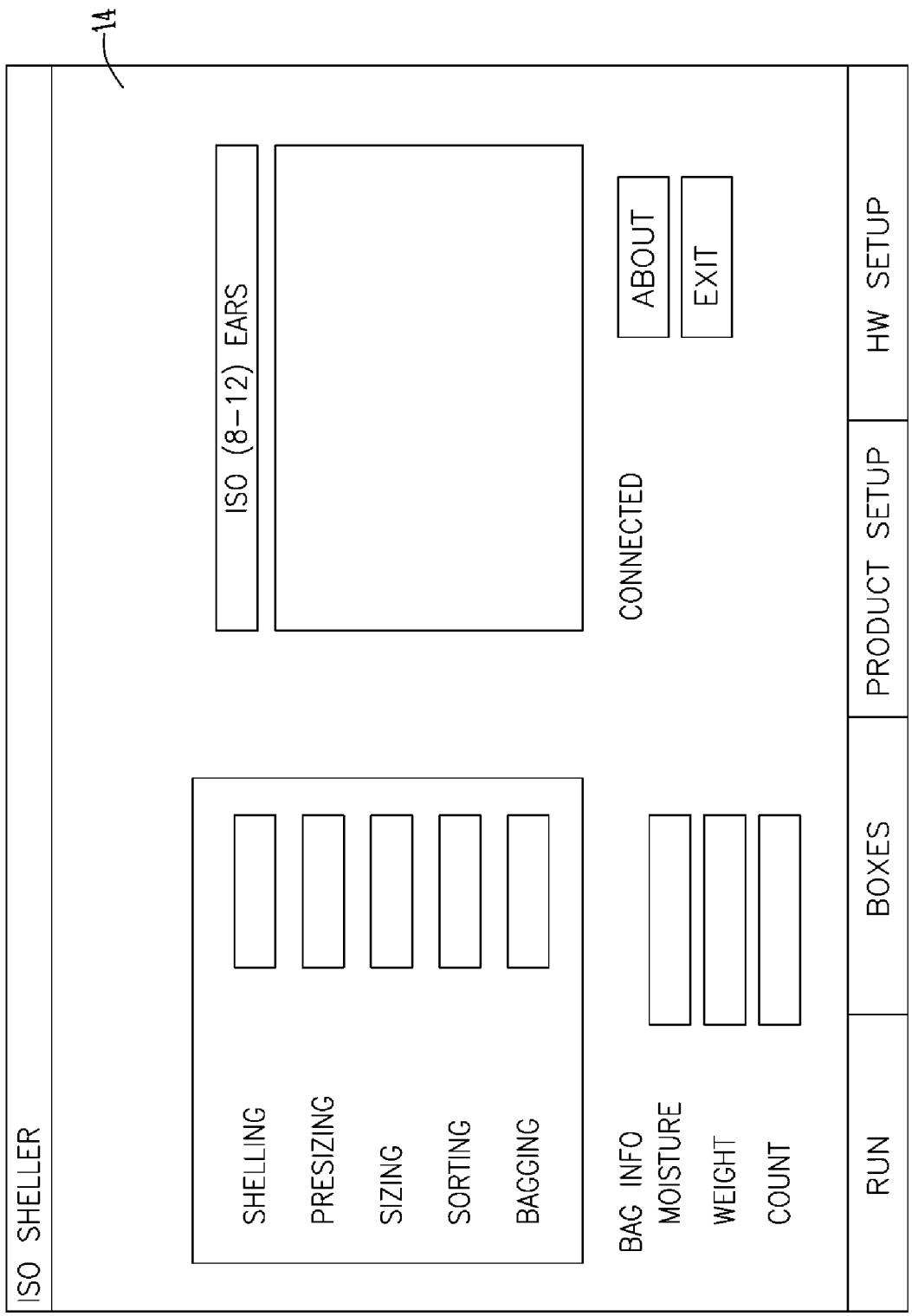

FIG. 22 is a GUI for a run screen for the system.

FIG. 23A is a GUI for a bar code format and label set up for the system.

Figure 23B:
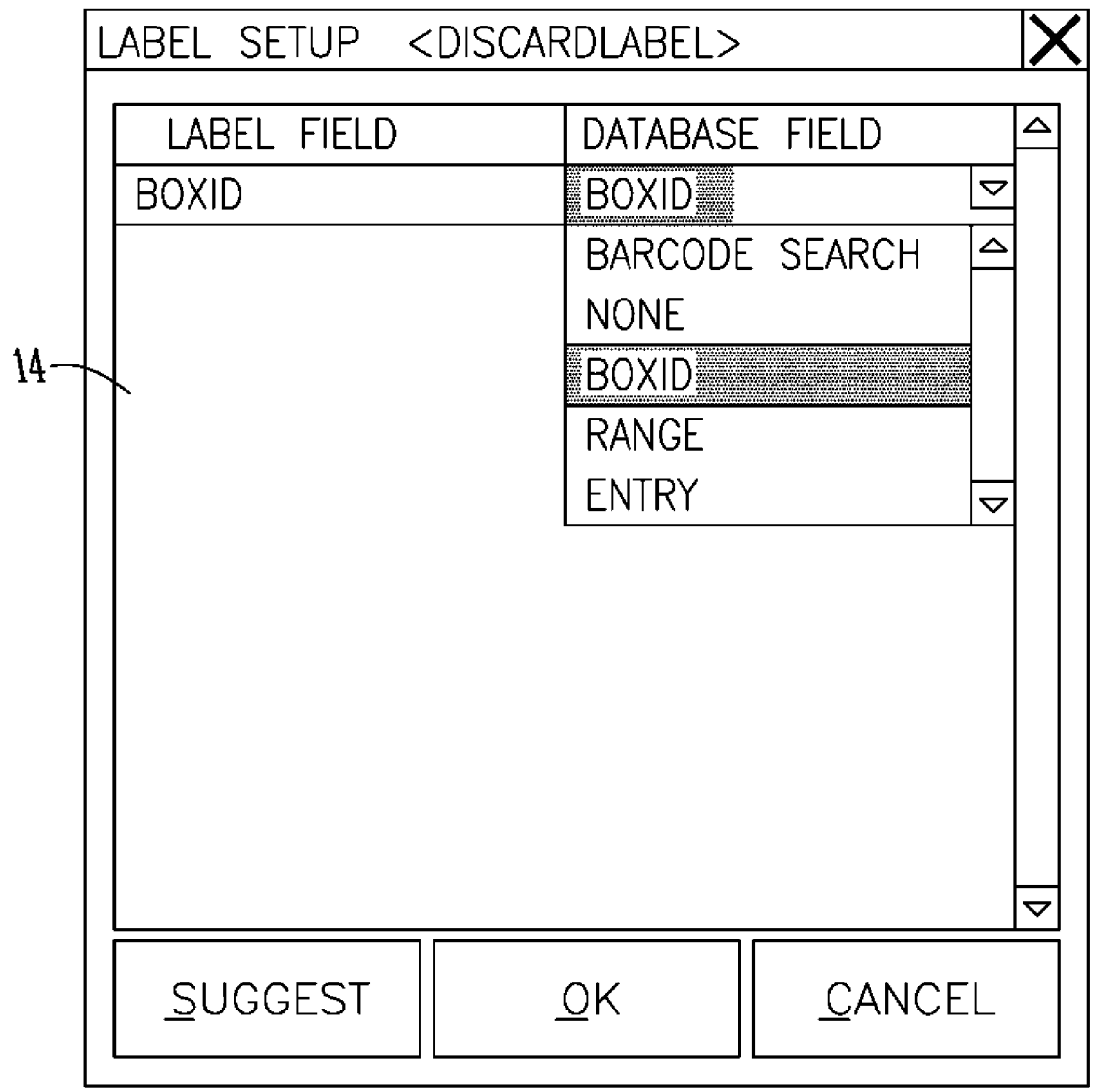

FIG. 23B is a GUI for label format for a box which will hold one or more samples processed by the system.

FIG. 24 is a GUI illustrating content of one or more boxes.

Figure 25A:
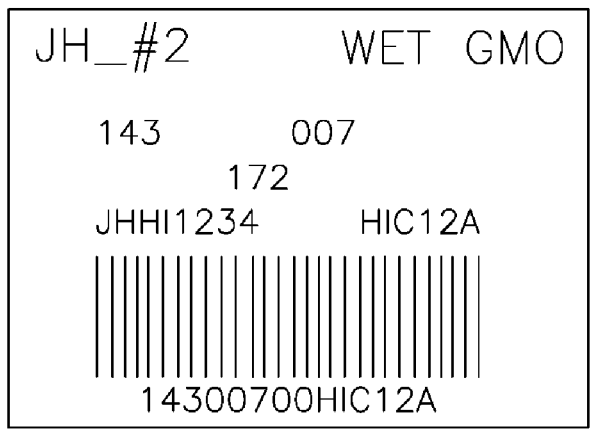

FIG. 25A is an example of a printed label for a set of "clean" or selected seeds from the processing of the system.

Figure 25B:
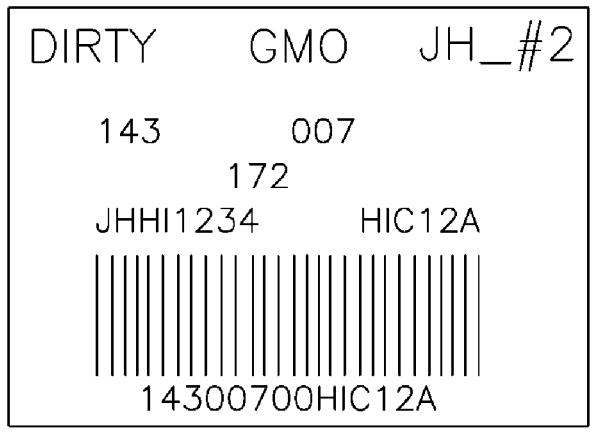

FIG. 25B is an example of a printed label for a set of "dirty" or non-selected seeds from the processing of the system.

Figure 25C:
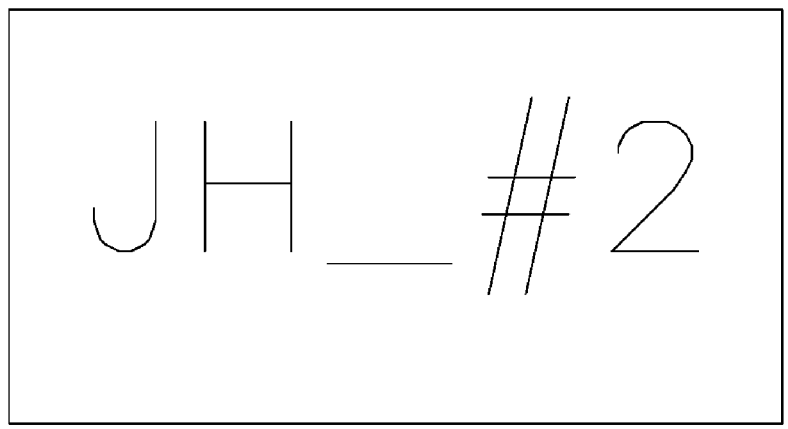

FIG. 25C is an example of a label for a box adapted to hold one or more of the clean or dirty sets of seeds processed by the system.

Figure 26:
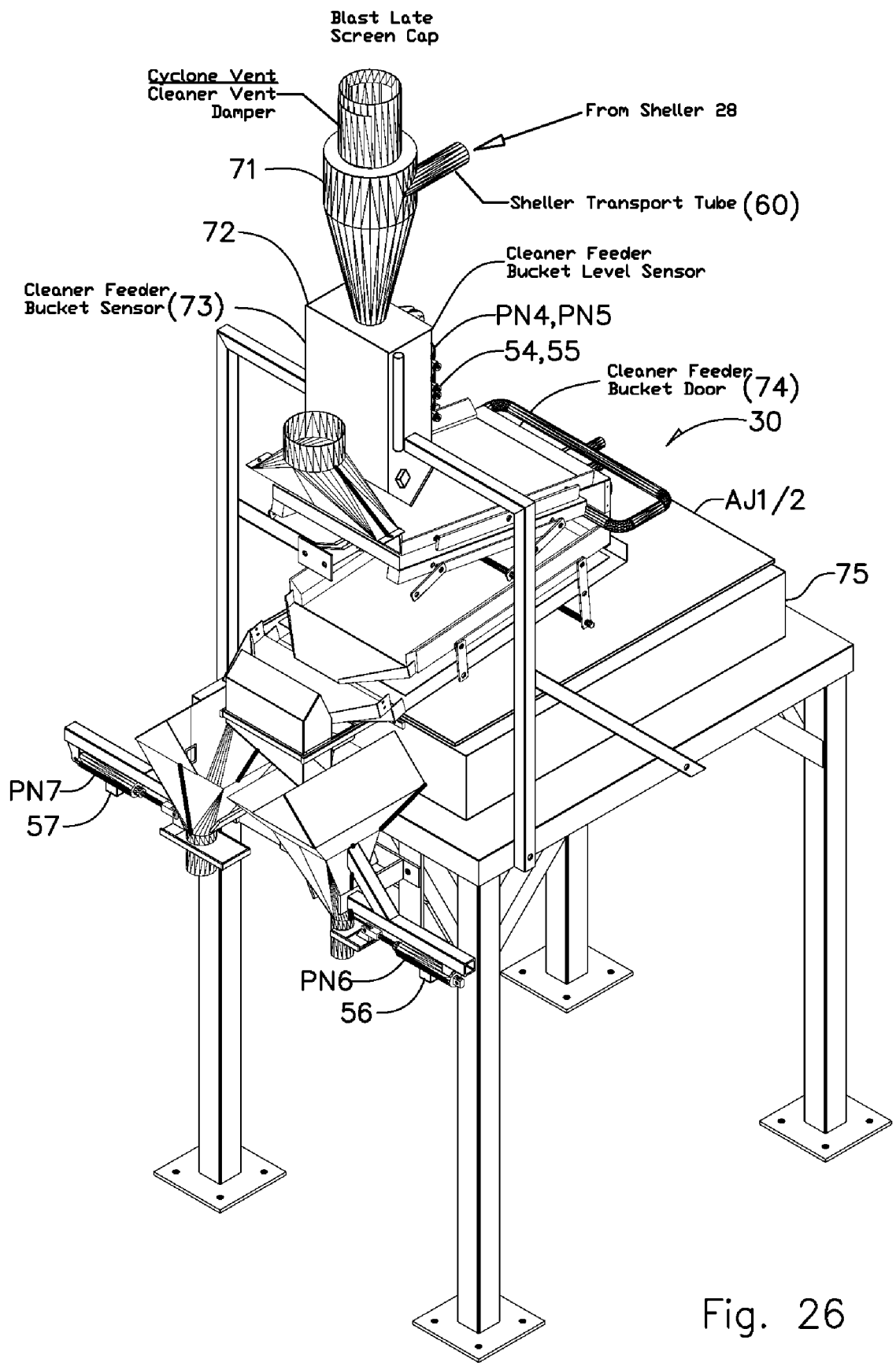

FIG. 26 is a perspective view of a seed cleaner station according to the system of FIG. 3.

Figure 27:
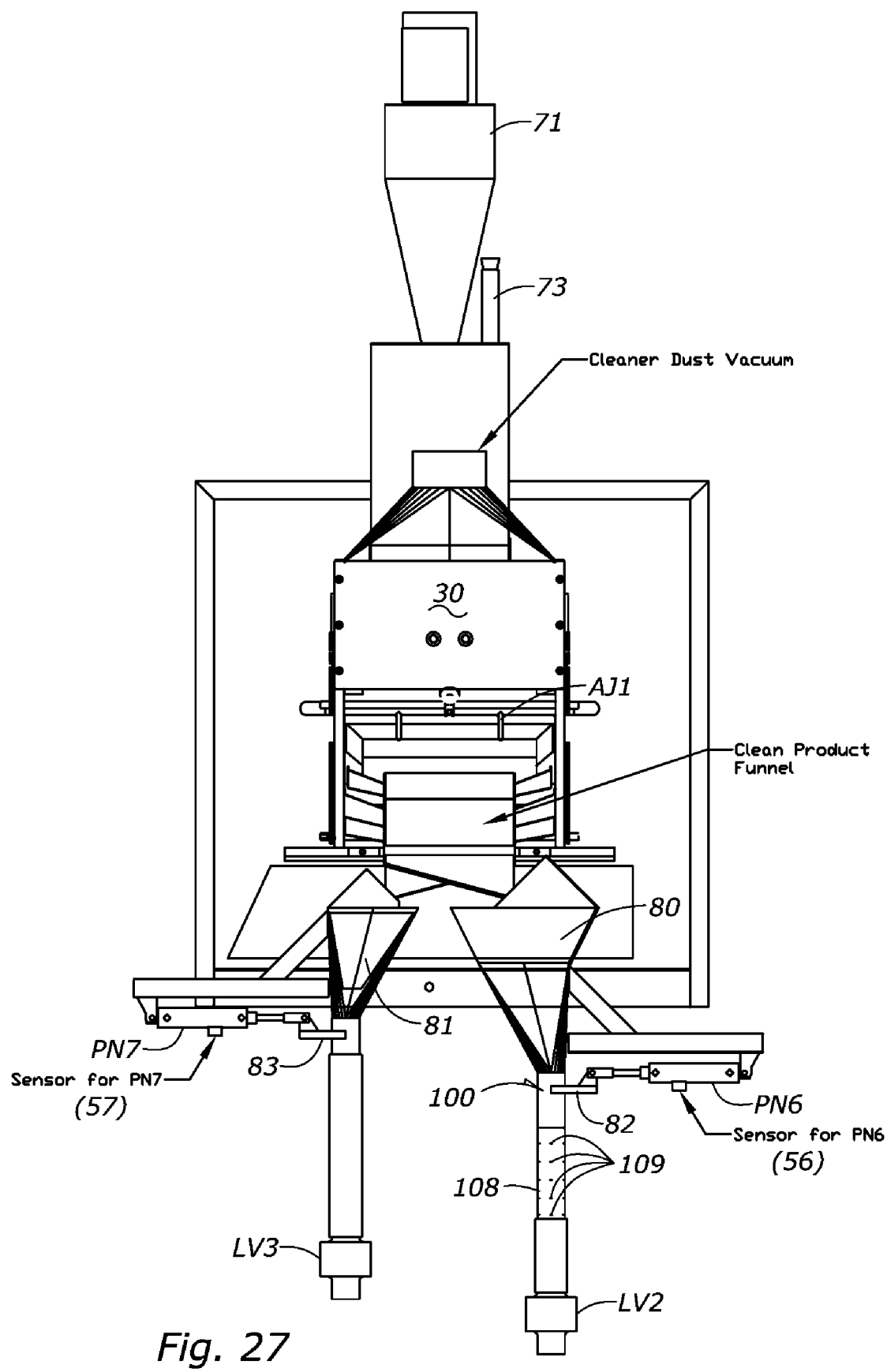

FIG. 27 is a front elevation of FIG. 26.

Figure 28A:
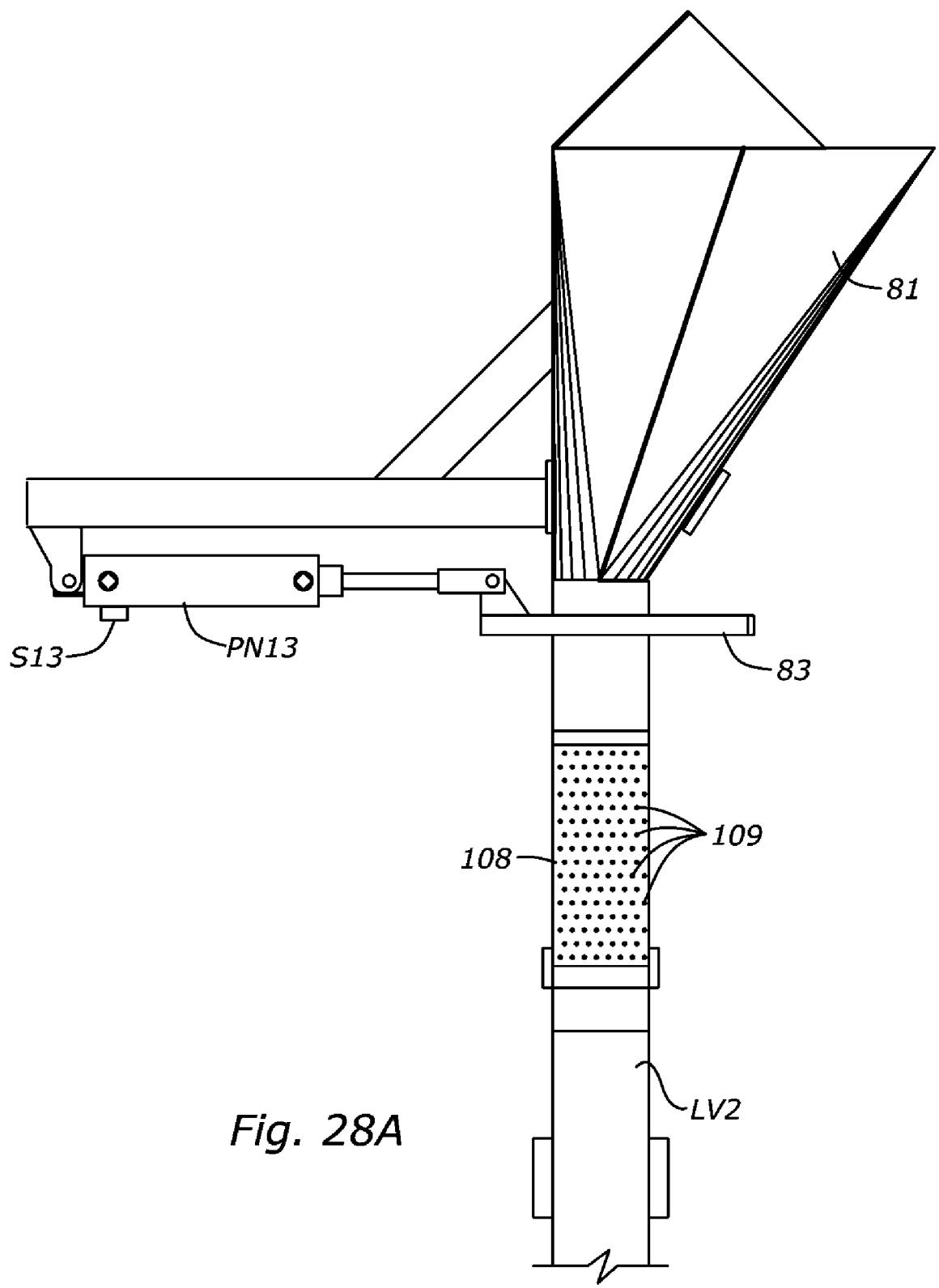

FIG. 28A is an enlarged isolated side elevation of a collection funnel and actuatable slide gate of FIG. 26.

Figure 28B:
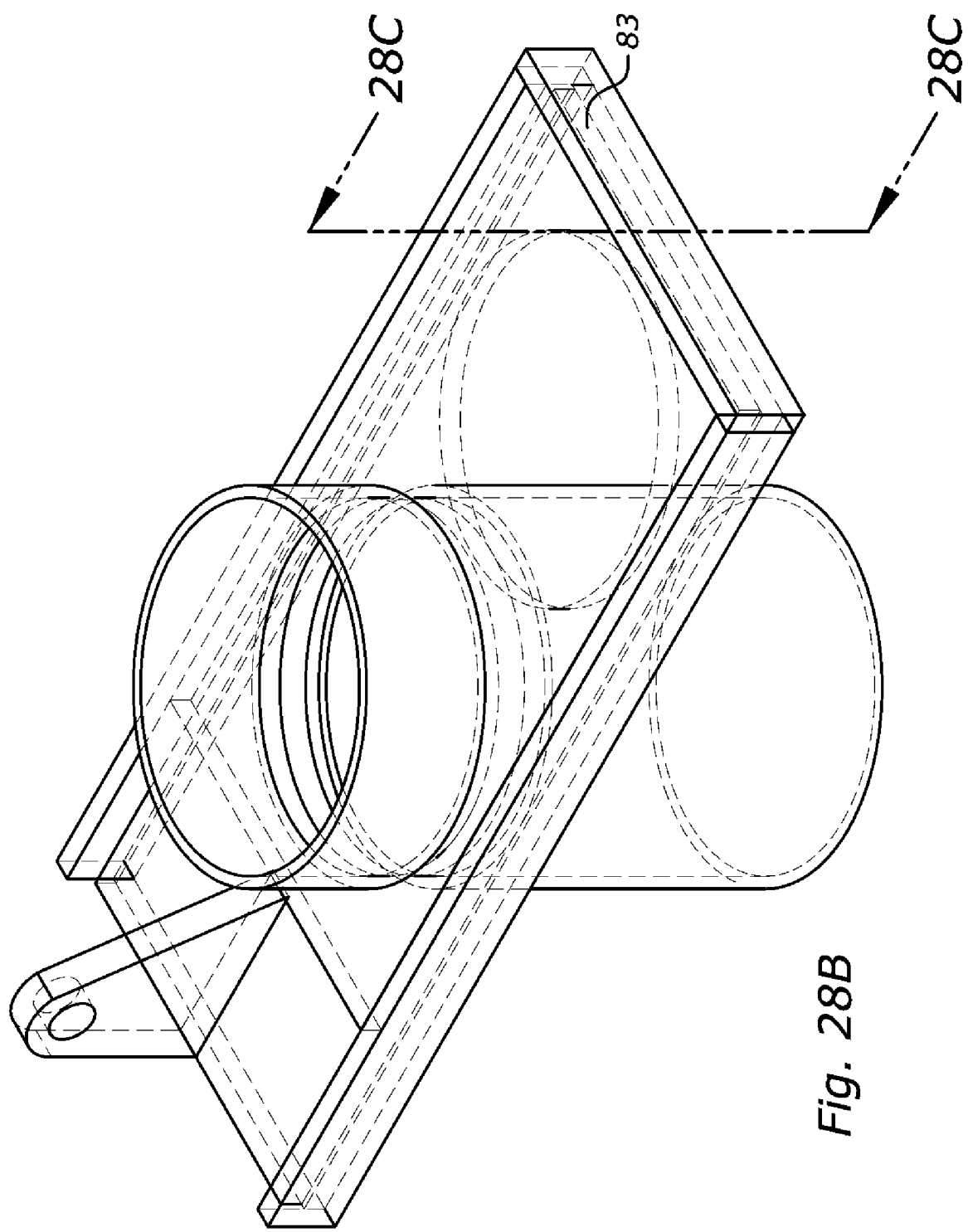

FIG. 28B is a still further enlarged perspective view of a slide gate for the collection funnel of FIG. 28A.

Figure 28C:
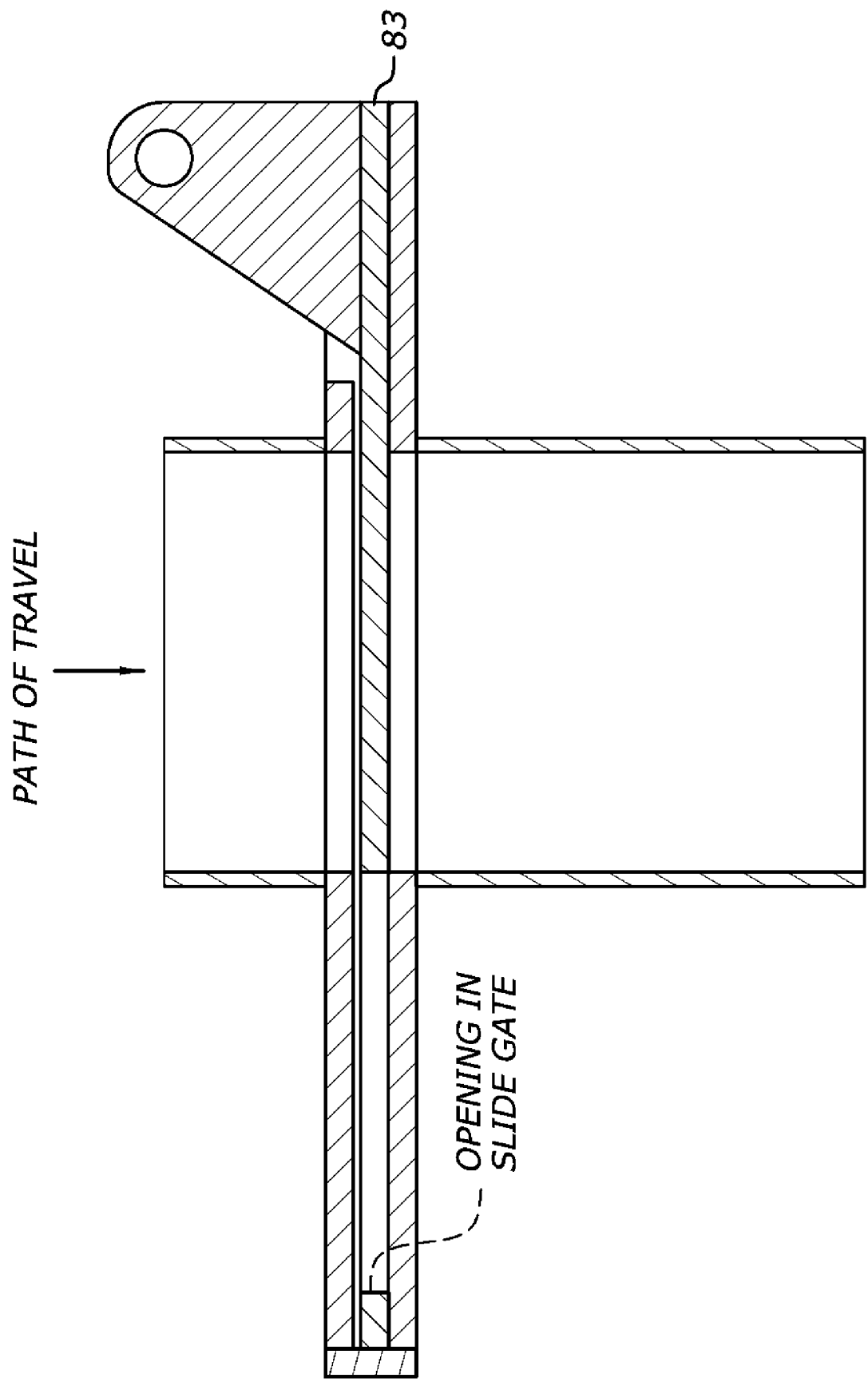

FIG. 28C is a sectional view taken along lines 28C-28C of FIG. 28B.

Figure 29:
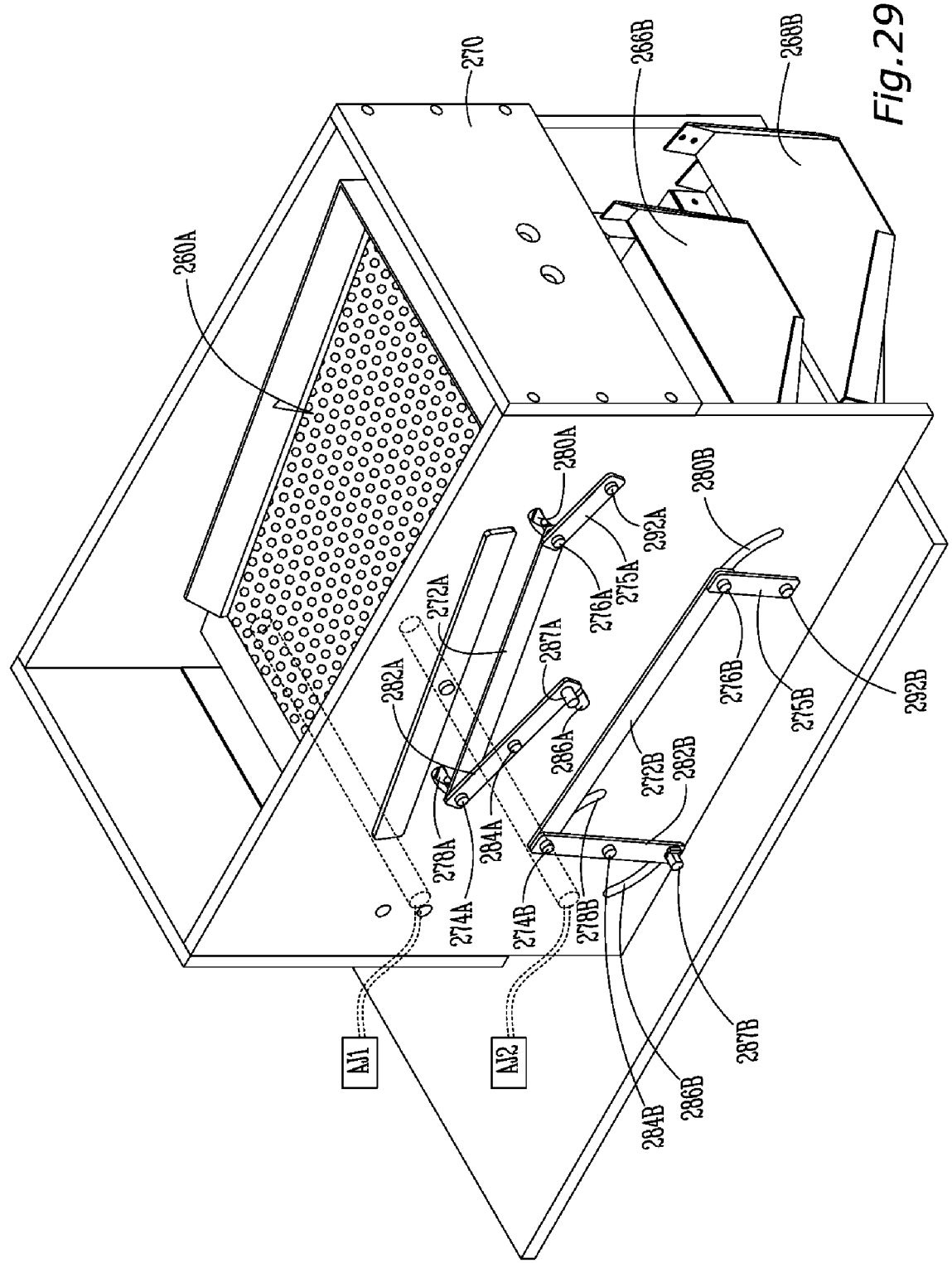

FIG. 29 is a perspective view of a self-cleaning seed cleaner with first (scalping) and second (sieving) sizing screens.

FIG. 30A is a side elevation view of the embodiment of self-cleaning seed cleaner of FIG. 29.

FIG. 30B is similar to FIG. 30A but shows a screen cleaning function for the embodiment of FIG. 29.

FIGS. 31 and 32 are diagrammatic views illustrating the principal of operation of the embodiment of FIGS. 30A and 30B.

Figure 33:
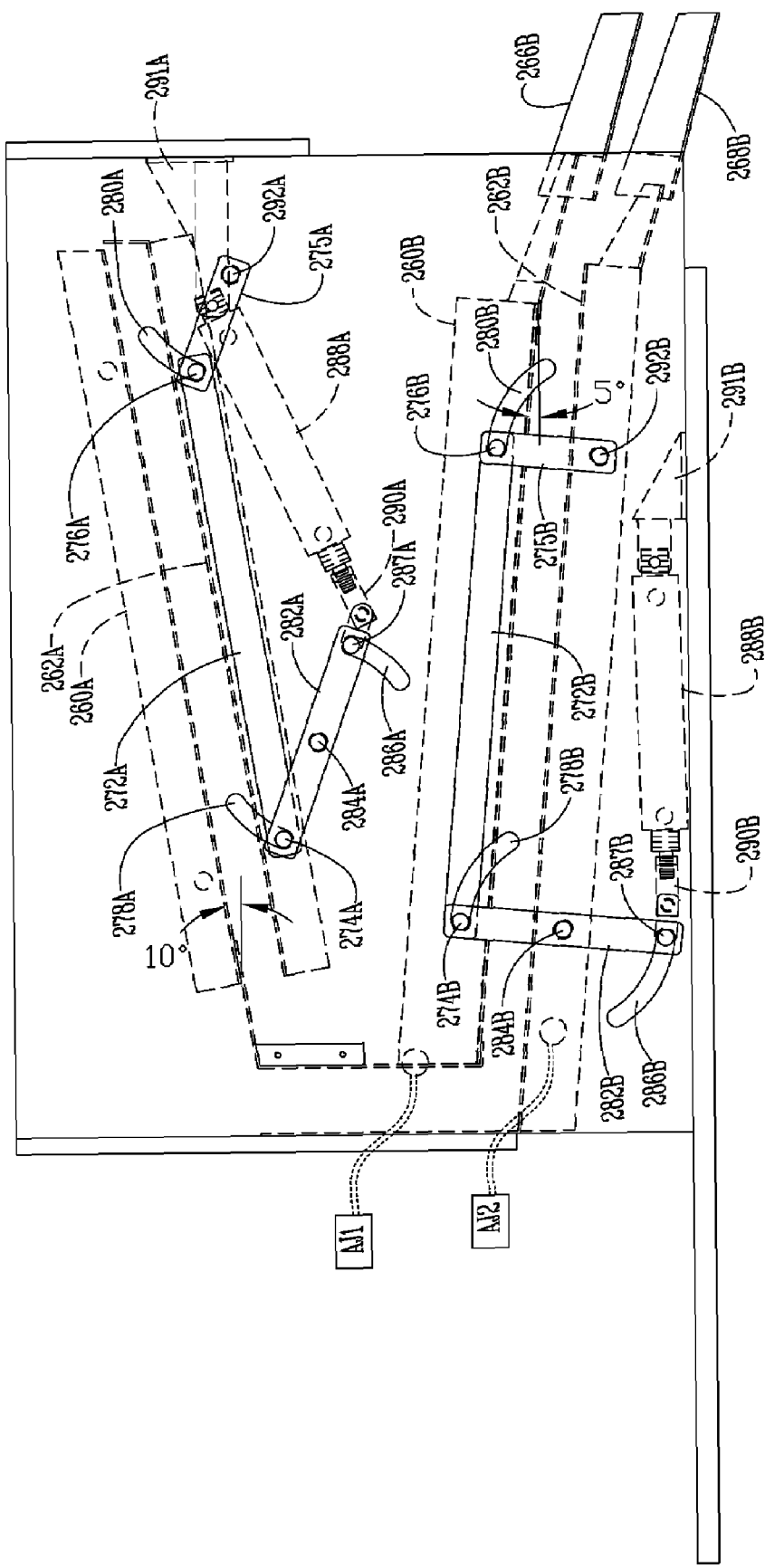

FIG. 33 is a side elevation view of FIG. 29 showing the seed cleaners in a normal operating position.

Figure 34:
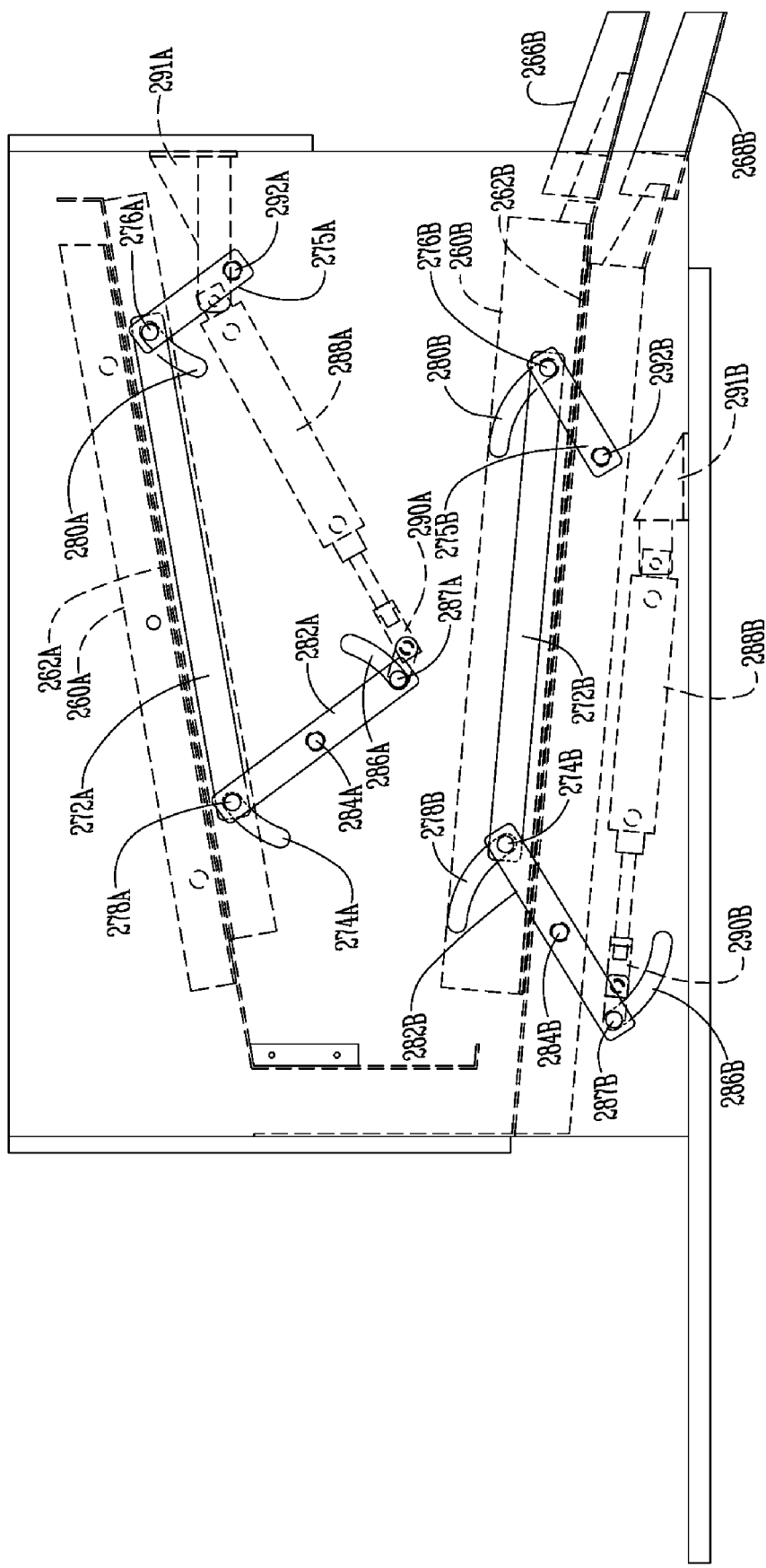

FIG. 34 is identical to FIG. 33 but showing the seed cleaners in the self-cleaning position.

Figure 35:
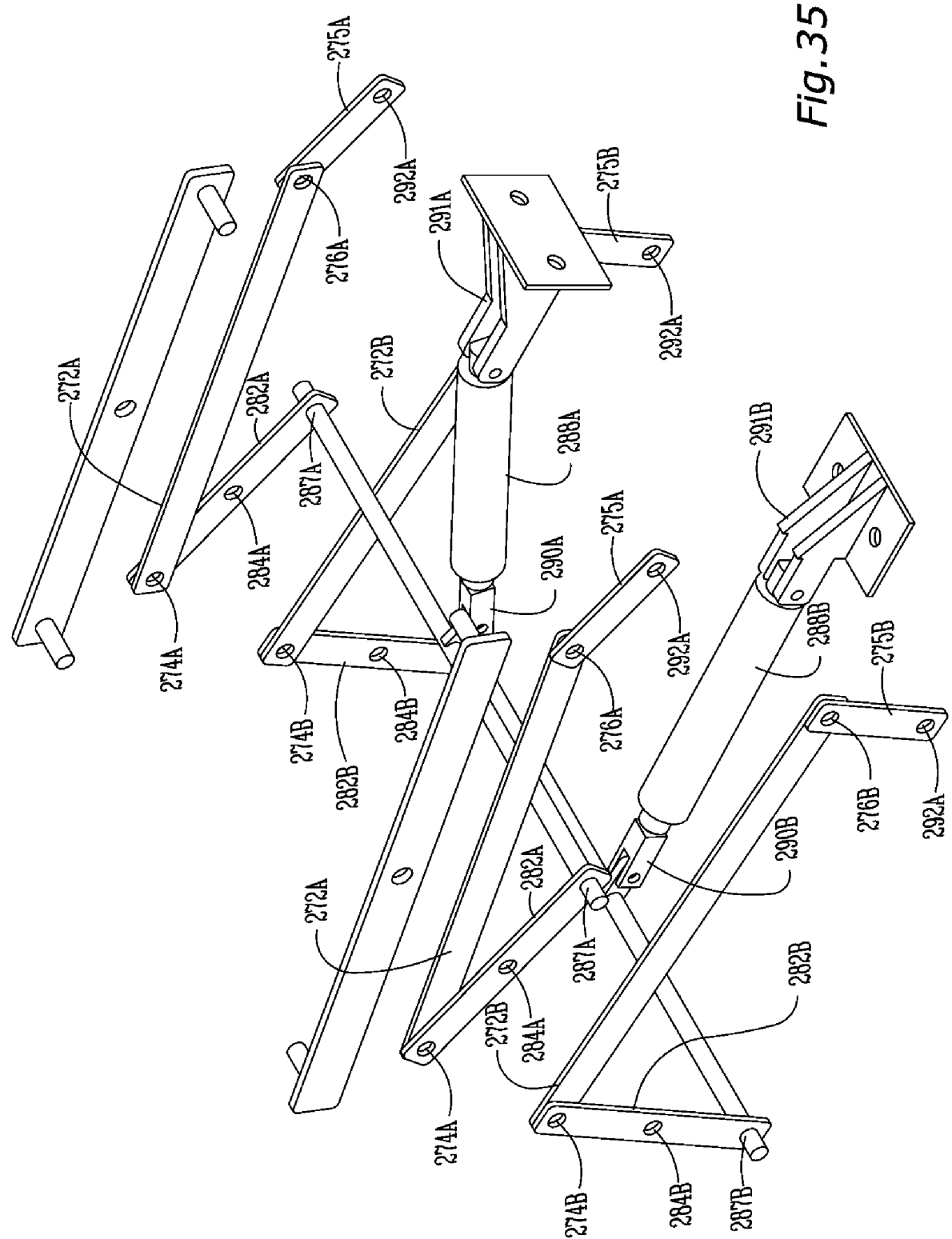

FIG. 35 is an isolated perspective view of the actuators and linkage that operate self-cleaning functions of the cleaner of FIGS. 33 and 34.

Figure 36:
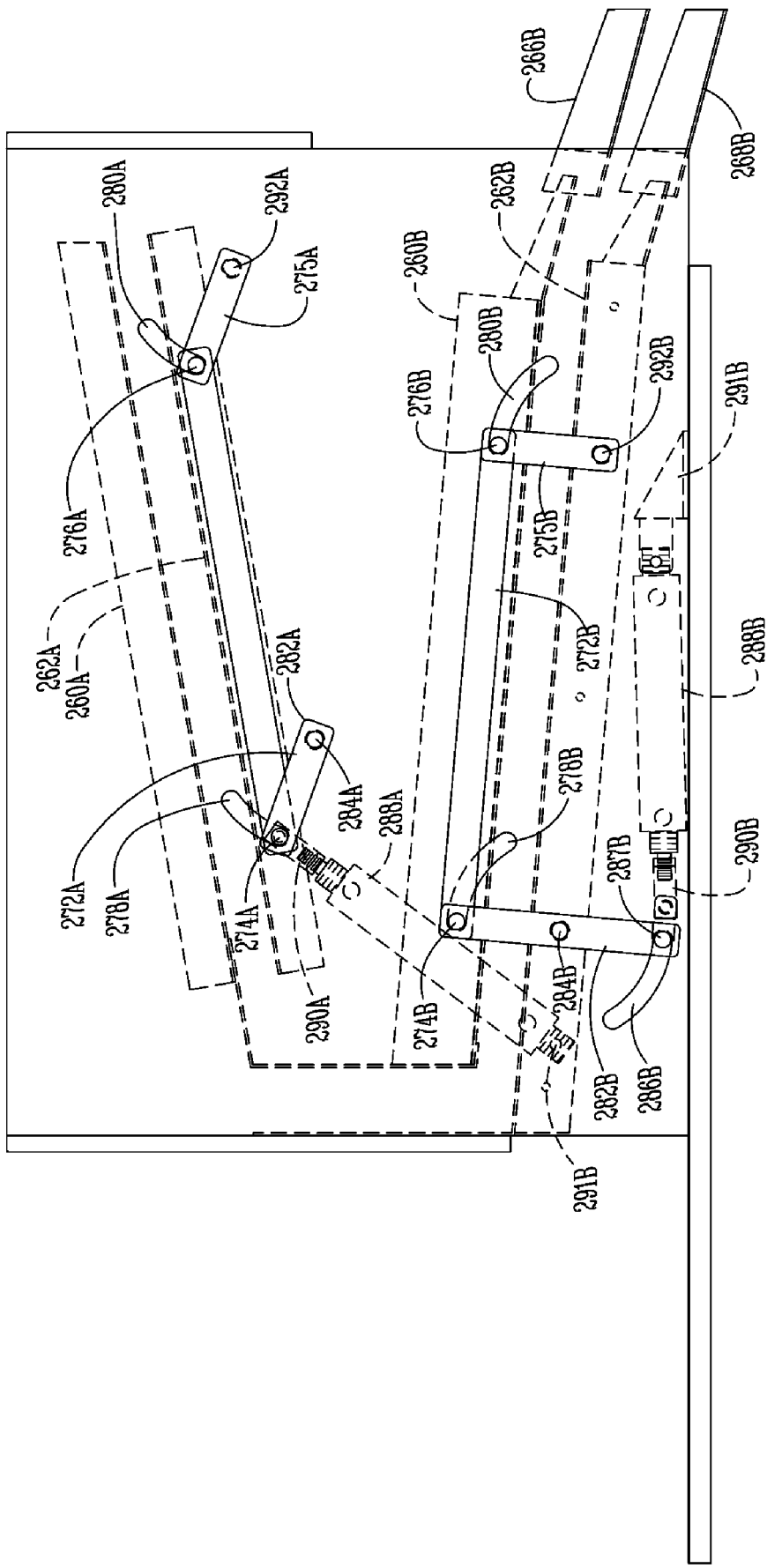

FIG. 36 is an alternative embodiment to FIG. 34.

Figure 37A:
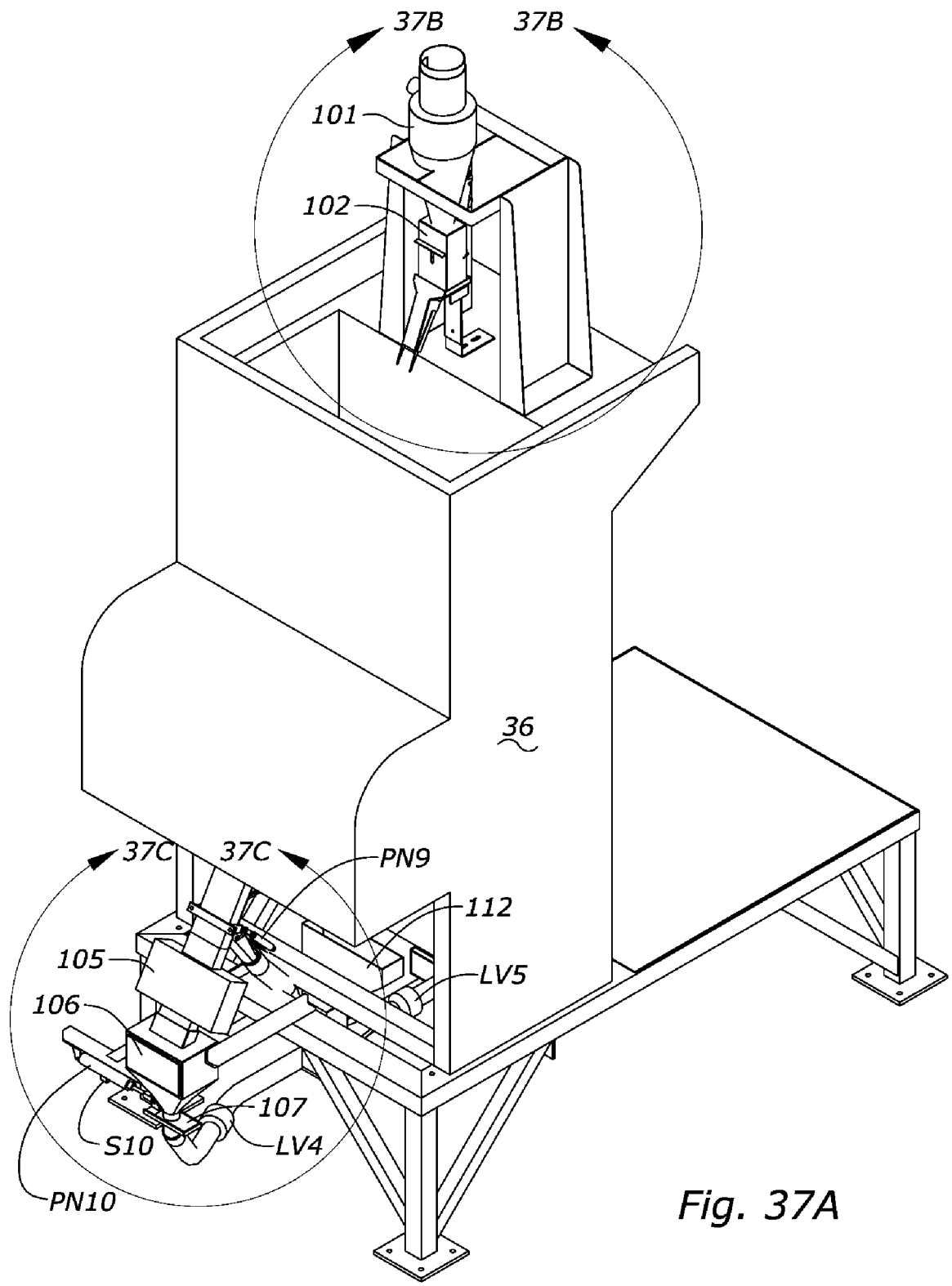

FIG. 37A is a perspective view of an embodiment of a seed cleaner station.

Figure 37B:
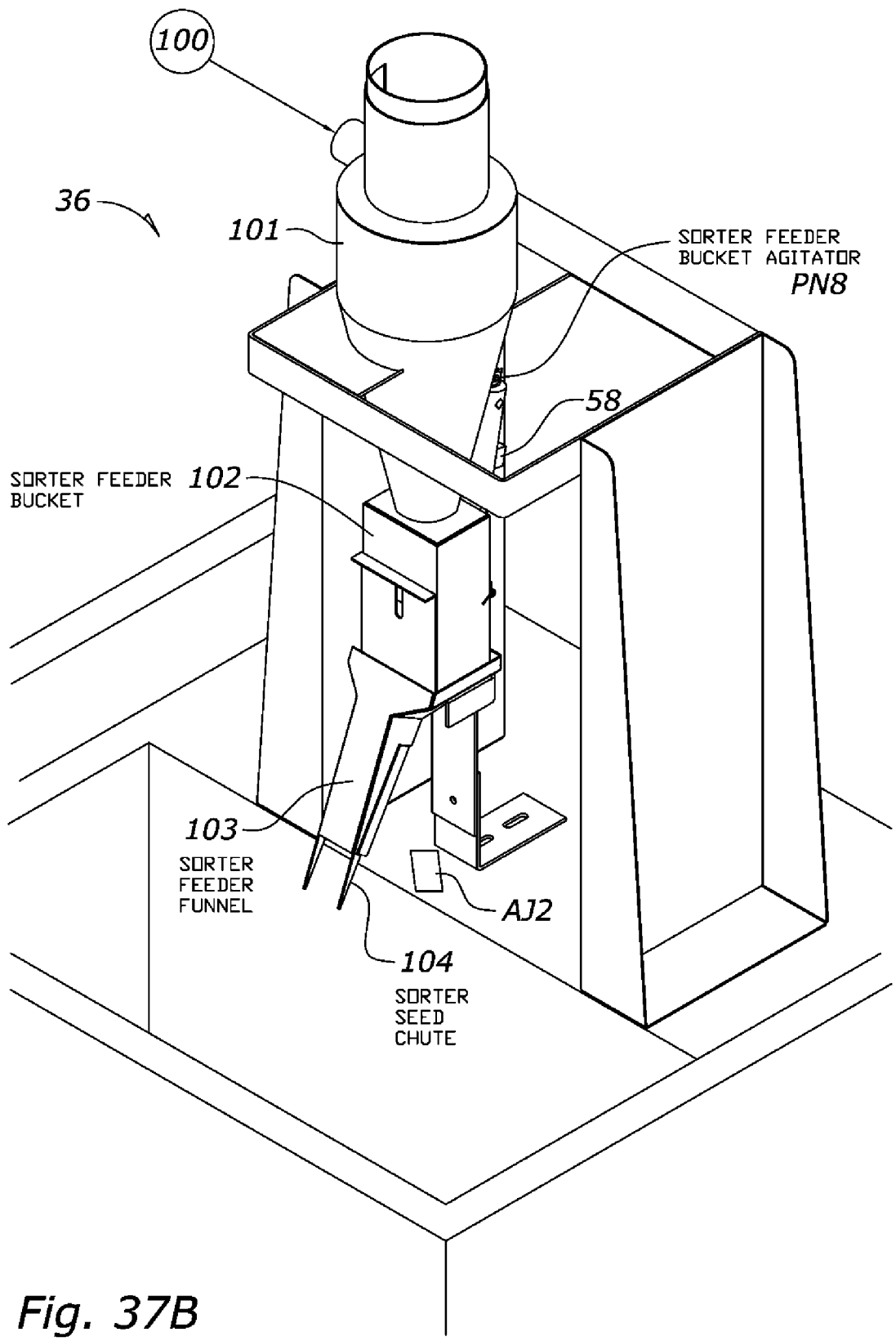

FIG. 37B is an enlarged isolated perspective view of the cleaner feeder for the station of FIG. 37A.

Figure 37C:
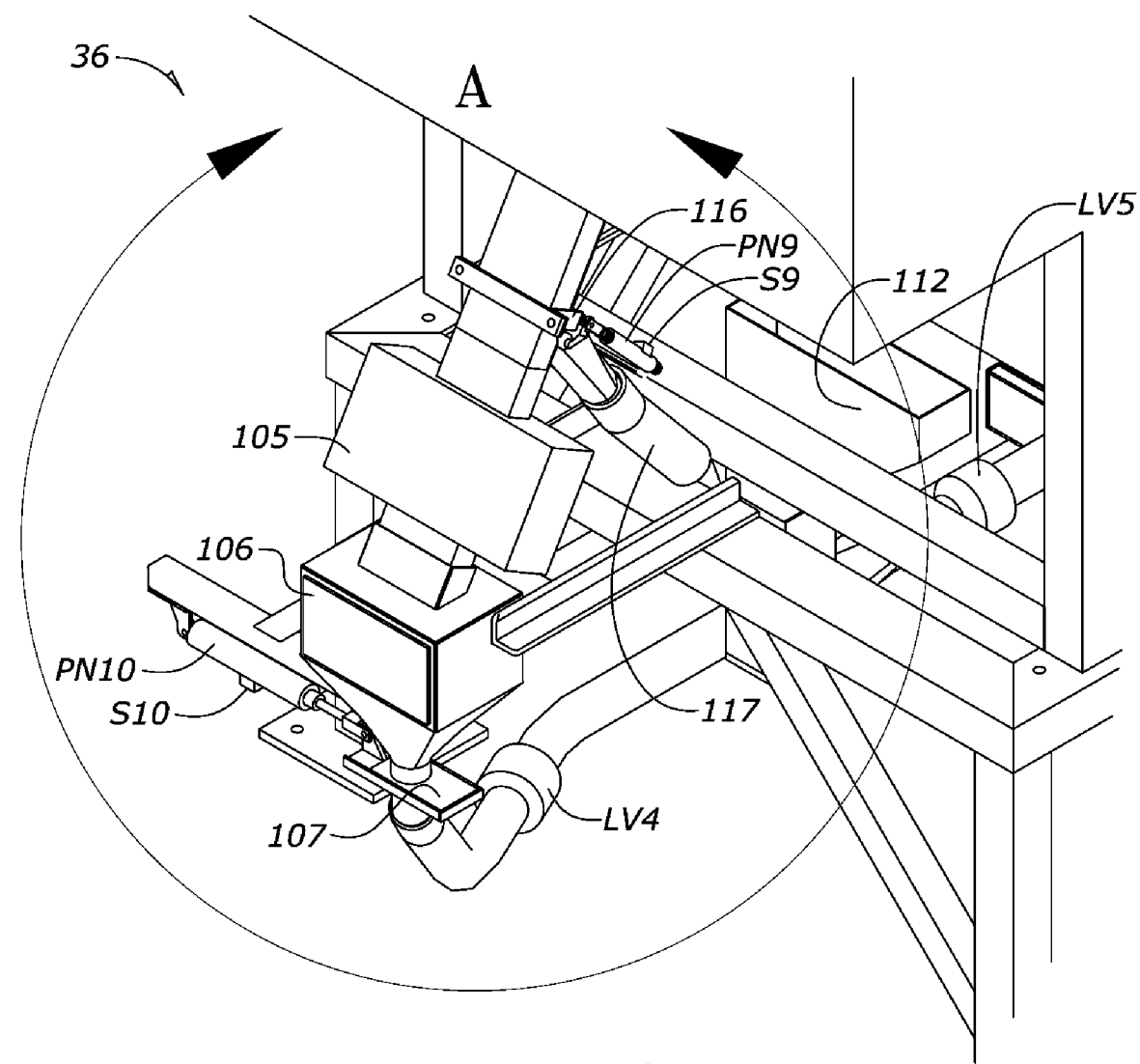

FIG. 37C is an enlarged isolated perspective view of a seed counter attached to the outlet of the seed cleaner of FIG. 37A.

Figure 38:
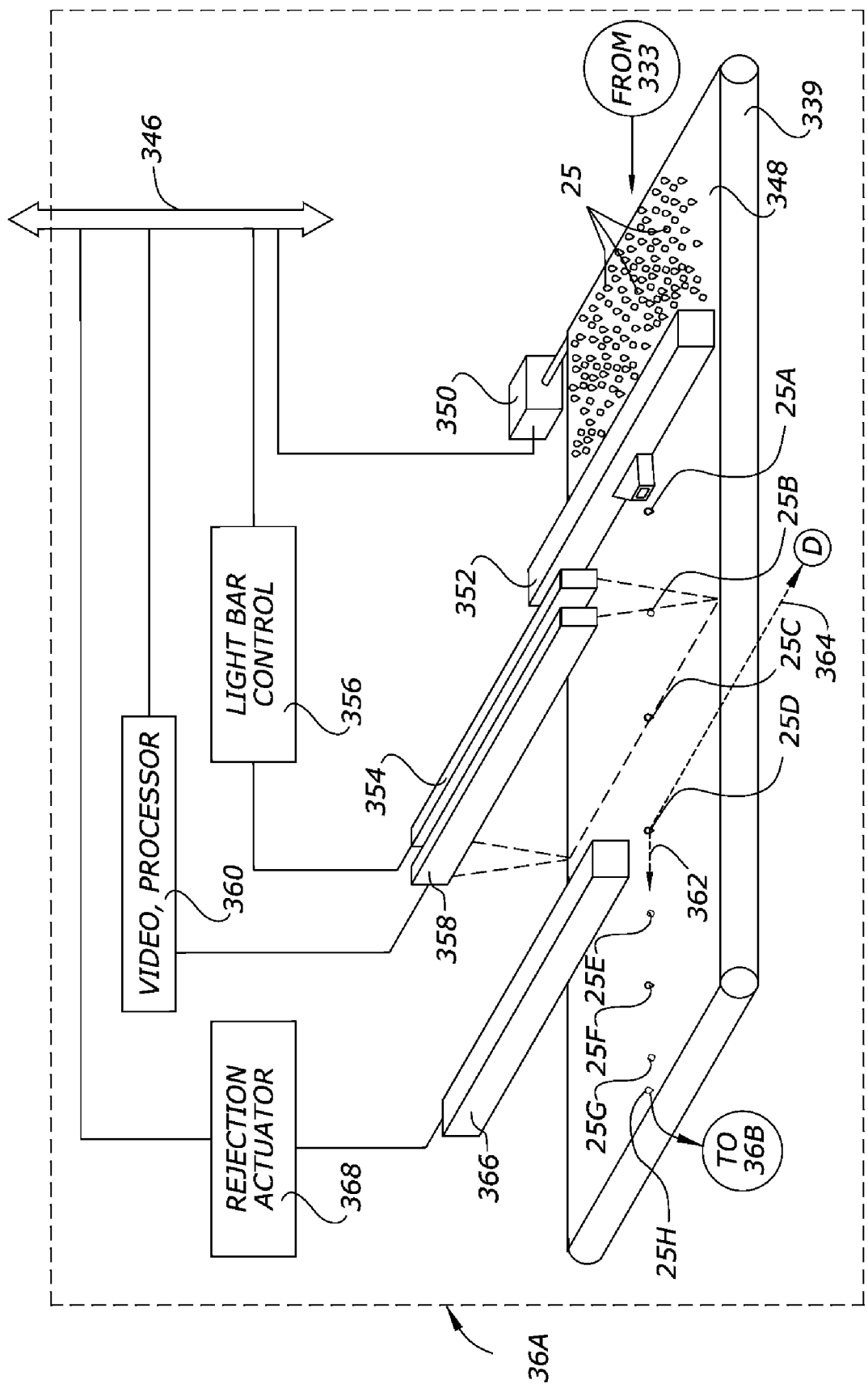

FIG. 38 is a diagrammatic perspective view illustrating the functions of a color sorter.

Figure 39:
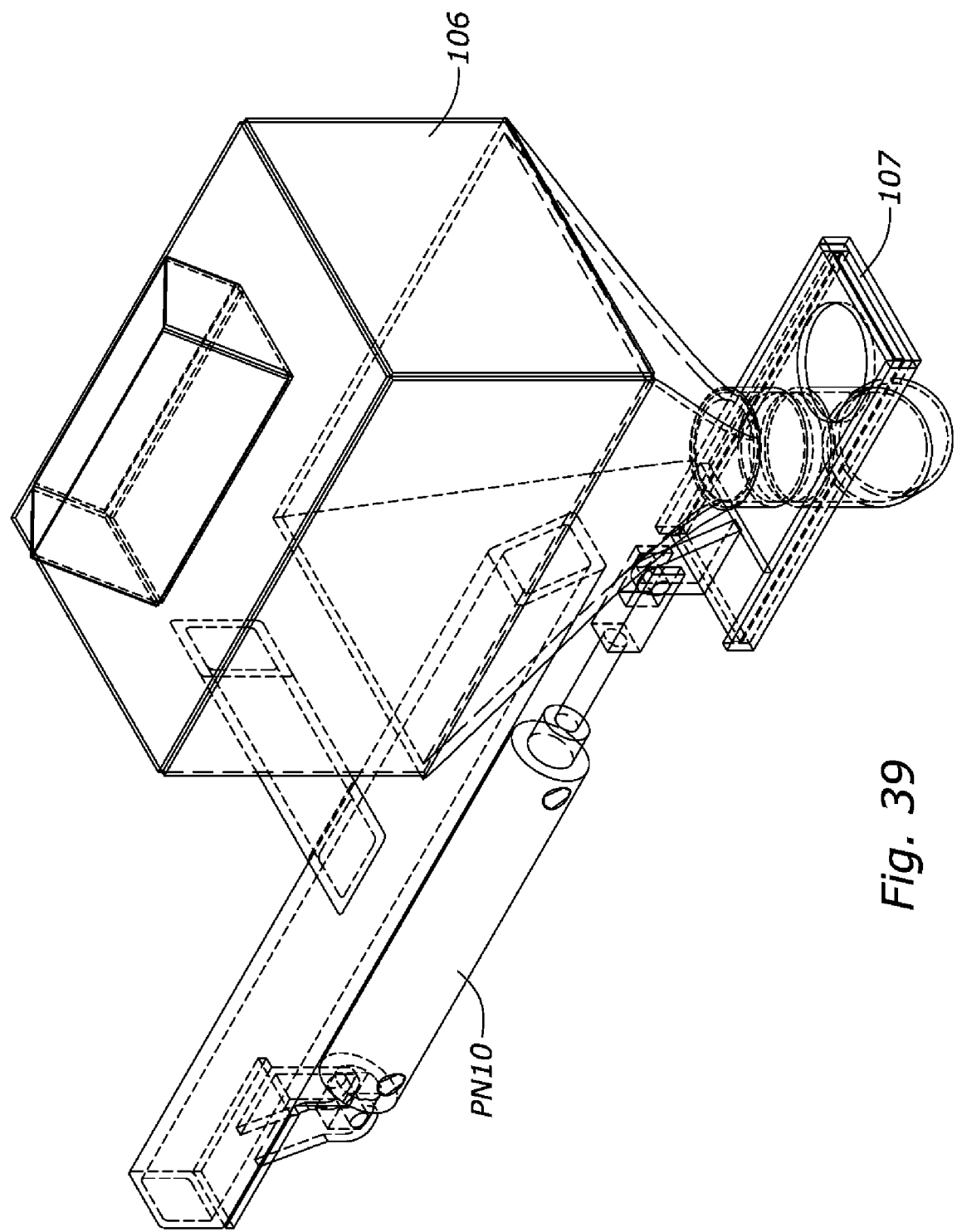

FIG. 39 is an enlarged isolated perspective view of a sorter bucket from the outlet end of the sorter of FIG. 37A.

Figure 40:
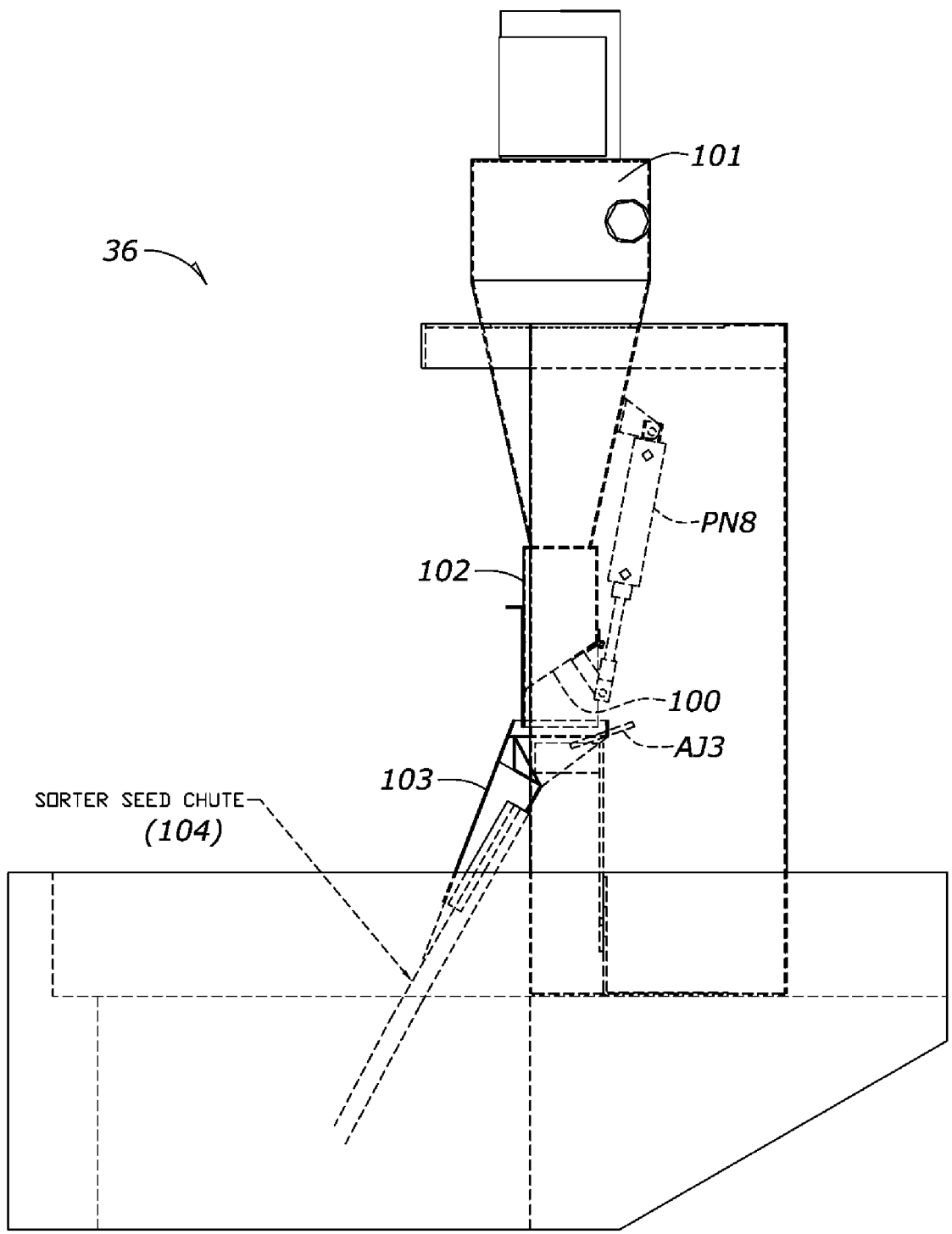

FIG. 40 is a side elevation view of the sorter feeder and sorter seed chute of FIG. 37A.

Figure 41:
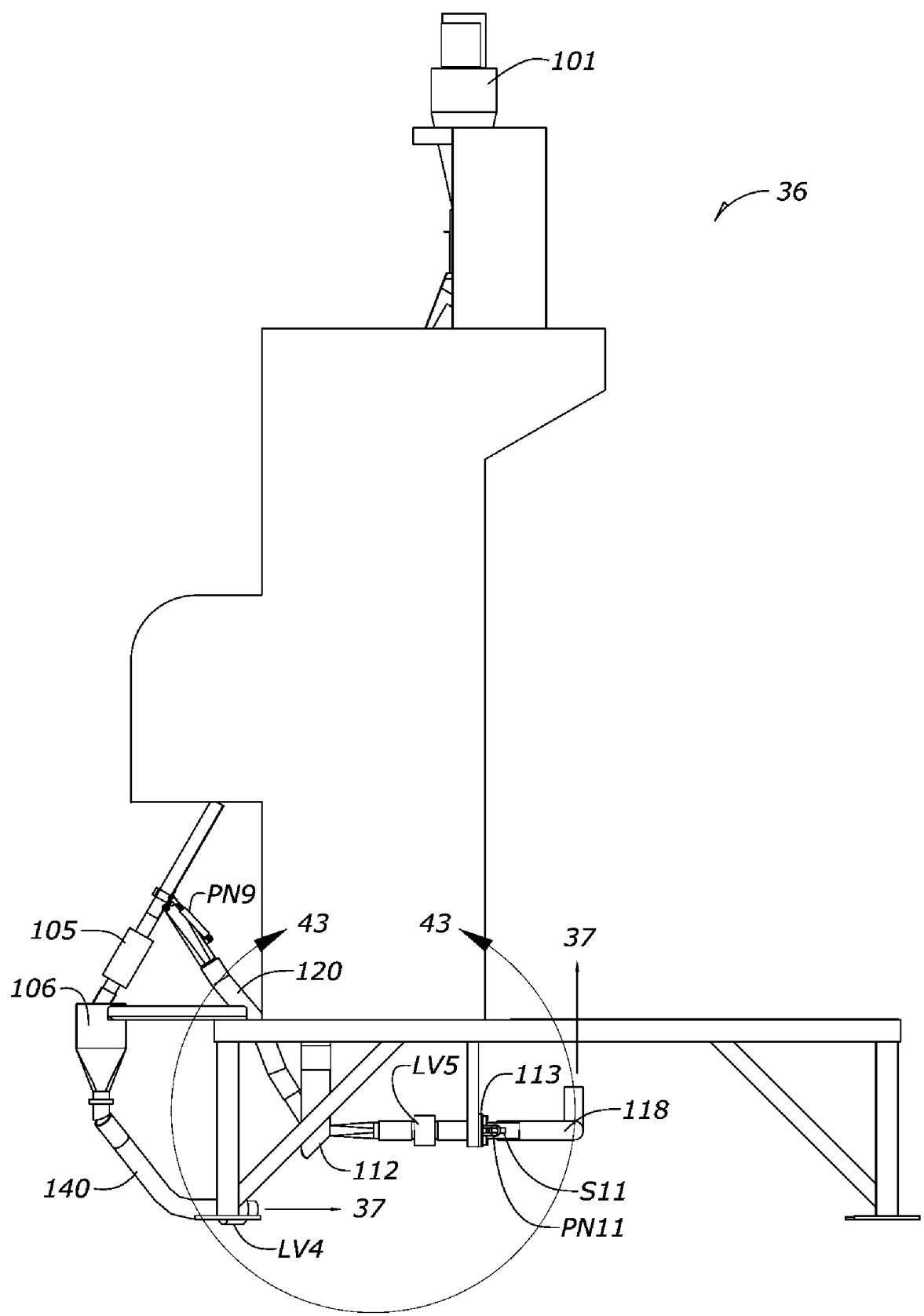

FIG. 41 is a side elevation of the color sorter station of FIG. 37A.

Figure 42:
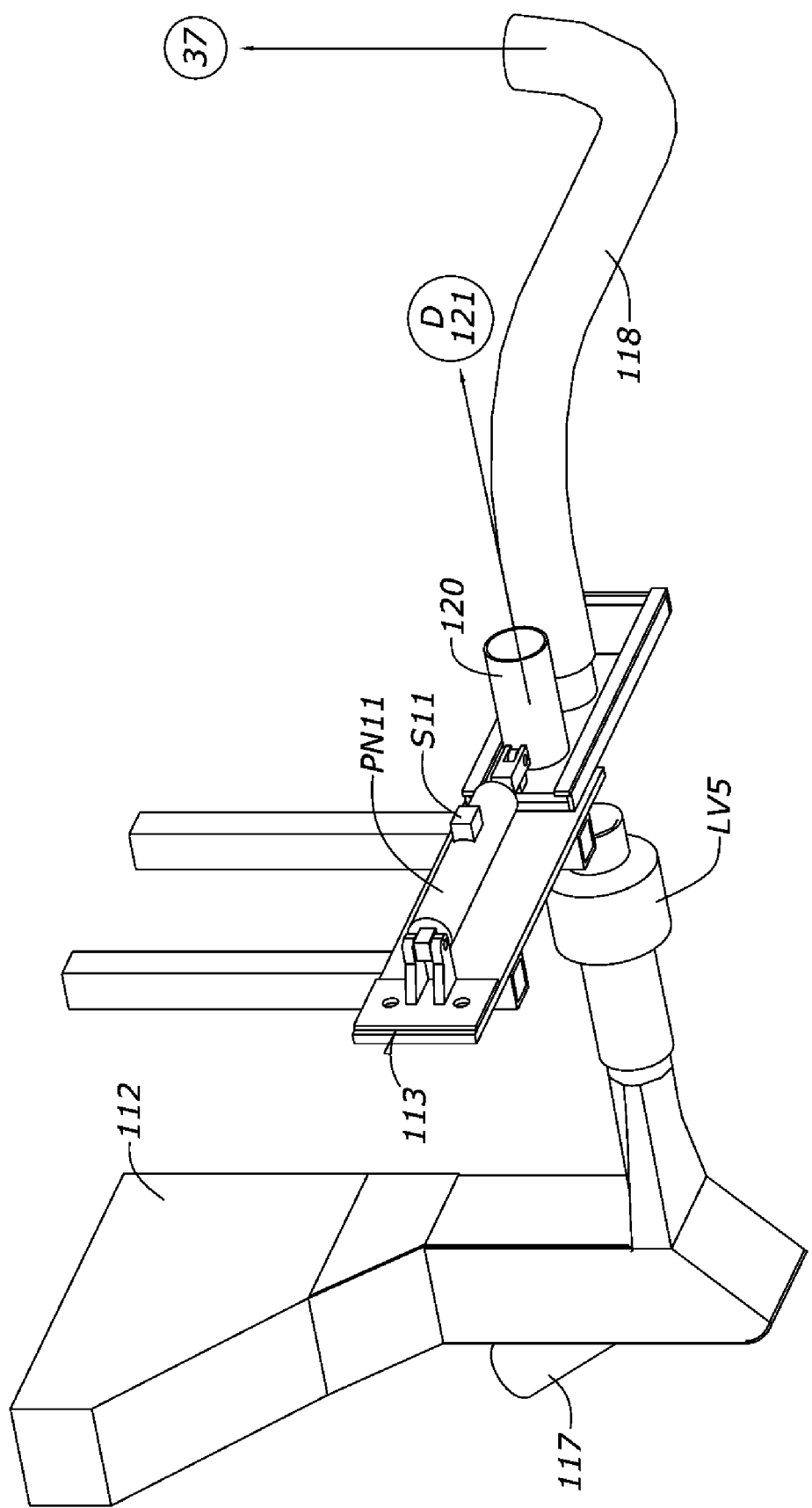

FIG. 42 is an enlarged perspective view of a swap valve and sorter funnel of FIG. 41.

Figure 43:
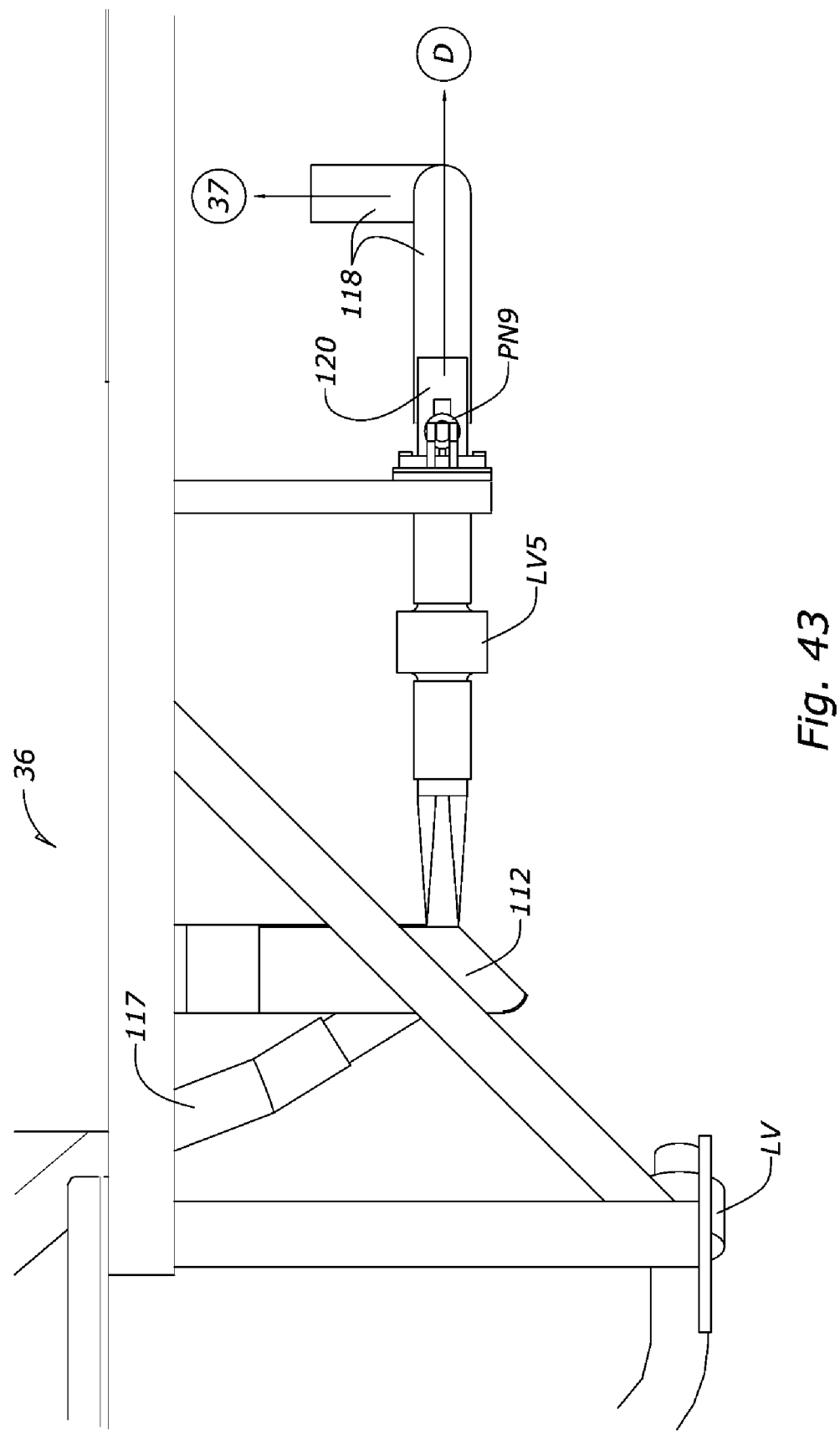

FIG. 43 is an enlarged elevation taken at line 43-43 of FIG. 41.

Figure 44:
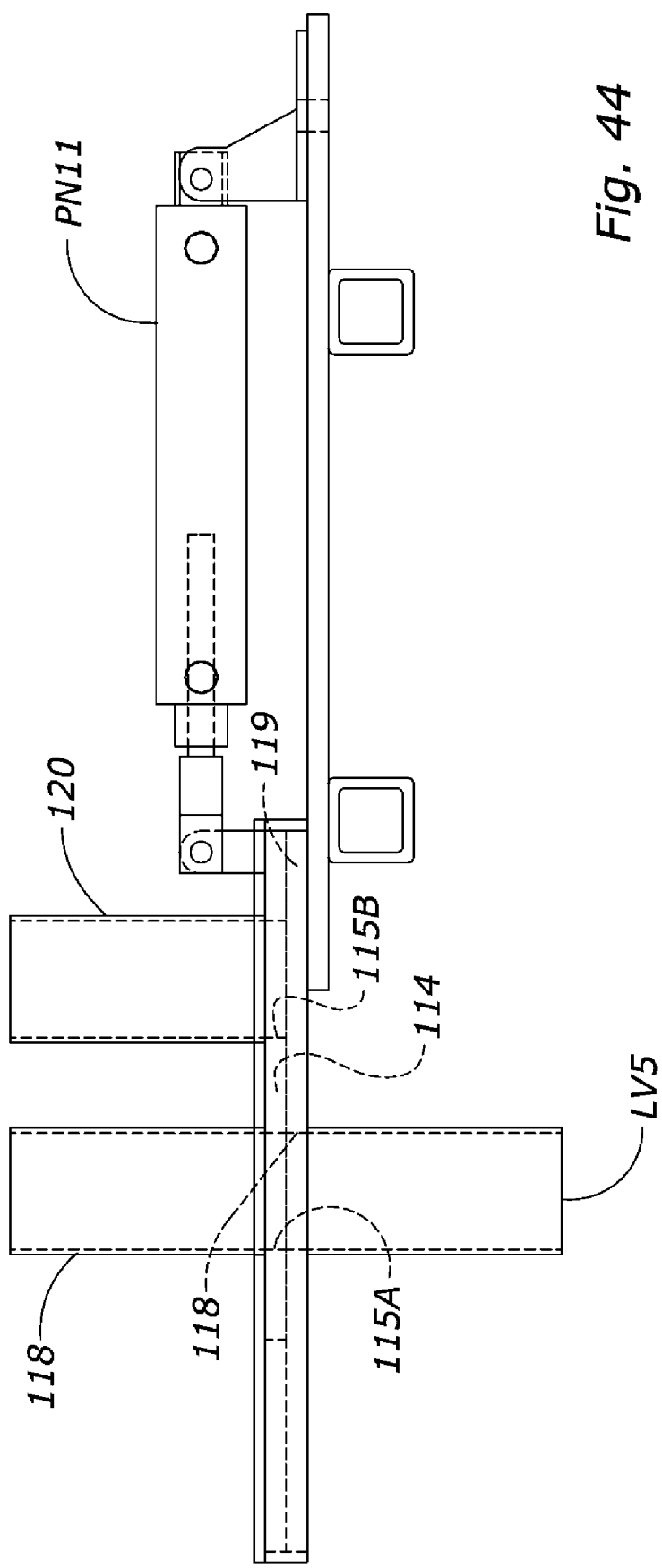

FIG. 44 is an isolated top plan view of a slide gate of the swap valve of FIG. 42.

Figure 45:
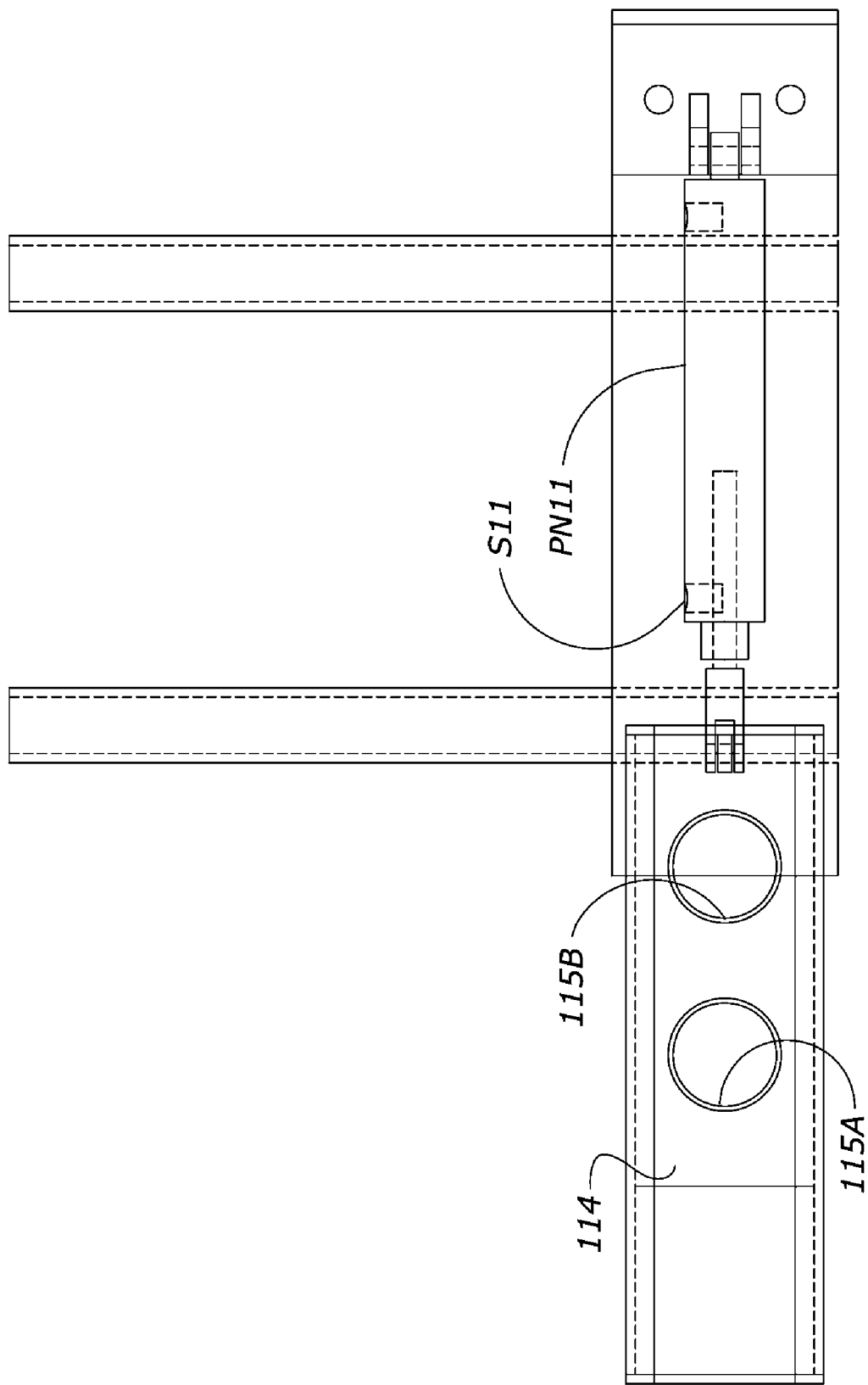

FIG. 45 is an isolated elevation view of the slide gate of FIG. 44.

Figure 46:
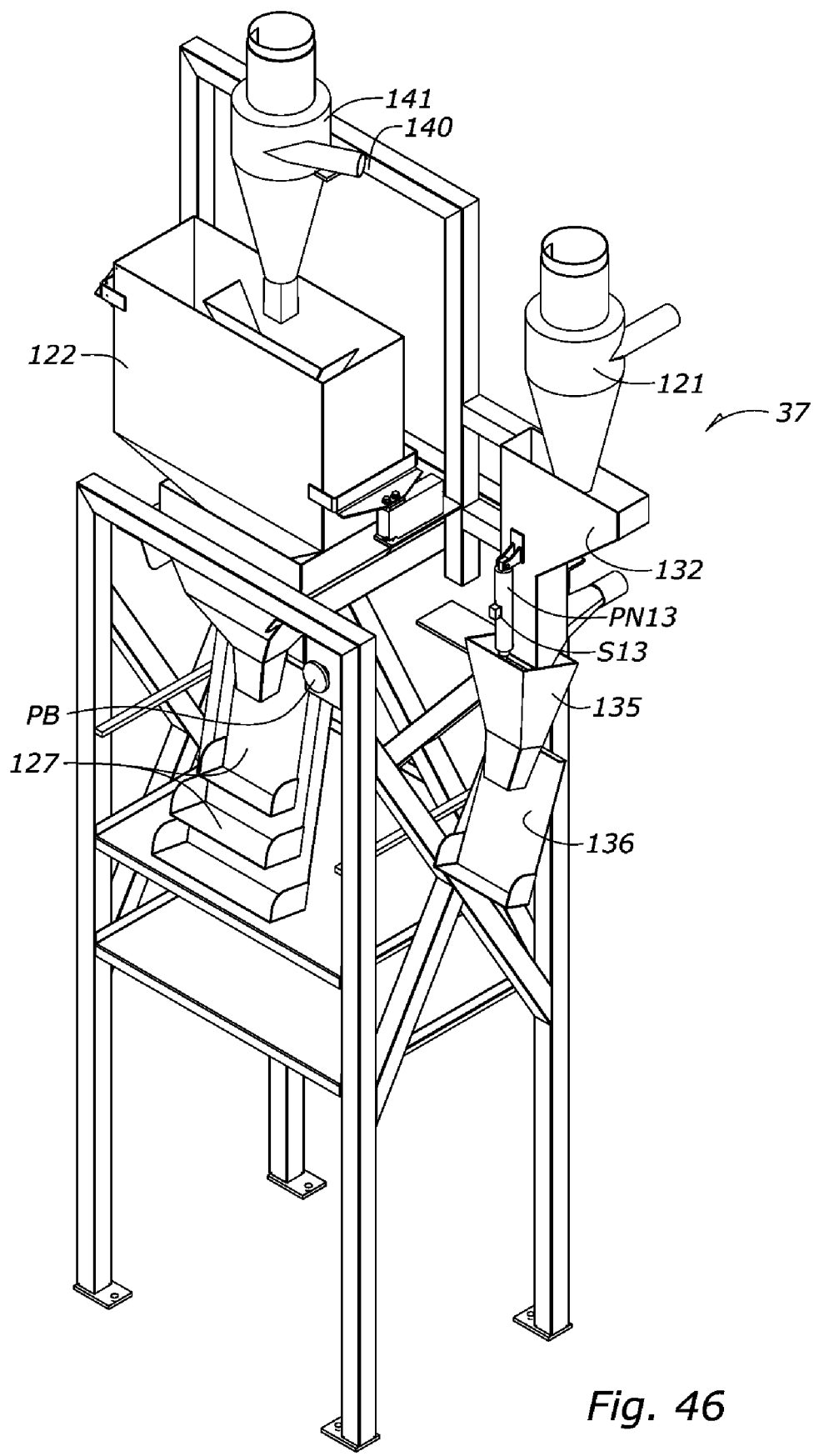

FIG. 46 is a perspective view of an embodiment of a bagging station of the system of FIG. 37A.

Figure 47:
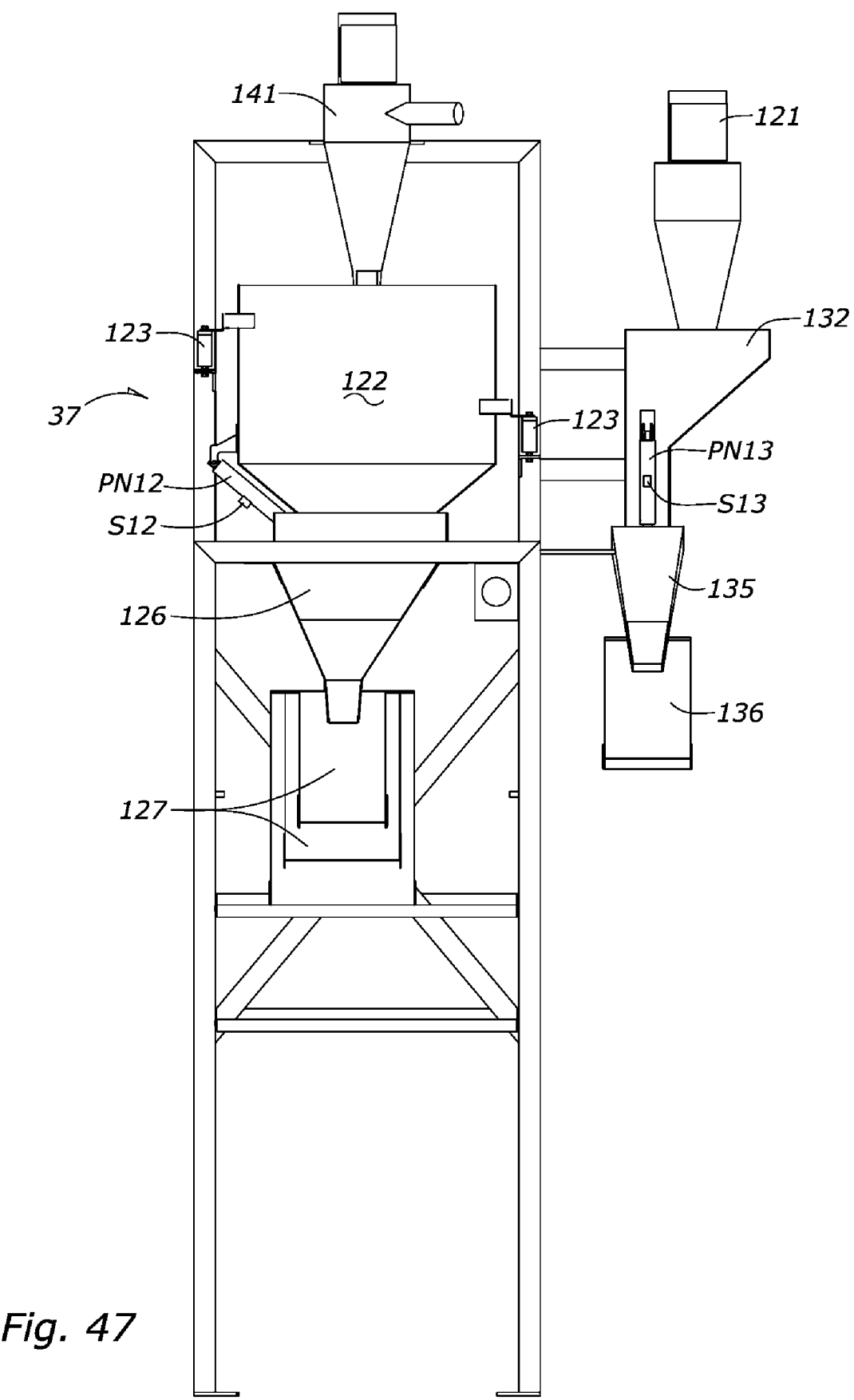

FIG. 47 is a front elevation of FIG. 46.

Figure 48:
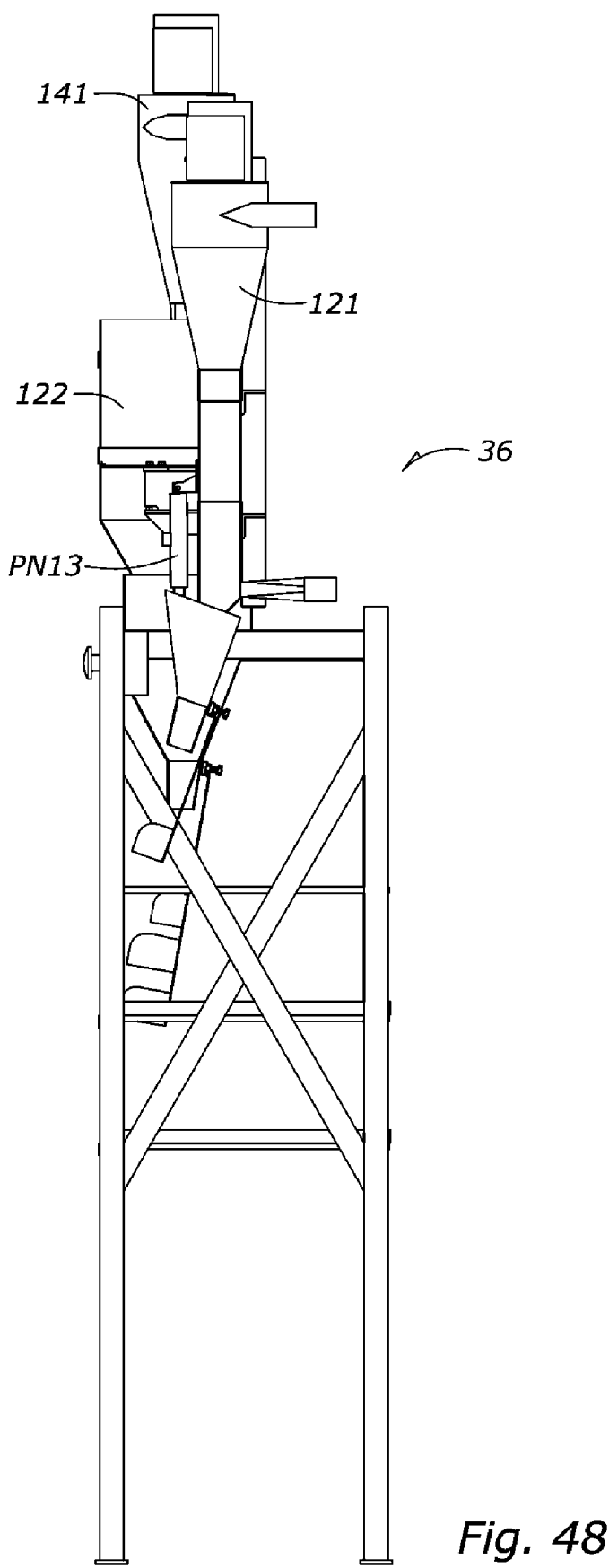

FIG. 48 is a side elevation of FIG. 46.

Figure 49:
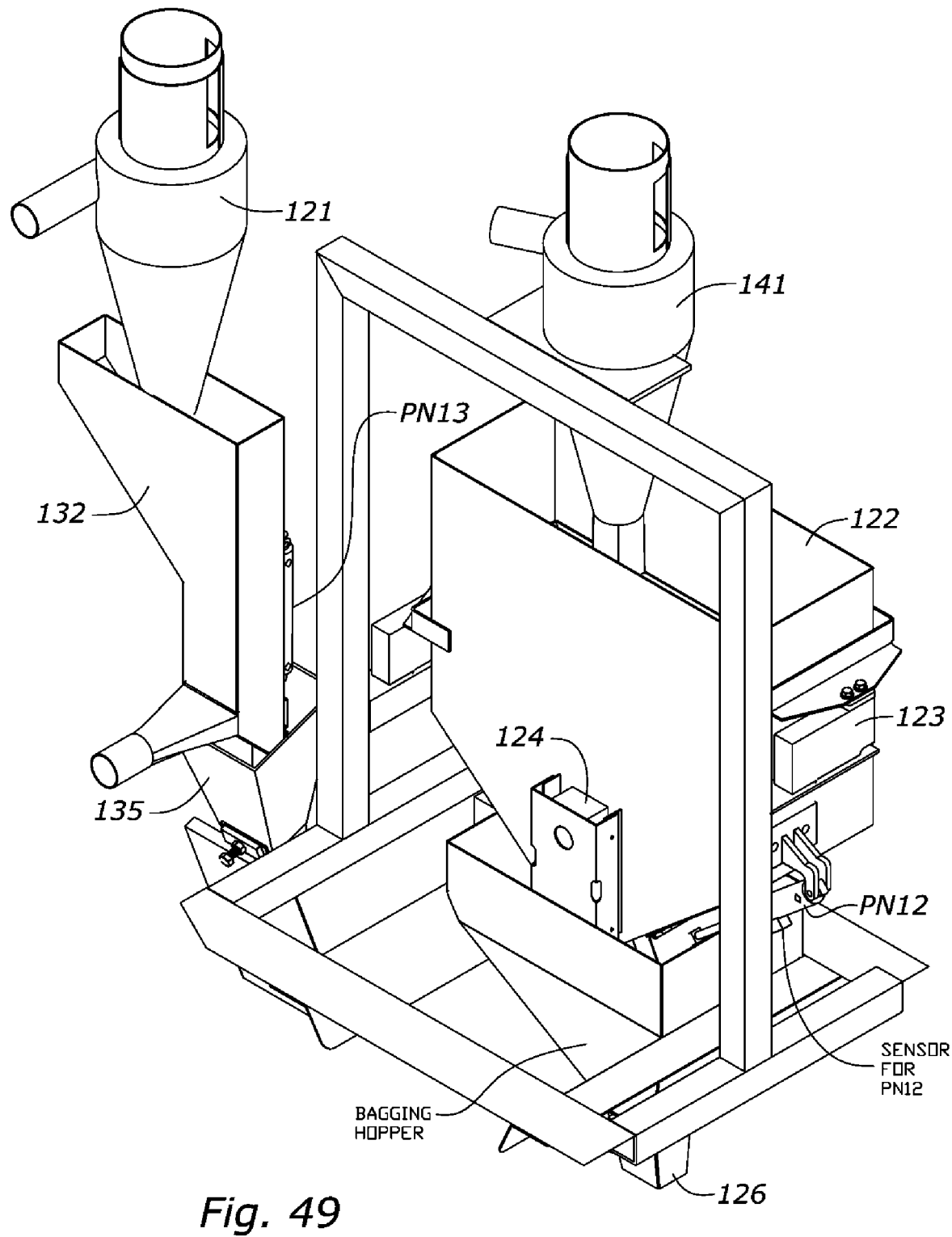

FIG. 49 is an enlarged perspective view of the working components of the bagging station of FIG. 46.

Figure 50:
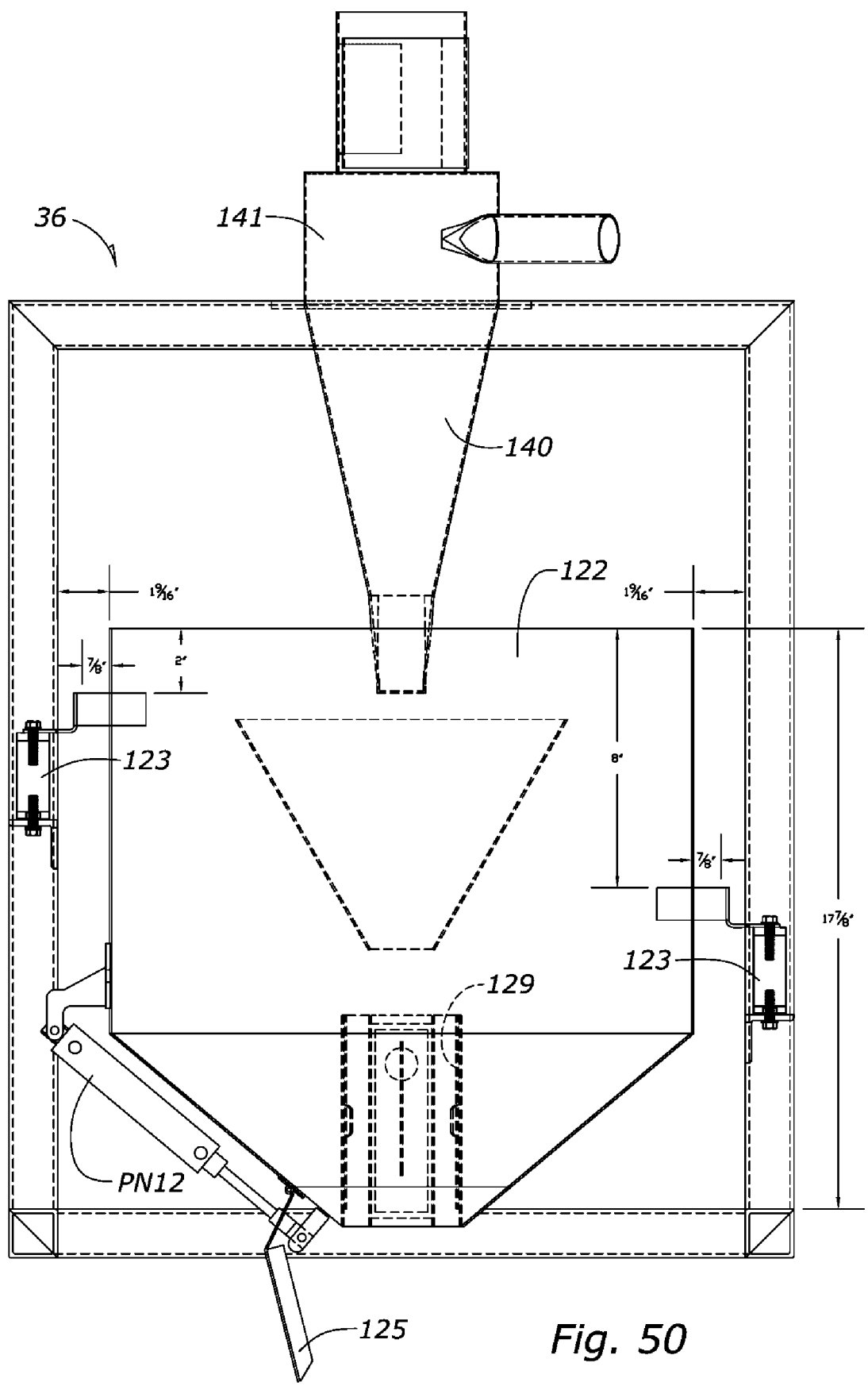

FIG. 50 is a still further enlarged front elevation of FIG. 47 showing certain internal components in ghost lines.

Figure 51:
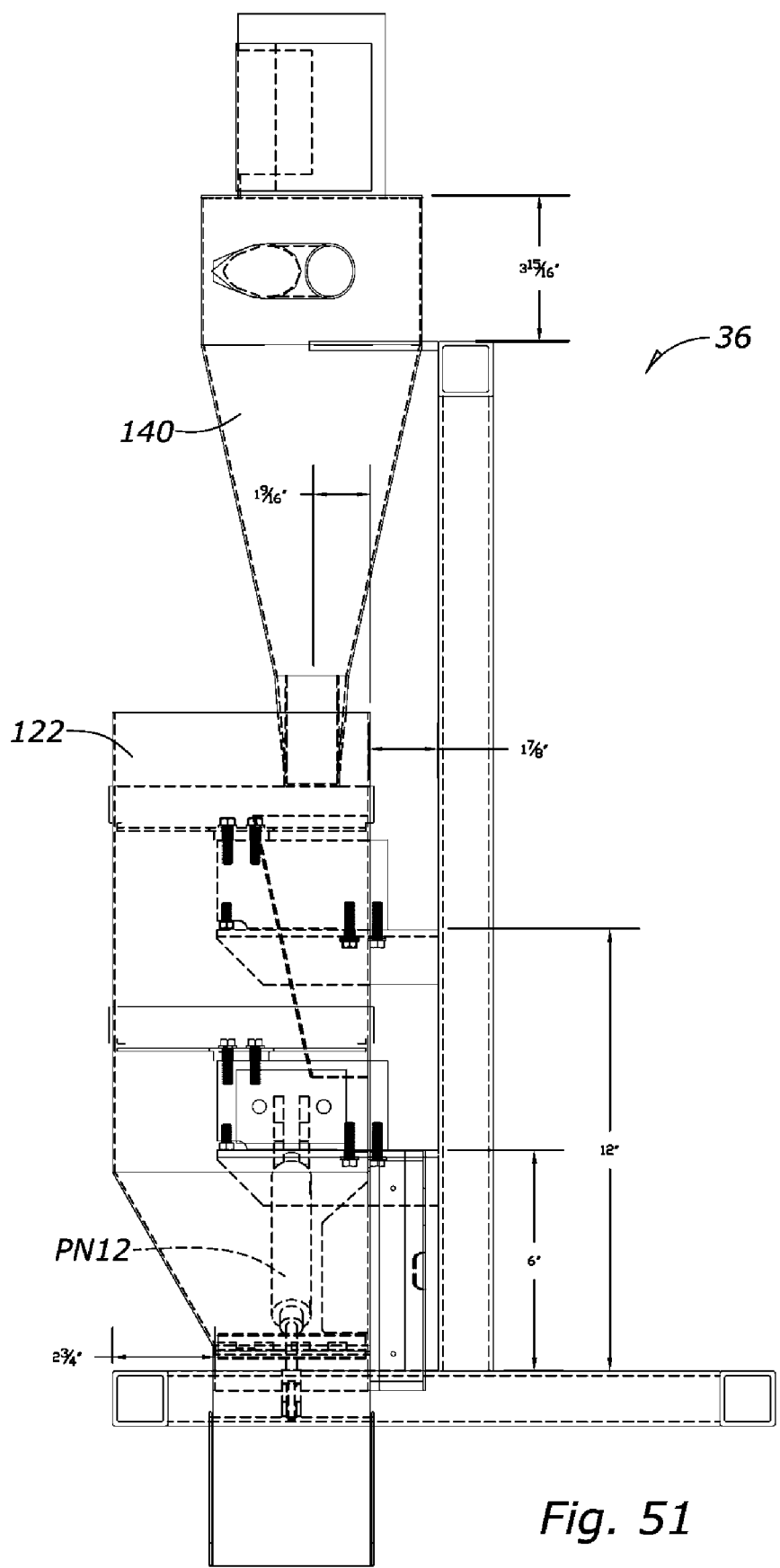

FIG. 51 is a side elevation of FIG. 50.

Figure 52:
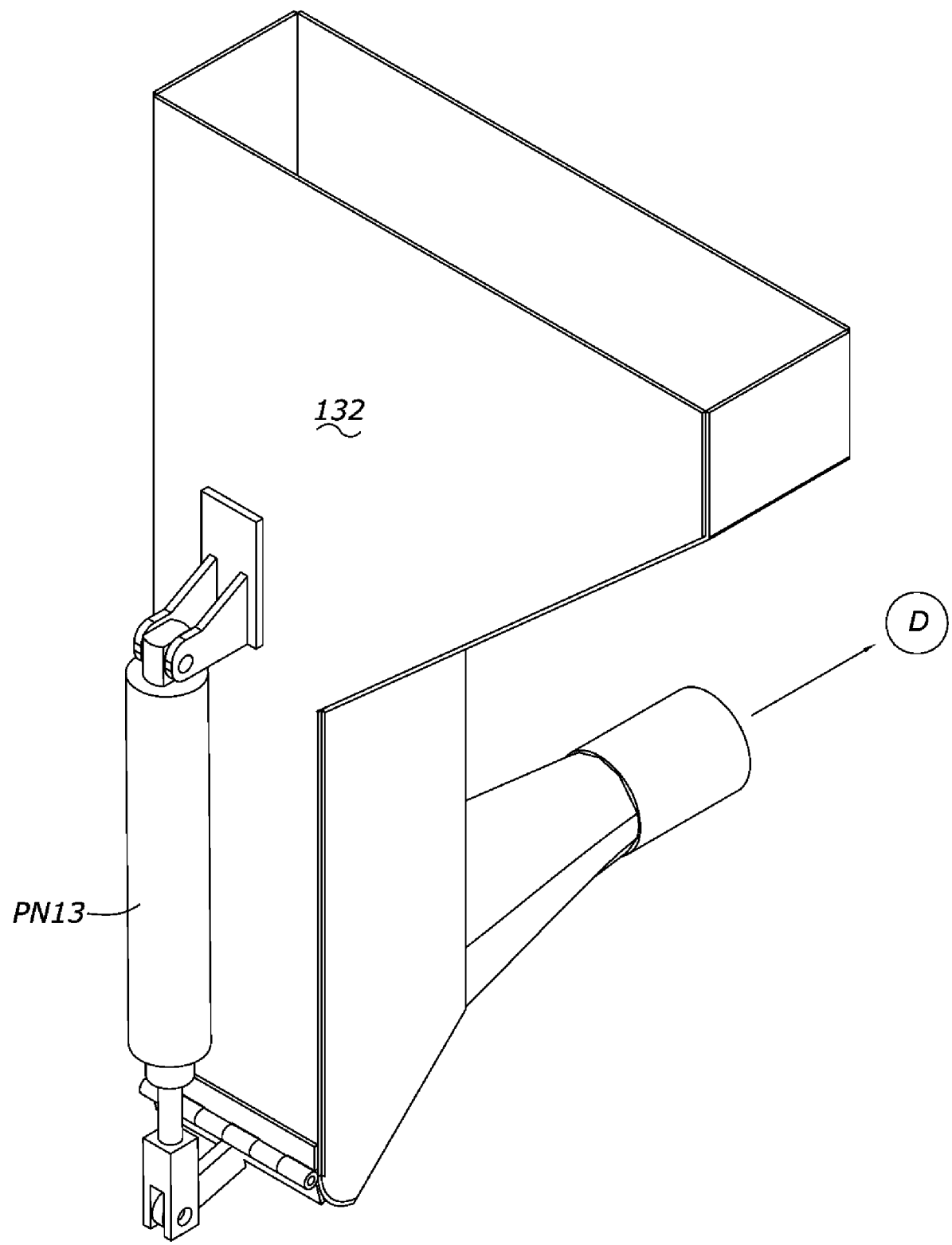

FIG. 52 is an isolated enlarged perspective view of a collection funnel and actuatable door for the bagging station of FIG. 46.

Figure 53:
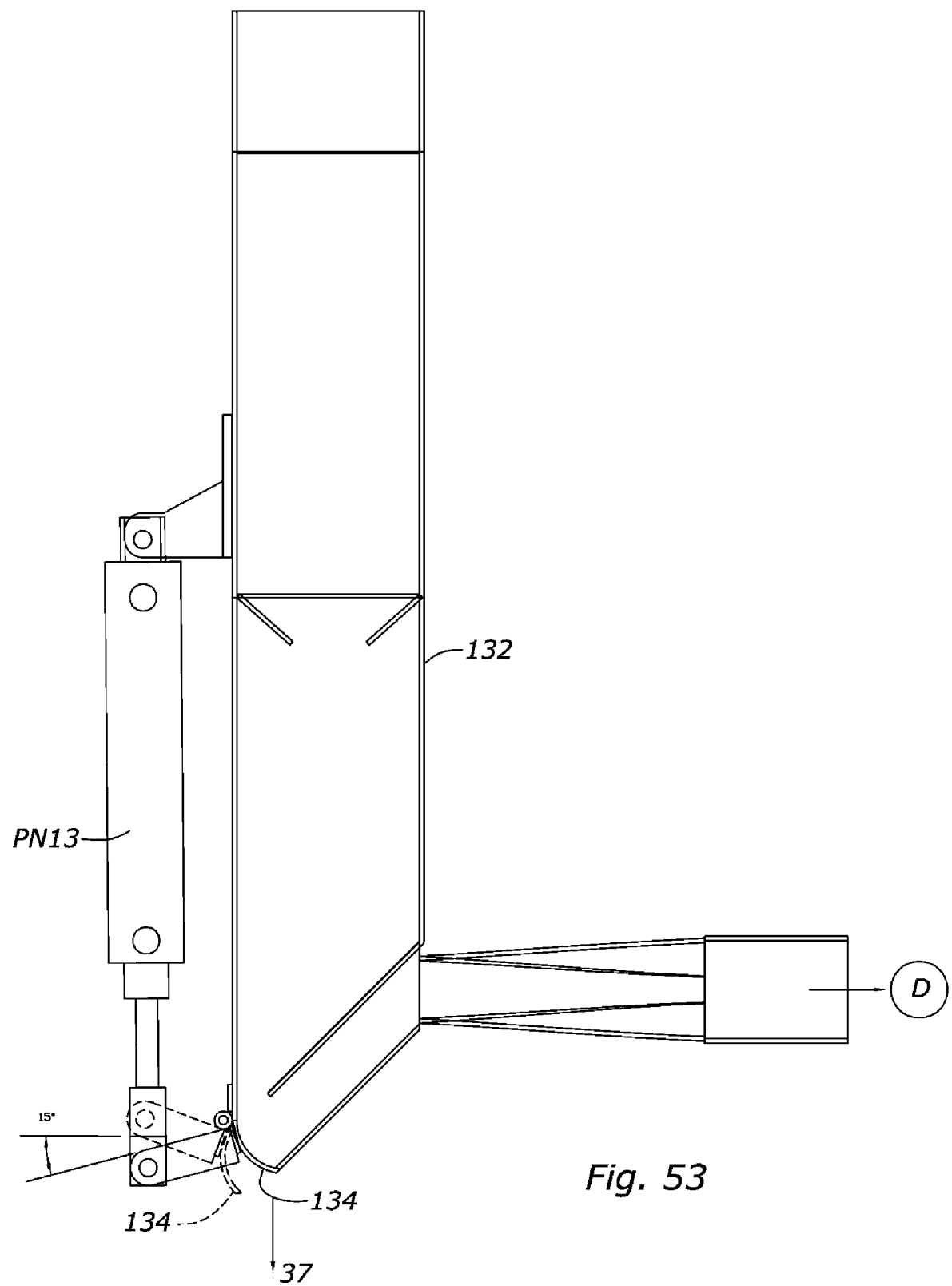

FIG. 53 is a side elevation of FIG. 52.

IV. DETAILED DESCRIPTION OF THE PREFERRED EMBODIMENT

A. Overview

For a better understanding of the invention, an embodiment will now be described in detail. Frequent reference will be taken to the drawings. Reference numerals and letters will be used in the drawings to indicate certain parts and locations in the drawings. The same reference numerals or letters will indicate the same parts or locations throughout the drawings unless otherwise indicated.

B. General Environment

The embodiment will be discussed in the general environment of processing seed corn for breeding purposes. The embodiment would preferably be housed in a suitable building, in a controlled environment, preferably shielded from outside environmental conditions.

C. Overall System Apparatus and Information Structure

FIG. 1 diagrammatically illustrates a corn seed processing/conditioning system 10. A controller 12 (e.g. RunTime RT-505 from Ann Arbor Technologies of Ann Arbor, Mich.) is operatively connected to a computer 14. Together controller 12 and computer 14 operate with system 10 to provide an automated production line for taking ear corn that has been bagged into mesh bags 16 and dried, each including a removable machine readable tag 18, sometimes called a harvest tag, (here bar coded), and perform a variety of functions to process seed from the ear corn to the point where the seed corn is bagged into shipping bags 20 bearing machine readable labels 22 in condition for further use, e.g., for continued use in corn breeding programs.

Ear corn samples from particular field plots are bagged. Bar codes are generated by known methods with identifying information about each sample. The identifying information is correlated to a data base format that can be used in maintaining an overall seed inventory and control system for a plant breeding program.

Instead of discrete manual sample handling and conveyance operations of each sample to process it for further use, system 10 automatically processes or conditions the sample seed.

But additionally, in parallel, system 10 validates each sample, keeps track of each sample, and can gather additional information about the sample. This additional information can be used to update the database about the sample, and can be transferred and used by other systems.

As a result, the objects of the present invention are achieved. Samples are conditioned in less time, with less chance for error, while automatically tracking and gaining additional information and knowledge about the sample.

FIG. 1 illustrates diagrammatically an example of a system 10, including various components and stations in a continuous processing line. The components can vary in number and function.

Programmable controller 12 is in electrical communication with a number of actuators, sensors, and computer 14 via an Ethernet network (indicated diagrammatically by reference number 46). Controller 12 includes a display and a touch screen for data entry. Controller 12, in combination with computer 14, controls much of the operation of system 10, and allows operator initialization and adjustment of certain parameters.

System 10 is linked not only by the conveyance path 29/33/35 from station to station, but also a combination of electrical and pneumatic circuits. These will be discussed in more detail later. Generally and for purposes of reference, system 10 uses air transport tubes to convey batches of seed from station to station. Electrically controlled line vacs supply pressurized air to the transport tubes. The electrically controlled line vac actuators will be referenced by LV1, LV2, LV3, LV4, and LV6. Air transport is not the only way to move seed samples, but is considered preferable, and perhaps the best presently known way for conveying seeds for a number of reasons. Among them are it is clean, conveys seed at reasonably high speed but with minimal trauma, is easy to install and plumb, has no moving parts for less complexity and more reliable and durable operation, is easier to fix and maintain, and is highly adaptable to different space and path requirements. Relatively small diameter, flexible, clear tubing can be used for the conveyance paths.

Gates and doors are operated by electrically controlled pneumatic actuators (solenoid operated) referenced by PN1, PN2, PN3, PN4, PN5, PN6, PN7, PN8, PN9, PN10, PN11, PN12 and PN13. The actuators have two-way ported cylinders, they are actuatable to one of two states by placing higher pressure on one side of the cylinder ram and creating lower pressure on the other side relative to one state or the other. Many of these actuators hold gates or doors in a normally closed state, but when actuated, move a gate or door to an open state to create a pathway for seeds to pass. Several air jets are operated by electrically controlled actuators referenced by AJ1, AJ2, and AJ3. Examples of pneumatic cylinders that could be used are Models 6-DP-1-M, 6-DP-2-M, or 6-DP-3-M from Humphrey Products Company of Kalamazoo, Mich.; or model 2A710 pancake cylinders from Speedaire.

By referring to FIG. 8, it can be appreciated that controller 12 controls the actuators as follows. Controller 12 communicates with solenoids associated with each actuator by sending an electrical signal which energizes the solenoid. The solenoid energizes its actuator supplying compressed air to a pneumatic cylinder (two-way) that has two states. The compressed air pushes the ram of the air cylinder. This mechanical force is then usable to open and close doors or gates, or open and close pathways for compressed air.

The electrically controlled actuators can have electrical sensors (e.g. Model BIM-PST-AP6X-V1131 inductive sensors from Turck of Minneapolis, Minn.) associated with them which inform controller 12 of the state of the actuator. Thus controller 12 can monitor whether a gate or door is open or closed. These sensors are referenced by S1, S2, etc. the sensor references corresponding to the pneumatic actuator references.

Computer 14 and controller can include a display and a data entry interface, e.g. touch screen or keyboard. Computer 14 could reprogram controller 12, or controller could be directly reprogrammed. An operator could therefore quickly change such things as the timing of operation of the various controller-controlled components of system 10. Controller 12 would be programmed to send digital instructions at appropriate times to any of the electronically controllable components in system 10.

Software could time the operation of the various components so that they did not have to continuously operate, even though no ear corn or seed was at the particular station. On the other hand, software could control the components to allow more than one batch of seed to be in process, but in different sections of, system 10 at the same time.

Bar code reader 24, as well as information from devices 36A-E, is interfaced to controller 12 which communicates with computer 14 for manipulation or storage of information via Ethernet network 46.

The above-described combination provides intelligence to controller 12 and computer 14 for operation of system 10. System 10 is therefore not only highly automated and autonomous, it is flexible. Safeguards can be programmed into system 10. For example, sensors can inform controller 12 that a certain gate is ajar. The programming can stop processing until the gate is checked. Other checks, error alarms, and monitoring can be built into system 10.

Of course, system 10 must be initialized prior to operation. This includes calibration. For example, cleaner 30 may have to be adjusted for different sizes of seed samples. Color sorter may have to be adjusted for different types of seeds (a color indicating a defect for one type of seed may be the color of health of another seed). Timing can be adjusted for different numbers of seeds per batch. For example, programming can wait for a pre-set time period for a function in one of the stations to be complete. This time period may need to be extended for larger batches of seeds or shortened for smaller batches.

The first station is sheller 28 (see FIG. 1). As is well known in the art, sheller 28 receives ear corn as input and mechanically separates the seed from the ear. Bags 16 are brought to sheller 28. A bar code reader 24 is used to read the tag 18 associated with a bag 16 to validate the information that has been encoded in a bar code on tag 18. This validation process, made possible by the pre-existing knowledge base in a data base, essentially authorizes the process of that batch of seed through the processing line.

A conveyance system moves the seed from the output of sheller 28 to the second station, here referred to collectively as cleaner 30. Debris, some damaged seed, and other unwanted material is separated from good seed. Cleaner 30 can be a screen cleaner. Other methods or devices could be used. As indicated at FIG. 1, a plurality of devices or functions could be included in and/or conducted by cleaner 30. Examples shown include scalping the seed (see 30B) and a preliminary sizing sorting of the seed (see 30C).

A conveyance system would move the batch of seed from the output of cleaner 30 to the third station, referred to generally here as sorter 36. FIG. 1 illustrates a color sorter, such as are known in the art. Sorter 36 functions to select desirable seed. For example, a color sorter attempts to use color or gray scale to discriminate between healthy seeds and diseased or damaged seeds. Some undesired seeds make it through cleaner 30. Sorter 36 attempts to remove them.

A conveyance system then moves the batch of seed to the fourth station, bagger 32, where the seed selected by the sorting system is accumulated and bagged for use.

As shown in FIG. 1, additional functions can be performed on the batch of seed in the system. Certain characteristics of the seed can be measured. Examples are moisture of the seed (see 36B), temperature of the seed (see 36B where the temperature compensation may be used to determine moisture) and weight of the seed (see 36C). The batch of selected seed can also be counted (see 36E). All of these functions are accomplished autonomously.

FIG. 1 shows an near infrared (NIR) analyzer 36D that possibly could also be used to derive other characteristics about the seed. Examples include protein levels, starch levels, and other information. NIR analysis is well known in the art. Information derived from such sensors and analyzers, the examples of which are shown at 36B-E, can be communicated to the computer which can correlate the information with the batch of seed sample in the database.

The computer can generate labels 22 which can add derived information to the label, here including a bar code. The computer can also generate a label 45 for a box 44. The bar code for box 44 could contain information about which bags of seed samples are in the box, shipping information, and/or other information.

Figure 2A:
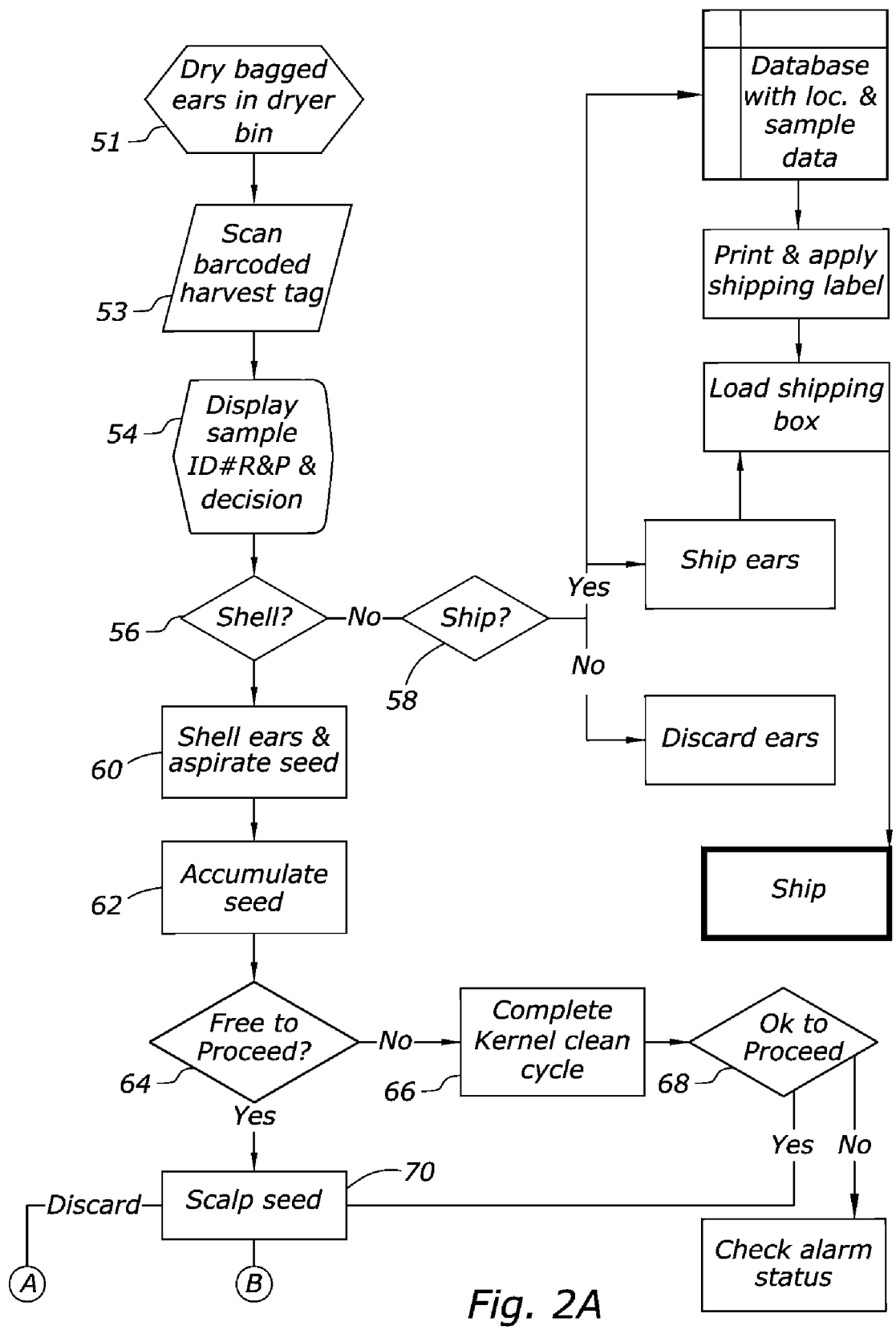
Figure 2B:
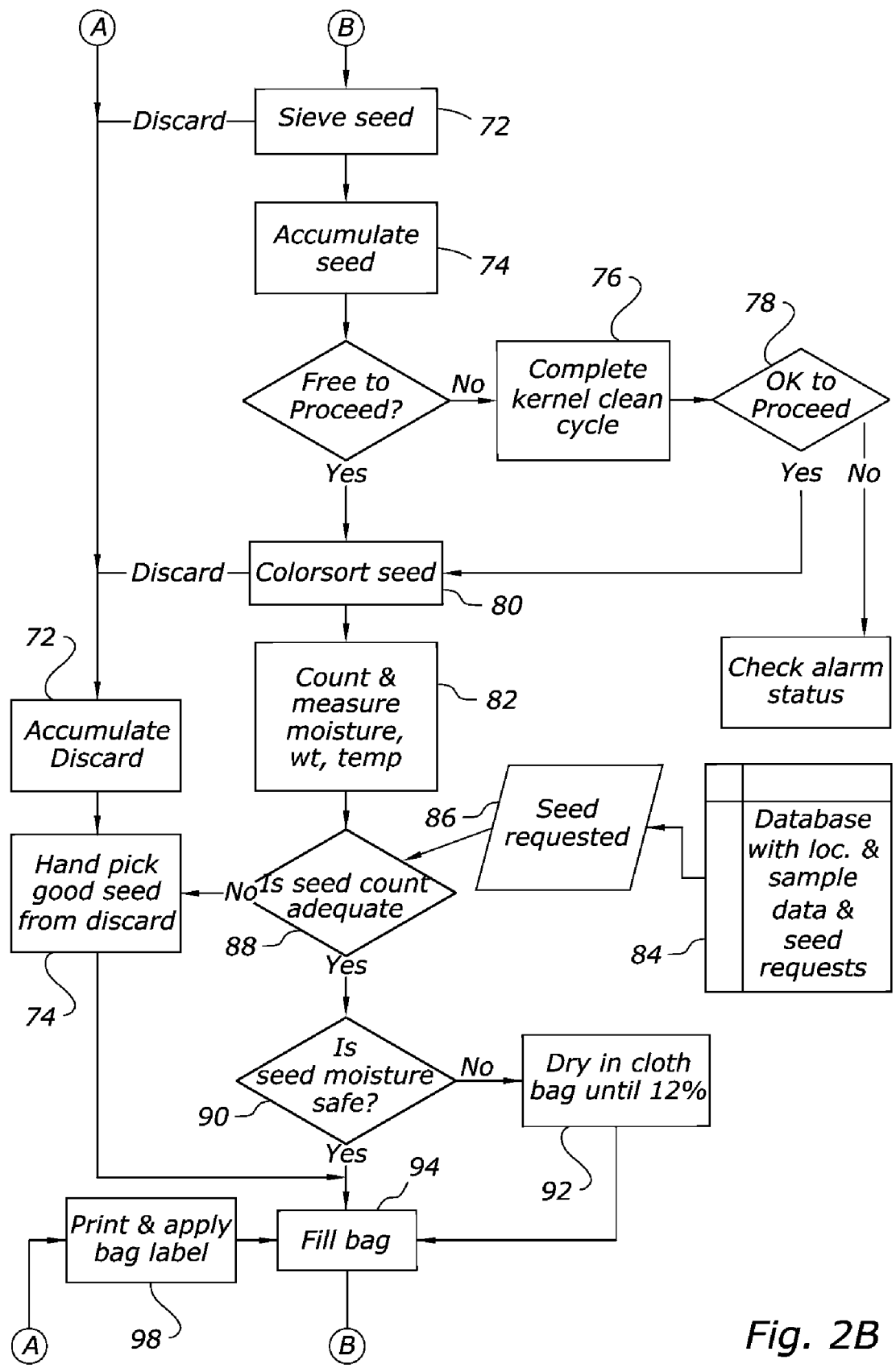
Figure 2C:
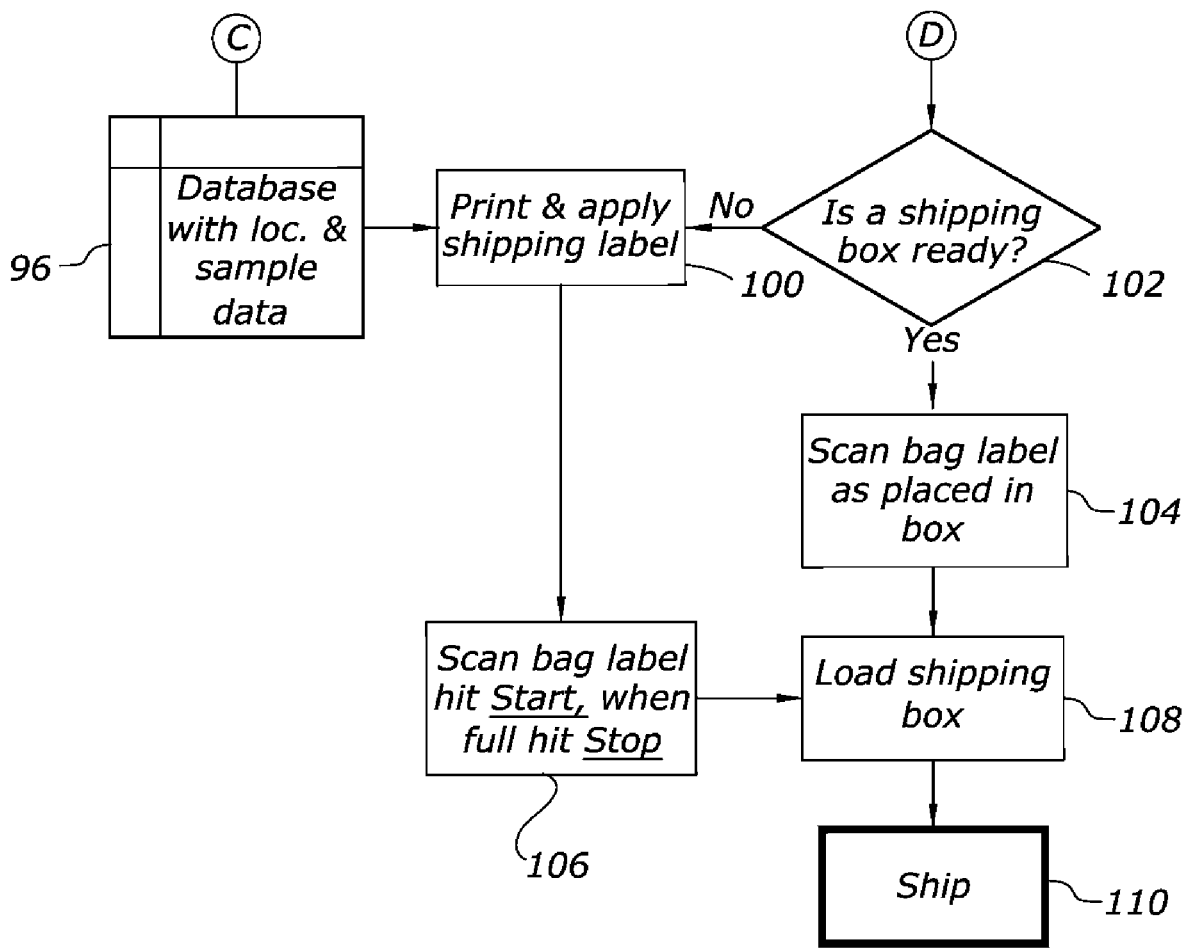

FIGS. 2A-C illustrate one specific methodology that can be utilized with system 10. This method could be implemented through appropriate software written in appropriate language for use by controller 12 and computer 14. It will be discussed in more detail later. Of course, variations can be used.

Figure 3A:
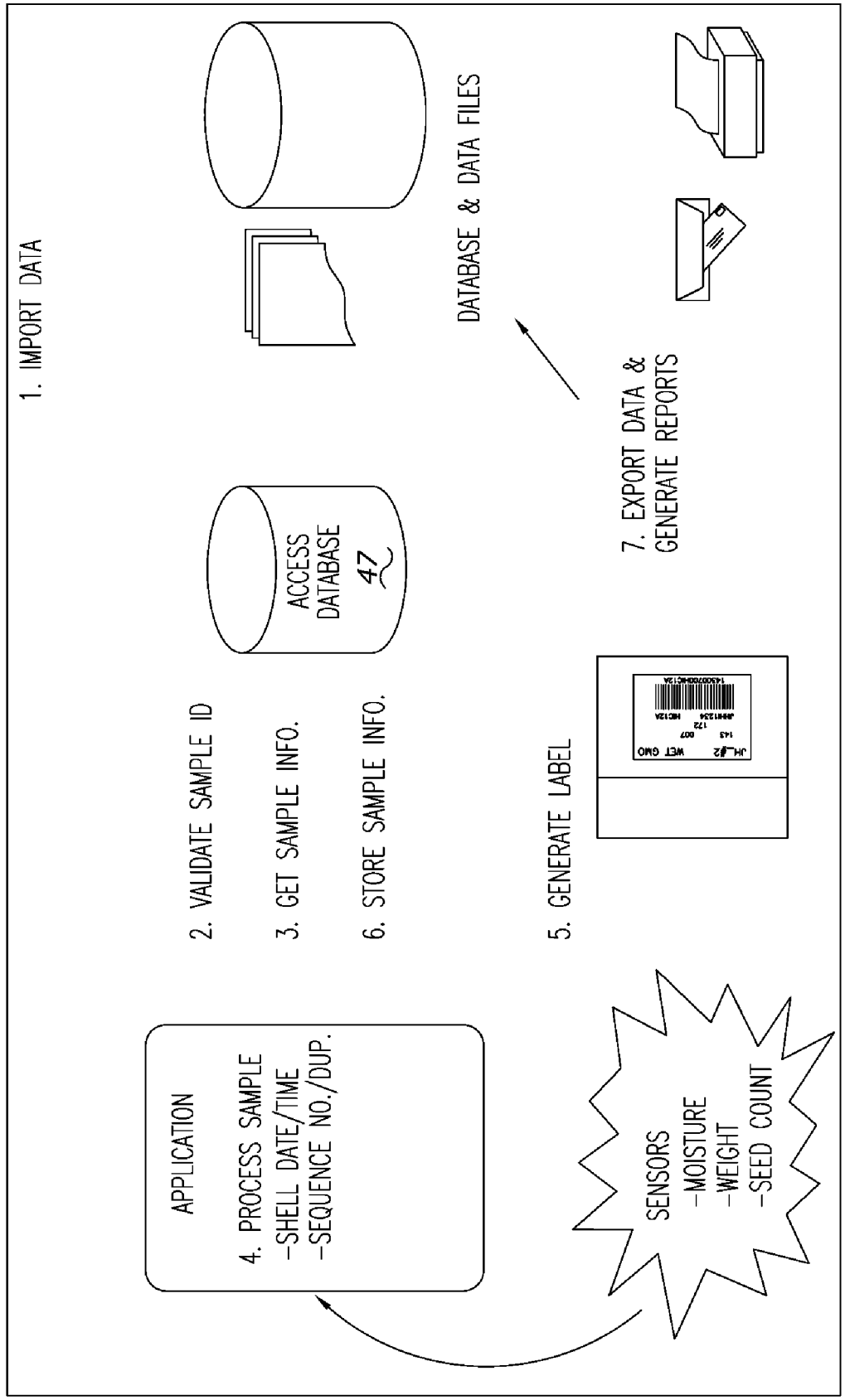
FIG. 3A is a process and information flow diagram according to an embodiment of the present invention.

FIGS. 3A and B, 4 and 5 diagrammatically illustrate the information flow structure and parallel flow of information and product through system 10. Note how system 10 has in real time validated it is processing the right sample and immediately adds to the knowledge base regarding the sample as it is conditioned for packaging and shipping.

The central database can run as an application on an enterprise-wide network. A database utility takes information and puts it into Microsoft EXCEL files (or comma separated values (CSV) files) into a local Microsoft ACCESS database files, copied from a remote server. A small application communicates with controller 12 and gives information back to controller 12; and lets it process. When through, system 10/controller 12 picks up and sends information and time/date (and sequence #) to computer 14 which can generate a label.

D. Specific System Apparatus and Example of Processing

FIGS. 6-7D give an assembled view of stations 28, 30, 36, and 40 and the conveyance mechanism between them. A control enclosure 50 (approx. 6 ft. tall by 6 ft. wide by 2 ft. deep NEMA 12 enclosure) for electrical and pneumatic circuitry is also shown, along with raceway 52 from enclosure 50 to distribute that circuitry to the stations and the controller.

FIGS. 8-17 illustrate some of the contents of enclosure 50 when installed as well as the electrical and pneumatic circuits for system 10. These figures give details of one way to build these sub-systems.

FIGS. 18-25C illustrate examples of graphic user interfaces (GUIs) such as could appear on display 13 of controller 12 or a display of computer 14 related to initialization and set-up of system 10 and formatting of labels printed for samples and boxes for samples that are processed by system 10.

FIGS. 26-53 illustrate stations 30, 36 and 37, and associated components, in more detail.

An exemplary specific seed sample conditioning process, in accordance with the programming of FIGS. 2A-C, will now be described with respect to the specific apparatus shown in FIGS. 6-53. Steps of the programming of FIGS. 2A-C will be called out while referencing each processing station and/or parts thereof with reference numbers.

The different stations and the devices and methods used at the stations in system 10 can vary. For example, one device may be able to adequately perform the functions accomplished by cleaner 30 and sorter 36 in FIG. 1. Some seed may not need to be shelled. Counting may not be required, or any evaluation like that which NIR analyzer is capable of.

In the present embodiment, however, related to processing and conditioning of corn seed samples for corn breeding, shelling, some type of cleaning and sorting, and bagging, along with at least moisture, weight, temperature and count measures are preferred.

Below are more specific details regarding components that could be used in system 10 illustrated diagrammatically in FIG. 1.

1. Preliminary Steps/Bar Code Reader

System 10 is initialized. The operator sets parameters via keyboard or touch screen 15 associated with computer 14 or controller 12 for the particular product being processed. For example, certain types of corn have larger kernels than other types. Different settings on cleaner 30 and sorter 36 may be necessary for accuracy of the system. Such settings normally will have been calibrated by prior testing of system 10 with the same or similar type of seed.

Electrical power (AC and DC) is presented to the controls in enclosure 50 (see FIGS. 9 & 10). Pneumatic pressure is generated by the components illustrated at FIG. 14 (here around 90 psi at 40 CFM minimum).

Ear corn 19 can be dried in a system such as disclosed in U.S. patent application Ser. No. 09/498,277 to inventors Hunter, et al., bagged in bags 16, each of which can be bar code labeled as previously described (see FIG. 2A, step 51). By scanning the bar code (step 53), information regarding the nature of the ear corn sample and the essential facts for records can be obtained by system 10 and stored in computer 14. The information can be displayed to an operator (step 54), and a decision can be made whether to shell corn or ship it on the ear (steps 56, 58). Note that a worker could at this point manually inspect the ear corn and reject it.

If the ear corn is not to be shelled and processed, the process to the left of box 58 in FIG. 2A could be followed. The ear corn 19 could pass through or bypass system 10 until bagger 37, where the ear corn 19 could be placed in a new bag(s) 20, the database of computer 14 can be updated, a label can be updated (a new label can be created by label generator 42), and bag(s) 20 closed and loaded into a shipping container 44, which itself could have a label describing its contents, if desired.

A bar code reader or scanner 24 (e.g. Model 5312HP from PSC, Webster, N.Y.) is positioned to read a bar code from a pre-created bar coded tag 18 on ear corn bag 16. The bar code on tag 18 could contain information such as indicated in Table 1.

TABLE 1

| Database field | Data |
|---|---|
| Field 1 | Bag #: _____ |
| Field 2 | Corn Type: _____ |
| Field 3 | Genotype: _____ |
| Field 4 | Test Plot #: _____ |
| Field 5 | Location: _____ |
| Field 6 | _____ : _____ |

A bag 16 of ear corn (typically comprising 8 to 10 ears) can be manually opened and ear corn 19 poured or loaded into sheller 28.

It should be noted that bar code reader 24 can read information that identifies the contents of bag 16. Computer 14 therefore can store and keep track of the relevant information about the ear corn from bag 16 throughout the processing of system 10. This information can be stored in a memory, text file, or a data base as well as in a database. The term "data base" is to be broadly construed to refer to any set of data regardless of its format, the type of application associated with the data (i.e. spreadsheet, database), the type of storage used to store the data, etc. A local database 47 can be created in computer 14 with such identifying information. Local database 47 can be in contact with a central database 48.

Figure 3B:
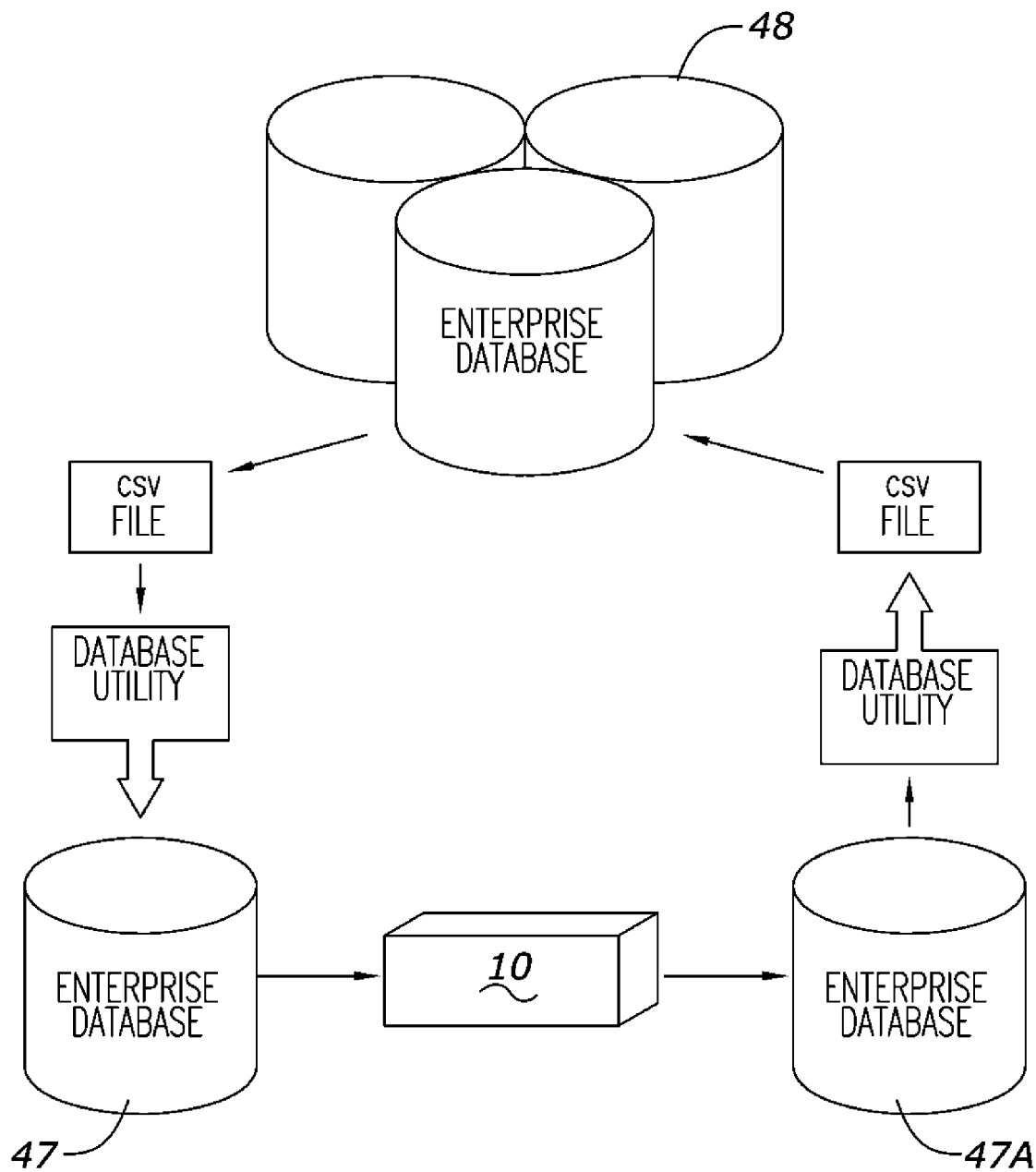
FIG. 3B is diagram illustrating the interaction of data according to an embodiment of the present invention.

This flow of information on an enterprise wide basis is best shown in FIG. 3B. Information including a shipping location, the year of the seeds, the season of the seeds, the location of the seed plots, a test plot identification number, seed experiment information, whether a particular seed sample is genetically modified, and other user-defined information that may be stored in an enterprise wide database 48 is then used in a local database 47. A database conversion utility may be required, for example the enterprise wide database information may be converted in part to a file of comma separated values or another universal format. A database utility may be required to import the information from a universal format to the format of local database 47. The local database 47 may be a Microsoft Access database and the database utility may be a stand-alone Microsoft Visual Basic application. The seed processing system 10 then adds information to the local database 47 during seed processing, the updated local database 47A containing this additional information. Once the database 47A has been populated with information from the seed processing system 10, the database utility can then be used to extract the database to a comma separated value (csv) file for loading into the enterprise wide database 48.

Figure 4:
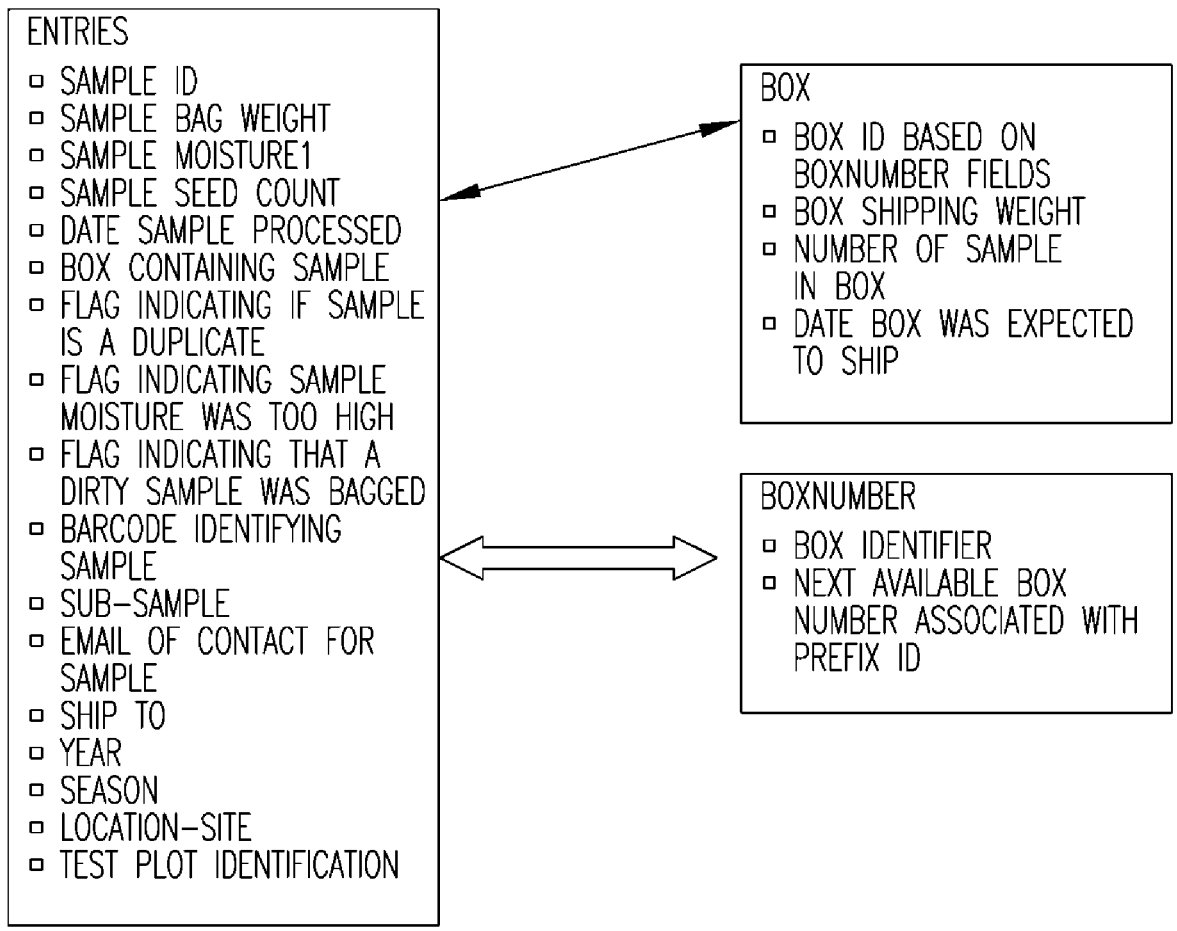
FIG. 4 is a diagram showing database tables of the local database according to an embodiment of the present invention.
Figure 5A:
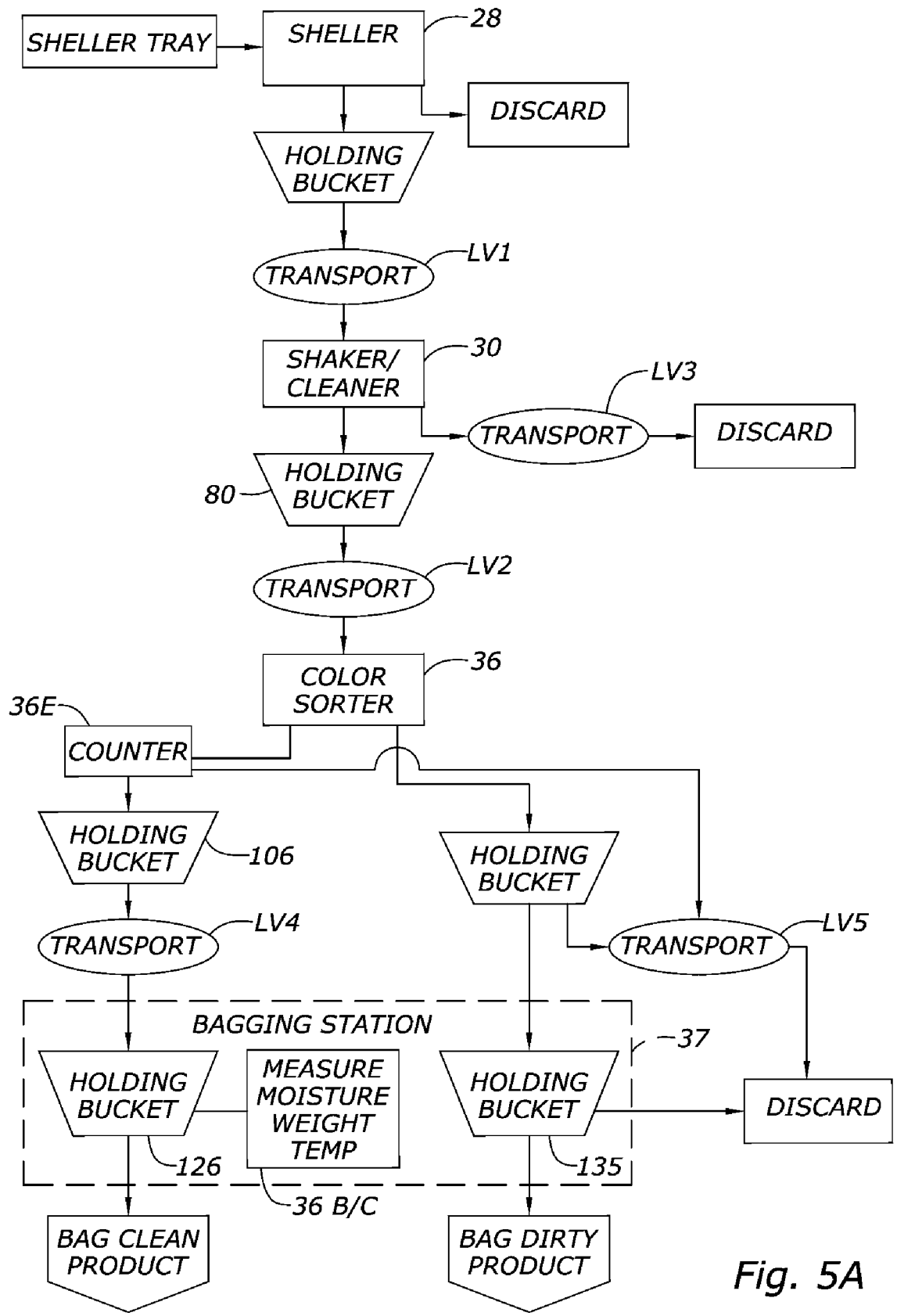
FIGS. 5A and 5B is a diagram illustrating the parallel relationship between seed processing and information processing according to an embodiment of the present invention.
Figure 5B:
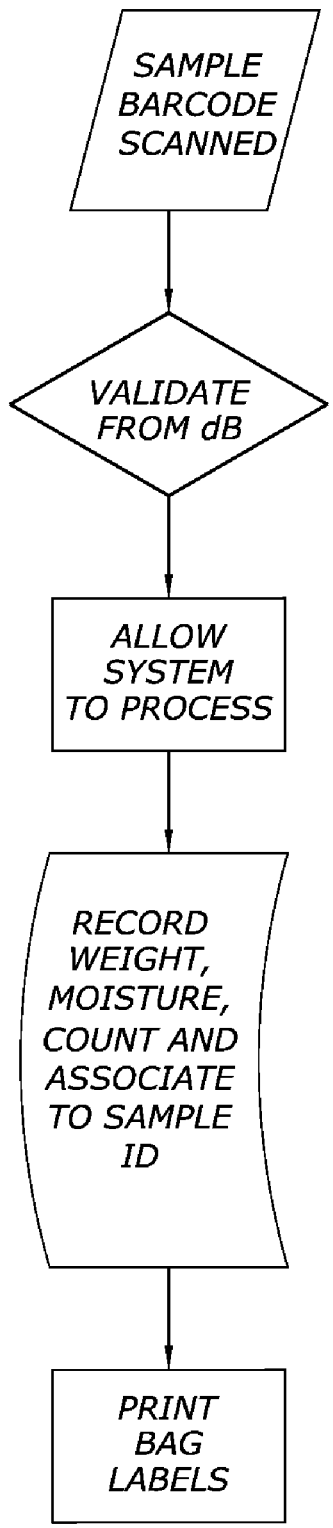

The database utility creates and uses a Microsoft Access database. As best shown in FIG. 4, the database is made up of an Entries table, a Box table, and a BoxNumber table. The Entries table contains all of the sample data including the box ID the sample is stored in. The Box table contains all of the information for a box such as shipping weight and sample count. The BoxNumber table is used to build a new box entry in the Box table. The Box ID of the Box table is related to a data field in the Entries table. One field in the Entries table is related to the Box identifier of the BoxNumber table.

Also, when the harvest tag 18 is read by bar code reader 24, identifying information on the bar code is immediately evaluated to ensure this bag of ear corn is authorized to be processed in system 10. This step, called validation, means that the ID of a bag 20 (from label 18) is checked against local database 47, which has downloaded from central database 48 a list of requested samples. For example, the central database can have a complete listing of all corn breeding experiments on-going around the world. The initial validation essentially asks whether the sample ID from tag 18 "exists", so to speak, in any of the experiments in the central database.

If the ID (identification) does agree, system 10 is authorized to process that sample. If it does not agree, an error is detected. The operator can be notified on display 13 and controller 12 does not allow gate 62 to sheller 28 to be opened.

PC 14 makes another initial decision based on information scanned in from harvest tag 18. It asks whether the sample type in bag 20 will run on system 10. In other words, it checks whether the settings and operational parameters for each of the stations of system 10 are set to handle the type or nature of the sample identified on label 18. For example, if the sample is a certain type of corn that needs more time in the cleaning station than what system 10 is set for, an error or alert is given to the operator via display 13, and sheller door 62 does not open. Thus, system 10 automatically assists in its correct and efficient operation.

System 10 has three basic setups, primarily based on the size/shape of the seeds of the samples and on the volume or amount of seeds for each sample. If the information scanned from a harvest label 18 indicates the wrong initial setup of system 10, the operator is alerted and can deal with it then, instead of wasting the time and possibly ruining the processing of the sample.

2. Computer and Controller

Computer 14 is a PC-based processor with an associated display 15 and keyboard and could be mounted in a stand or table at or near the bagging station. Operator controls and the display allow the operator to monitor certain aspects of the operation of system 10, as well as enter data or instructions.

Controller 12 is a programmable intelligent digital device (RunTime PC RT-505 from Ann Arbor Technologies of Ann Arbor, Mich.). It could be a programmable logic controller or other PC optimizer for data acquisition for process control. Controller 12 has an integrated display/touchscreen user interface 13, and is in an approximately 20" by 16" by 8" enclosure on a stand at or near sheller 28. Controller 12 handles input and output from and to the actuators and sensors of system 10 via I/O bases (see FIGS. 8-11) that communicate over an Ethernet connection. An Ethernet controller is placed in the passive back plane of controller 12, permitting signals to be sent to and received by other I/O within controller 12. Input/output drivers energize relays in the back plane that open or close solenoids for the pneumatic actuators. PC 14 runs a Microsoft Visual Basic (VB) application. PC 14 communicates to controller 12 using TCP/IP. PC 14 polls controller 12 for correct status of I/O lines, essentially by one-way polling (approx. once every 50-100 milliseconds), and then writes back a new status as needed. Controller 12 is programmable (e.g. Think and Do language).

The apparatus of system 10 allows an automatic, continuous, real time processing of seed 25, including tracking of a batch of seed that needs to be kept together, or at least precisely identified prior to, during, and after the processing.

System 10 assigns an ID string to each sample. PC 14/controller 12 push this string through station to station of system 10 to track each sample. In this embodiment, up to five samples can simultaneously be in system 10, but the invention is not confined to this. For corn seed of conventional type, each sample takes less than one minute through system 10. By tracking, system 10 knows where each sample is in system 10 at any given time, and thus knows when it is at bagging station 37 so that it generates the correct identification label for the package for each sample, even though multiple samples may be proceeding through system 10.

By referring to the GUI's of FIGS. 18-25C, it can be seen what types of initialization and set-ups are possible with system 10. FIGS. 18 through 19 show graphical user interfaces of controller 12, while FIGS. 19-25C show graphical user interfaces of PC 14. FIG. 18 shows the relationship of a number of different screens that may be accessed from a product selection screen (see also FIG. 19A). These screens include a weight calibration screen, a moisture calibration screen, a run screen, a settings screen (see also FIG. 19C), a manual control screen (see also FIG. 19B), a color sorter testing screen, and a seed counter testing screen. Examples of timing between stations and set-ups for corn are given in the settings screen of FIG. 19C. Examples of the types of operator over-rides are given in the manual operator screen of FIG. 19B. Examples of the database fields and how they are used to create bag and box labels are shown.

3. Automated Processing Stations a. Sheller

If ear corn 19 is desired (and validated) to be shelled and processed further, the steps in the flow chart after box 56 could be followed. FIG. 2A illustrates at step 60 and step 62 if a decision is made to ship the ear corn, the seed can be aspirated and accumulated or controlled as to rate of presentation to the next station. System 10 can check if it is free or allowed to proceed to the next process step (step 64). System 10 could instruct a kernel clean process (see step 66). Aspiration could be integrated into sheller 28.

Sheller 28 (e.g. Model ECS by Almaco, Nev., Iowa) functions to shell ear corn 19. A variety of shellers are commercially available. Once a seed sample in a bag 16 is validated (after bar code 18 is scanned and computer 14 validates), the ear corn from that bag 16 are loaded into a hopper in sheller 28.

Sheller 28 is turned on and runs constantly. Sheller input gate 62 is opened by an electrical instruction from controller 12 (output B0) to an electrically controlled pneumatic actuator (PN1) (see also FIG. 17). The ear corn for this sample batch is then shelled by sheller 28.

Non-seed (e.g. cob, stalk, leaves) can be discharged (see reference letter D, FIG. 1) via a chute or conveyor to be discarded or otherwise used.

Line vac LV1 (e.g. model 6063, from Exair, Cincinnati, Ohio) is activated by controller 12. It is driven by solenoid controlled compressed air and causes the shelled corn to be pulled from the outlet of sheller 28 into air tube 60 and is conveyed first horizontally then vertically to cyclone 71 at the top of cleaner station 30. Pressurized air is delivered from the source (FIG. 14) via ½" O.D. polyethylene tubing and used by the 1½" I.D. inlet and outlet air vac.

All air tubes in system 10 are clear PVC food grade tubing, with reinforcing spiral to maintain roundness (size is approx. 1¾" O.D., 1½" I.D., available from McMaster-Carr of Illinois). Such tubing is flexible. This makes it easy to install and allows the operator to visually inspect the lines.

An aspirator 32 optionally could be placed at the outlet of sheller 28 or integrated into sheller 28 to aspirate the seed as it is leaves sheller 28. This could assist in removing dirt, debris, or otherwise pre-clean the seeds.

b. Cleaner

Controller 12 instructs cleaner 30 to perform a kernel clean cycle after each set of seeds is processed by cleaner 30 (see steps 66 and 68, FIG. 2) to remove residual material stuck in the screens, such as described previously with respect to cleaner 30A in FIG. 1. Optionally (see FIG. 1), the seed can be scalped (step 70, FIG. 2) and then sieved (step 72, FIG. 2).

These steps are conventional further processing steps as is well known in the art and as discussed further later.

It again should be noted that in many of these steps along the process, undesired seed (e.g. damaged) can be automatically discarded from the processing path but accumulated (step 72, FIG. 2B). If it is determined, for example by manual inspection by a worker, that desirable seed is in the bagged discard seed, it can be recovered and manually inserted in an appropriate "clean" seed bag, e.g., if additional seed is required to meet a desired minimum seed count for the sample (step 74).

General cleaner terminology: The cleaner 30 separates desirable seed based upon size and/or shape. Cleaner 30 consists of two perforated metal screens, each paired with an underlying pan. Top screen 260A has perforations with the diameter of $^{26}/_{64}$" and is referred to as the scalping screen. Lower screen 260B has holes with the diameter of $^{18}/_{64}$" and is referred to as the sieving screen. The scalping screen's holes are sized such that desirable seed pass through its holes onto its associated pan 262A. The sieving screen's holes are sized such that broken seed or undesirably small seed pass through its holes onto the sieving screen's pan 262B.

Cleaner seed flow: Seed flows from sheller 28 into cleaner feeder bucket 72. When controller 12 has determined that cleaner 30 is ready to receive seed, it opens an associated solenoid valve to energize the two-stage pneumatic actuator PN4/5. The first stage of actuator PN4/5 opens cleaner feeder bucket door 74 to 1". This limited opening allows seed to flow onto scalping screen 260A at a controlled and desirable rate.

Desirable or "clean" seed flow: The desirable seed flows through scalping screen 260A onto pan 262A and then falls from the lower end of pan 262A onto lower or sieving screen 260B. The desirable seed then flows off screen 260B and exits the cleaner at 266B.

Discard or "dirty" seed flow: Seed that is too large to pass through scalping screen 260A slides across the scalping screen 260A onto lower pan 262B associated with the sieving screen 260B. This large seed or debris exits the cleaner at 268B. Seed that is too small is separated from the desirable seed by falling through sieving screen 260B onto sieving screen pan 262B and exits cleaner 30 comingled with large seed and debris using 268B.

Cleaner clean-out cycle: Cleaner 30 and its associated systems have been optimized to avoid the cross-contamination of seed samples. The first point in the clean-out cycle is for the second stage of the two-stage pneumatic actuator PN4/5 on cleaner feeder bucket 72 to open door 74 completely. This allows any large debris that might potentially plug the bucket's opening to slide onto cleaner 30. The duration of the opening of each of the two stages is controlled by controller 12 and is optimized for the products or sample sizes being run. If the bucket is not emptied of debris and seed, it might jam and then allow seed from the next sample to leak onto cleaner 30 prior to the removal of the previous sample.

Scalping screen 260A is the first screen to receive seed in cleaner 30. The seed sample from cleaner feeder bucket 72 quickly flows over or through the scalping screen 260A. Before scalping screen 260A can go through a clean-out cycle, all seed must be removed from its pan 262A. Cleaner 30 has air jets AJ1 and AJ2 that blow across the sieving screen 260B and its associated pan 262B. Air jets AJ1 and AJ2 are directed at an angle such that all seed or debris are propelled off sieving screen 260B and pan 262B prior to the cleanout cycle. Once pan 262A is clean, the pneumatic cylinder or actuator 288A (PN3) extends and moves pan 262A upwards so that it strikes the bottom of scalping screen 260A dislodging any seed or debris stuck in scalping screen 260A. This cycle is repeated quickly at least twice to dislodge and rapidly move seed off scalping screen 260A. The length of time allowed for each portion of the seed sample cleaning process and then for the clean-out process is optimized for different materials and sample sizes and is under the control of controller 12. Contaminating seed is not sensed by system 10, but in the future it might be possible for system 10 to know whether seed has finished moving through the system and whether or not contaminating seed or material remains.

Sieving screen 260B receives the material that flowed through scalping screen 260A and any seed or debris that is too small flows through the holes in sieving screen 260B and drops onto pan 262B. When the seed sample has been cleaned, pneumatic actuator 288B (PN2) moves sieving screen 260B downwards onto pan 262B, thereby dislodging any seed stuck in the holes of sieving screen 260B. This up and down movement occurs several times in quick succession while the cleaner air jets AJ1 blow any remaining or dislodged seed off sieving screen 260B. This dislodged seed, plus any other good seed is discharged from cleaner 30 at 266B. The air jets (AJ1) are controlled by controller 12 that energizes a solenoid controlled air valve that controls the pneumatic cylinder 288A.

Cleaner 30 of FIG. 26 is a screen cleaner or sizer placed on top of a shaker table 75, such as are commercially available (e.g. Model Innova 2350 from New Brunswick, Edison, N.J.—gyrational table operated at 200 rpm, 1" stroke length—counter-balanced to reduce stress). Table 75 assists in the cleaning/sizing process as seeds from a sample enter and travel over the two screens of cleaner 30.

It is to be understood that device 30 could have controller-controlled automated equipment to perform any of the functions of cleaning the seed, scalping the seed, or sorting the seed by sieve or other method. FIG. 1 illustrates three such functions. Cleaner 30 can be any device which separates seed 25 from non-seed. Non-seed material can be directed to a discharge D.

Cleaner 30 could also size and/or separate seed based on one or more sensed criteria. Criteria could include, for example, size of seed and/or shape of seed (e.g. flat vs. cylindrical). A variety of types of sorting and sorting devices are known in the art. For example, seeds 25 can be sorted by size. It might be determined that seeds of less than a certain size are not good candidates for use in breeding. Non-desired seed or material could be directed to a discharge D where it could be directed for further or different use.

Cleaner/scalper/sieve 30 can be either one device or a combination of devices. Appropriate internal or external mechanized controller-controlled or gravity-based conveying devices 29 transport seed 25 between functions.

Thus, cleaner 30 is essentially a seed sizer. As is well-known, this could be on the basis of size or shape (e.g. flat versus cylindrical) or both.

Importantly, cleaner 30 is self-cleaning. In many screen cleaners, some seeds and debris get caught in the openings of the screen. After each cleaning, scalping, sieving, or sorting process, remaining seeds and debris on the screen must be manually removed. System 10 provides for automatic self-cleaning by continuously running shaker table 75, which continuously urges anything on the screens to move, and by moving one of the cleaner screen and a plate against one another to dislodge anything stuck in the screen openings.

It is important to clean cleaner 30 after each cycle, not only to remove debris for optimal sorting by cleaner 30, but also to remove any seeds. If seeds are left, they may contaminate the next sample that is processed. For example, one does not want to have a genetically modified seed from one sample inadvertently in a non-genetically modified sample.

Cleaner 30 has two air jets AJ1 and AJ2. The first air jet AJ1 is positioned above the sieving screen 260B. The second air jet AJ2 is located below the sieving screen 260B and above the pan 262B. During normal operation, the controller 12 energizes the solenoid of the second air jet AJ2 during the cleanout cycle, after the scalping screen's pan moves upwards driven by the action of pneumatic cylinder 288A. The cylinder retracts and extends for three complete cycles. The controller waits a small time period (such as 0.5 seconds) and then the second air jet AJ2 is energized and compressed air blows across the sieving screen pan 262B for a period of time (such as 3.5 seconds). The screen 260B is driven downwards onto pan 262B. This process is repeated three times. This process can be realized by turning on an actuator, waiting a short time (such as 250 ms) and turning off the actuator thus creating a rapid slapping action. During this cleanout process the first air jet AJ1 is energized for 5.5 seconds. This combination of mechanical actions is performed to dislodge seed from screens 260A and 260B. The blasts of air from the air jets AJ1 and AJ2 result in the cleaner being free of potential contaminant seeds.

Thus, the two stage feed rate deters overwhelming of cleaner 30 and the self-cleaning aspects deter contamination of samples.

FIGS. 27-36 illustrate an embodiment of the cleaner 30 illustrated at FIG. 26 in more detail. Flat screen 260 having a pan 262 underneath it can be operated as is conventional. Pan 262 can be connected pivotally to screen 260 by links 264. A rod 265 can be connected to links 264 on one side of the device and terminate in an actuator 267. Outlets 266 and 268 from screen 260 and receiving pan 262 respectively would channel seeds to the respective desired locations. To clean screen 260, actuator 267 would pull arm 265 to the left. This in turn would pull links 264 in the fashion shown in FIG. 29 which would raise pan 262 up against the bottom of screen 260. Pan 262 would be configured to have a surface that corresponds with the bottom surface of screen 260 and serve to push any debris or seeds lodged in perforations in screen 260 out, as shown by comparing FIGS. 30 and 31.

FIGS. 32-34 show a dual staged flat-screened sizer with a seed cleaner such as illustrated in FIGS. 35 and 36. A housing 270 contains screen/cleaner 260A/262A in its upper portion positioned at a 10 degree angle relative to the horizontal plane, and screen/cleaner 260B/262B in its lower portion positioned at a 5 degree angle relative to the horizontal plane. These angles are selected to help seed move quicker over top screen 260A, and essentially allow screen 260A to be self-cleaning; while the smaller angle helps a longer residence time for seeds on bottom screen 260B. Screen 260A is held stationary in housing 270. Pan cleaner 262A is movable between a lowered or away position shown in FIG. 33, to a position up into abutment with the bottom of screen 260A as shown in FIG. 34.

By referring also to FIG. 35, it can be seen that with respect to upper screen 260A and cleaner 262A, an elongated rod 272A is connected via pins 274A and 276A to pan 262A through the side walls of housing 270 via arcuate slots 278A and 280A. A first link 282A is connected at one end to pin 274A and a second end to pin 287A which travels in arcuate slot 286A. Link 282A is pivotally fixed to the side of housing 270 at both 284A.

A second link 275A is connected at one end to pin 276A and is pivotally fixed to the side of housing 278 by bolt 292A.

An actuator 288A is mounted to an interior end wall of housing 270 at mounting plate 290 and at an opposite end has an extendable arm 290A connected to pin 287A at a generally intermediate position. As shown by comparing FIGS. 33 and 34, when end 290A of actuator 288A is retracted, pin 262A is in a lowered position. When end 290A of actuator 288A is extended, links 282A and 275A are pivoted to opposite positions relative to arcuate openings 278A, 286A, and 276A and pan 262A is brought up against the bottom of screen 260A to perform a cleaning function.

As with prior described embodiments, this action can occur while the entire device is oscillating or gyrating (at 200 rpm), or such movement can be stopped during the cleaning process. It has been found that two quickly repeated movements of pan 262A against screen 260A is preferable to one such movement as it creates some vibration to assist in dislodging material from the openings in screen 260A.

Cleaning of lower screen 260B is essentially the same as described with regard to screen 260A, except that screen 260B is moved down onto pan 262B. As shown in FIG. 33, the components are essentially the same although their configuration and orientation differs as shown. The embodiment of FIGS. 33-35 allow sorting to occur at two succeeding levels. Seeds are output at outlet 266B and 268B respectively for use or further conditioning.

FIG. 36 is similar to FIG. 33 except the position of actuator 288A differs.

With all embodiments, the cleaner would perform cleaning on individual screens either through self motorization or by utilizing the movement of each screen itself. Therefore, the embodiments do not require any complicated attachment to a single drive force even if there were multiple screens involved. Variations obvious to one skilled in the art will be defined by the claims. For example, the embodiments can be utilized for a wide variety of screen sizes. The embodiment of FIGS. 26-36 is believed to be better for smaller sized screens. Cleaner 30 is connected to controller 12 which controls the pneumatic actuators for cylinders PN2 and 3 and air jets AJ1 and AJ2 for the self-cleaning process.

FIGS. 26 and 27 illustrate how desired seed or "product" is funneled to clean seed or product hopper 80 and unwanted material and seed, "dirty seed" is funneled to dirty seed hopper 81. Actuators PN6 and PN7 respectively operate slide gates that control the release of seed from either hopper. Upon instruction from controller 12, one or the other or both slide gates 82 and 83 are moved from normally closed to open positions. "Cleaned" seed is transported by transport tube 100 (by actuation of line vac LV2) to sorter station 36. The slide gates are essentially a plate with a portion big enough to block the pathway between the hopper and its discharge, and another portion with an opening generally matching the size of the pathway out of the bottom of the relevant hopper. Its associated actuator simply slides the gate to the desired state, closed or blocking the pathway; or open which unblocks the pathway. This can be handled well with a linear double acting pneumatic cylinder.

Normally about 5%-10% of the sample is discharged as "dirty", mostly comprising broken seeds or foreign material. Thus a substantial majority of the sample is passed as "clean" or selected product.

Note that a perforated section 108 of tube 100 (see FIG. 27) could be used below bucket 80. This 4"-5" section could be made of galvanized metal, 1½" I.D., 14 gauge, with several hundred ³⁄₃₂" offset holes 109. This would assist the movement of seeds through the respective air tube, especially where relatively large volumes of seed accumulate, for example, possibly at the cleaner bucket and at the color sorter bucket for good product. It allows easier air movement into the conveyance tube to transport the seed sample to its next destination. Otherwise, the use of air-tight tubes and gates may not provide sufficient volume and velocity of air to fluidize the seed. Perforated sections like section 108 could be used at other parts of system 10, particularly where relatively large amounts of seed need to be conveyed.

c. Color Sorter

Once processed to step 72 (see flow chart of FIG. 2), the seed is accumulated (step 74) and a kernel clean process is instructed by controller 12 (steps 76 and 78). This self-cleaning could include operation of an air jet AJ3 to rid color sorter 36 of any seeds that might be lodged or otherwise remain in color sorter 36. Active cleaning of color sorter 36 is accomplished by an air jet AJ3 at the funnel 103 and chute 104 (see FIGS. 37B and 40).

Controller 12 can operate pneumatic conveyor 33 to move seed 25 to the step of color sorting at reference numeral 80 in FIG. 2B. Color sorting can be used to remove diseased, damaged, or otherwise undesirable kernels based on color or other differences that can be discriminated in a video imaging of at least a portion of a seed. The process of color sorting alone can eliminate a significant part (estimated at half) the manual labor involved in such processing of corn seed.

Non-destructive evaluation and/or automated counting (step 82) can take place. Non-destructive evaluation can include, for example, the types of sensing previously described; e.g. measurement of moisture, weight, oil content, etc. Database (see step 84, FIG. 2B) in a computer system can instruct the process regarding the type and amount of seed that is desired (step 86). The system can compare the actual count (step 82) to the requested seed count (step 88) as well as check whether moisture or other characteristics is/are acceptable (step 90). For example, NIR analyzer 36D of FIG. 1 could be used to select only high oil content seed 25 based on NIR sensing and sorting similar to the color sorting shown in FIG. 3.

Air transport 100 (FIG. 37B) is another pneumatic conveyor, with a tube operatively connected to a controller-controlled pressurized air source 34 that can lift seeds 25 vertically.

Cleaned seeds are lifted to color sorter cyclone 101 and drop by gravity into color sorter feeder bucket 102. Upon instruction of controller 12, color sorter feeder bucket actuator PN8 opens hinged door 110 (FIG. 40) which opens a pathway for the seeds to fall into sorter feeder funnel 103, and then into color sorter seed chute 104.

Color sorter 36 is commercially available model ScanMaster 200 IE from Satake, Houston, Tex. Color sorting is well known and has been used to sort such things as rice, peanuts, cubed vegetables, beans, potato chips, and frozen foods. It uses a digital imagining device or camera 38 to discriminate, on a seed 25 by seed 25 basis, whether or not to accept a seed 25 based on information discerned by imaging at least portions of each seed 25. Model 200 IE normally uses a vibratory feeder as an input of materials into the color sorter. However, color sorter 36 instead uses a feeder bucket 102 with a gate 110 controlled by controller 12.

The basic principles of operation of a color sorter are illustrated at FIG. 38. A conveying mechanism 348, controlled by a controller-controlled actuator 350, receives incoming seeds 25 from source 333. The plurality of seeds 25 are presented serially and at generally uniform velocity along some type of conveyor 348 or path (see seeds 25A-H in FIG. 38). Color sorter 36 (FIGS. 37A-C) directs seeds from feeder 102 into a plurality of generally parallel paths or channels, so that sorting of each channel can occur simultaneously for greater throughput. In comparison, FIG. 38 shows just one path or channel for simplicity of illustration. Color sorter 36 (FIGS. 37A-C) also uses gravity to convey the seeds through the channels, see seed funnel 103 and ramp 104 in FIGS. 37C and 40. Once the channels are formed, seeds actually fall in free space for a time. The structure of color sorter 36 encourages a seed trajectory of a consistent speed. Color sorter 36 is set up to handle on the order of 200 seeds per channel per second. Funnel 103 concentrates the seeds accumulated in feeder bucket 102 into four principal channels, although the ScanMaster accommodates 10 channels. This is because it is believed a steady flow gives better results than an intermittent flow. This results in a throughput on the order of 800 seeds per second. For typical approximately 2000 seed samples, one sample can be color sorted in approximately 5 seconds. This represents a very substantial savings in time over manual inspection of 2000 seeds.

Referring back to FIG. 38 for illustration purposes, a light source 354 of substantial intensity illuminates the seeds. A digital video imaging device 358 captures images of the illuminated seeds. A light bar control 356 and video processor/controller 360 are operatively connected to devices 354 and 358 to illuminate and digitally scan seeds 25 as they serially pass thereunder. The video scans are evaluated by processor 360 (and computer 14) against predetermined criteria based on visual characteristics of seed 25. For example, diseased portions of harvested corn seed is usually darker in color than that non-diseased seed. By appropriate calibration, seed 25 can be visually discriminated by comparison to adjustable color or darkness/lightness thresholds programmed into the system.

In color sorter 36 (FIGS. 37A-C), two sides of the seeds can be illuminated as they fall in free space (two light sources are used, one above and one below the channels of falling seed). Two CCD imagers, one above and one below the channels, can be used to examine two sides of the seeds to more completely check for undesired seeds.

Referring back to FIG. 38 for illustration purposes, a controller-controlled deflecting ejector 366 is positioned downstream of imaging device 358. By coordination with imaging device 358, a ejection actuator 368 can operate ejector 366 to cause identified non-desired seed 25 to be physically deflected from conveyor 348 (see arrow 364 relative to seed 25D in FIG. 38). It is calibrated to take into account the time between detection of a bad seed and the time to fire the ejector based on known velocity of the seeds. Ejector 366 could be an air jet (one per channel) and ejection actuator 368 a source of pressurized air. The dwell time of the air jets would be adjustable. More dwell time would increase the probability of propelling a seed designated for discard out of the falling stream of seeds, but also risks ejecting seeds that are not designated to be ejected. Adjustments can be made based on empirical testing.

Alternatively, ejector 366 could be a pneumatic, hydraulic or electro-mechanically actuated arm or finger that would physically knock or push a ejected seed 25 from conveyor 348, as controlled by actuator 368.

Non-ejected seeds 25 would pass ejector 366 without deflection and be directed by conveyor 348 to device 36A, as shown in FIG. 1.

It is to be understood that color sorter 36A could take on many configurations. Color sorter 36 of FIGS. 37A-C and 39-45 uses gravity and seed chutes to send seeds moving down separate parallel paths and then into a free fall in those aligned paths. Light bars on both sides of the dropping seeds illuminate two sides of the sides. The CCD imager line scans and compares its pixel values to thresholds. Software recognizes what is probably a seed versus air. If a programmed threshold is exceeded, color sorter identifies which seed, and knowing its approximate velocity, operates an air jet (AJ3) at the appropriate time to deflect an undesired seed to discard. Other configurations and methodologies could also be used.

Selected (non-ejected) seeds fall into color sorter bucket 106 (FIGS. 37C and 41). As shown in FIGS. 37A, 37C, and 41, before they reach bucket 106 the seeds pass through counter 105. Counter 105 is a granular media sensor model GMC from Jacobson-Holtz Engineering, Perry, Iowa. It can provide controller 12 (via a mV signal) a reasonably accurate count (approx. +/−10%) of the number of seeds passing by. It provides count information for the batch being processed. The count is accurate enough to tell if there is enough seed in the processed sample to ship to meet a request. As a default, system 10 requires a minimum 500 seed threshold.

A variety of such counters are available off the shelf. One example measures the dielectric constant of a gap between two sensing electrodes. Depending on the presence and amount of seed between the electrodes, a dielectric constant is sensed compared to when no seed is in the gap. When some seed is detected, it is considered an "event". The change of dielectric constant can be calibrated based on the number of seeds by assigning a number of pulses to the sensed dielectric constant, and thus a total seed count for different samples can be derived automatically and quickly by comparing the number of pulses to the calibration. Photo-optical counters are another example.

Discard or "dirty" (ejected) seed separated by color sorter 36 fall into a "dirty" seed funnel 112. The position of swap valve 113 (FIGS. 41-44) determines if this collected "dirty" seed is sent via pneumatic transport tube 120 and line vac LV5 to trash cyclone 121 (see FIG. 15), or via transport tube 118 to bagging station 37. Swap valve actuator PN11 operates a slide plate 114 which has two openings 115A and B from which two tubular connectors extend, to which are attached air transport tubes 120 and 118. In a trash cyclone position, plate 114 is slid to a position that allows discard seed access to transport tube 120. In a bagging position, plate 114 is slid to a position that allows the discard seed into transport tube 118. This is selectable by the operator and under control of controller 12. One opening 118 in fixed plate 119 is in fluid communication with line vac LV5. Slide plate 114 is slidable by actuator PN11 to either align its opening 115A or 115B with opening 118 in fixed plate 119.

Note also that a diverter valve 116 is positioned just ahead of (upstream of) counter 105. Diverter valve actuator PN9 can be operated by controller 12 to block the pathway of "good" (non-ejected) seed from color sorter 36 and instead direct such seed into diverter drop tube 117, where it will fall into dirty seed funnel 112. This can occur if counter 115 indicates a seed count threshold has been exceeded. Such diverted, but otherwise "good" (not "dirty") seed will be handled with the discard or "dirty" seeds as previously described.

A slide gate 107 at the bottom of color sorter bucket 106 is controlled by actuator PN10 (under controller control) when controller 12 authorizes bucket 106 to be dumped. See FIGS. 37A, 37C, and 39.

Other characteristics of a seed 25 could also be remotely, non-destructively obtained in real time under controller control as the seed 25 is being conveyed in system 10. As shown in FIG. 1, a near infrared spectroscopy device 36D could be used not only to measure moisture, but a variety of other characteristics. See U.S. Pat. No. 5,991,025, to Wright, et al., incorporated by reference herein. Other examples are nuclear magnetic resonance (NMR), and Raman spectroscopy. Examples of characteristics that can be non-destructively sensed in essentially real time include but are not limited to oil content, protein content, moisture, color chemical properties, genetic make-up, width, length.

e. Bagger/Labeler

If the answer to boxes 88 or 90 of the program of FIG. 2 is "no", the process (FIG. 2B) loops to provide the seed count and determines moisture level (step 92) prior to automatically filling a bag (step 94) with the processed seed of desired characteristics.

Database 96 provides the necessary information to create the appropriate label (step 98) and/or the appropriate box and/or shipping label (step 100).

System 10 and its methods of operation removes a substantial amount, if not most, of the manual aspects of such seed handling and processing. It can represent up to a four-fold increase in samples processed each day while using much less labor. The invention overcomes disadvantages of the prior art by dramatically reducing the labor required and by allowing a continuous flow of seed samples through the process under the control of a controller linked to a PC-based user interface and database.

System 10 provides for a speedy processing of seed. System 10 allows for integration of several functions under automatic control. System 10 isolates seed, as needed, during the processing. It also reduces errors, particularly erroneous mixing between samples.

FIGS. 46-53 show a bagger station 37. Desired product from color sorter 36 is pneumatically conveyed via air transport tube 140 to bagging cyclone 141, and then drops into bagging product bucket 122 (FIGS. 49-51). Two measurements are taken in bucket 122.

Seed sample weight can be obtained (see device 36C in FIG. 1). Load cells 123 (Model RL1010, 15 Kg load cell, 2 mV/V, with 4 channel summing box 4LC100-SEE from Rice Lake Weighing Systems, Rice Lake, Wis.) support bucket 122 on the framework of bagger station 37. Load experienced by load cells 123 is translated into weight of the seed (weight of bucket 122 is subtracted) and is read by controller 12.

Moisture content is be measured by a controller-controlled device 124. A variety of methods could be used to obtain such a measurement remotely and non-destructively in essentially real time. One example is a photo-acoustic method, such as is well known. Another example is use of near infrared (NIR) spectroscopy, such as shown and described in co-owned issued U.S. Pat. No. 5,991,025 to Wright, et al.

Moisture probe 124 (FIG. 49) is a capacitive moisture probe, such as is known in the art and mounts through the back of bucket 122, extending into its interior so that it can extend into the seed that accumulates there. An interior bucket (see reference numeral 129 in FIG. 50) fills up first to get uniform volumes of seed from measurement to measurement. After interior bucket 129 is filled, additional seed spills out into bucket 122. Other such methods are possible.

By monitoring moisture of each sample accumulated at bagging station 37, system 10 can alert the operator on controller display 13 if a sample is too wet (e.g. above 13½% water by weight). If the moisture threshold is exceeded, the operator could remove the sample and dry it to an acceptable moisture level before packaging it for shipment.

System 10 does not automatically open the hinged bottom door 125 on bucket 122 (see FIG. 50) when it determines seed in bucket 122 is ready to bag. Rather, it sends a signal to the operator that the seed sample is accumulated in bucket 122 and ready to bag. The signal is a blinking light. Other types of signals are possible. System 10 waits for a response from the operator. The operator can acknowledge the signal, be prompted to have a bag or bags in place, and then affirmatively inform system 10 that the appropriate bag or bags is/are in place (e.g. by hitting a key or pushing a button (e.g. 22 mm illuminated push-button switch, model HW1L-M4F11Q-G-24V from IDEC Corporation of Sunnyvale, Calif.) or touch screen). Optionally, a microswitch could sense that a bag is in place and ready for filling. Controller 12 would then operate bagging product actuator PN12 after weight and moisture measurements are obtained and the product would fall by gravity through bagging funnel 126 and into a bag mounted to bag holder 127.

Several different sized bag holders 127 are mounted to bagging station 37 under funnel 126, to accommodate different sized bags, as shown.

Bagging station 37 also can bag seed or materials not selected in the processing cycle of system 10, the "dirty" material. Such material can be conveyed from other parts of system 10 pneumatically to dirty bagging cyclone 121 where it would accumulate in dirty bagging bucket 132. It can either be selectively pneumatically conveyed to another location (such as a dirty product dump 133—see FIG. 15) or actuator PN13 can be operated by controller 12 to open a bottom door 134 (FIG. 53) in bucket 132, and the dirty product would fall by gravity into dirty product funnel 135 and into a bag mounted to dirty product bag holder 136.

System 10 therefore allows decisions to be executed, such as where "dirty" seed is sent. It is many times desirable to save "dirty" seed, because it could contain acceptable seed which then would be available if the good sample is not enough or for warehousing for later use.

Also, it is possible to configure system 10 to add in one or more additional stations or functions prior to bagging of samples. As discussed earlier, for example, another air transport could be added to convey a sample to a non-destructive evaluator like disclosed in Wright et al. U.S. Pat. No. 5,991,025, or for other processing or measurements.

As shown in FIGS. 1 and 6, a label printer 42 (e.g. Model 105SE from Zebra, Vernon Hills, Ill.), controlled by PC 14, could print and apply a bar-coded label with desired information to bag 20A.

The information on label 22, and a corresponding database, could be in the form of Table 2.

TABLE 2

| Database field | Data |
|---|---|
| | Entries Table |
| Field 1 | search barcode: _____ |
| Field 2 | weight: _____ |
| Field 3 | moisture: _____ |
| Field 4 | seed count: _____ |
| Field 5 | sample too wet: _____ |
| Field 6 | box ID: _____ |
| Field 7 | shell time & date: _____ |
| Field 8 | duplicate sample: _____ |
| Field 9 | duplicate sequence number |
| Field 10 | dirty bag saved |
| Field 11 | contact e-mail |
| Field 12 | <user defined> (as many fields as needed) |
| | Box Table |
| Field 1 | Box ID |
| Field 2 | Box Full |
| Field 3 | sample count |
| Field 4 | ship weight |
| Field 5 | date shipped |
| Field 6 | <user defined> |

Other information, of course, can be contained in such database tables, including specific test plot identification and location, seed inventory number(s), experiment number(s), etc.

PC 14 can use a program to match up certain columns in its local database 37 with what is desired to be printed in label 22. For example, commercially available program Bar Tender from Seagull Scientific, Inc. of Bellevue, Wash. can be used for this purpose. It makes it easy to format the label relative the database. Therefore, other or different information could be printed on label 22, as desired. Normally, label 22 will always have a unique ID of the sample that can be correlated to the local and/or central database.

Label could be part bar code and part human readable. For example, it could contain special information such as warnings, that would be human readable. One example is that it could explicitly state that the contents of the package contain genetically modified seeds, which have to be handled carefully.

Labels for bags of "good" product and "dirty" product could differ.

Software of system 10 thus creates a label for each validated sample that arrives at and is ready for bagging. Printer 42 can also create a box label 45 for box, which would essentially be a packing label for box 44, listing by some identification, everything to be placed in box 44. Also, because weight of each sample is known (along with weight of the empty bags), system 10 can accumulate total weight for multiple packaged samples and alert the operator when a total weight threshold is reached (for example, certain air freight or overnight air express companies have a maximum weight limit per box (e.g. 70 lbs.).

As shown in the Figures, and described herein, system 10 presents a combination of apparatus that can receive ear corn 19, automatically process it, and discharge it into bags 20. Within system 10, components autonomously move the ear corn or seed corn from station to station. Additionally, system 10 instructs each station and the conveying components to perform their respective operations.

Overall, samples with approximately 2000 corn seeds take on the order of 40 seconds per sample through system 10.

Additionally, as illustrated at FIG. 1, one or more automatic message can be generated and sent (e.g. via an email server such as are known) by system 10 after processing of a sample. For example, PC 14 could use an application such as Microsoft Outlook and its MAPI function to automatically send emails to a designated person(s) notifying them of the date a certain sample had been processed and its count. Such persons thus are notified what to expect. The designated persons could be a key contact for the experiment, a customer/client of the plant breeder, or in-house personnel. System 10 can evaluate whether the sample meets a request from the central database. Other information or uses of the information about samples in system 10 of course are possible. Automatic facsimile, paging, or other notifications are possible.

F. Option, Alternatives, and Features

The included preferred embodiment is given by way of example only and not by way of limitation to the invention which is solely described by the claims herein. Variations obvious to one skill in the art will be included within the invention defined by the claims.

For example, system 10 could be configured to provide just one or just a couple of functions. Use of color sorting alone will decrease labor and increase throughput. Use of an NIR spectrometry alone as a discriminator, would allow quick and accurate sorting based on, for example, high oil content.

Or, some functions could be eliminated or combined. For example, sometimes the cleaning function may not be necessary. By way of another example, cleaning and color sorting might be combined in one station.

For example, with soybeans, no shelling is needed. With soybeans, a thresher is used instead of a sheller. The thresher used to receive plants and then separate the grain or seed from the straw. Cleaning could be performed with a spiral separator. Sorting might be done with an NMR device discriminating seeds based on oil content. Selected seeds could be placed into wells on trays instead of into bags.

Computer 14 and controller 12 might be combined into one station, device or processor.

The ability to automate all or part of the process can be combined with the automated labeling and bar code scanning processes to keep control of inventory and shipping.

Alternatives to bar codes on tags or labels could possibly be used. One example is radio frequency (rf) identification or tags, such as are commercially available. Any type of digitizable ID that can be machine read may be possible.

Cleaner 30 could be a vision sorter using machine vision to determine size and/or shape of individual seeds and accept or discard them based on programmed parameters. Machine vision could also perform the color sorting function. Other non-destructive techniques, like those mentioned earlier, could be used to discriminate between seeds on other bases, such as oil content, constituents, etc.

System 10 can include automatic dust collection. Using the ability to create vacuum, system 10 could vacuum up dust or lighter debris in system 10 and discharge it, or convey it to a discard bin for system 10.

System 10 could also be configured to run a clean out or unload cycle. System would run a conventional sequence of processes but without a sample to clean out lingering debris or seeds from system 10.

System 10 could optionally be used for any of its functions. For example, it could be used for a seed counter alone. Likewise, just for any of the other functions, or, for any combination of functions. For example, it could be used as a sheller/bagger, or a size sorter/bagger, or as a sheller/size sorter/color sorter.

Alternative conveyors could be used. Examples might include bucket conveyors or augers. Others are possible.

Optionally, sensors could be used at locations throughout system 10 to detect the presence of a sample and be used by controller 12 to process each sample, as opposed to using primarily timing to control conveyance and operations of each station on a sample.

System 10 could also be programmed to automatically adjust the settings of various stations based upon monitoring of what occurs with a sample at a first station, or based on information in the harvest tag. For example, if the time to shell a sample were measured at sheller 28, system 10 could be configured to change its timing for succeeding stations based on shelling time. If a relatively long shelling time is observed, system 10 would assume a relatively large sample quantity and perhaps lengthen the time allotted to operation of cleaner 30.

The concept of tracking individual sets of seed or samples of seed through system 10 can be used to maintain spatial separation of one set or sample of seed from other seeds. One can establish, by empirical testing, a timing regime wherein each set of seed has a certain amount of time in or at each station of system 10. Because the state of the control gates that control when seed can move in and out of each station is known, controller 12 can keep track of which gates have opened and closed at which part of system 10 for each set or sample, and thus system 10 via controller 12 essentially knows where each seed set or sample is at in system 10. Empirical testing for a given type and/or volume and/or characteristics of seed can reveal how much time is needed in each station for the set of seeds to be completely processed. Controller 12 can be programmed to give that amount of time, or perhaps a little more, for its relevant station, before letting the next set of seeds or sample to begin entry into that station. Thus, system 10 can be programmed in a timing regime in a manner which has shown to allow acceptable processing with clean out for each station until a succeeding sample is allowed to progress into that station. The amount of time should be minimized while maintaining sufficient time to ensure reliable completion of processing and clean out. Thus, even without position sensors, spatial separation of plural seed samples progressing through system 10 can be maintained.

What is claimed is:

1. A method of handling corn seed comprising:
   (a) validating the identity of a previously harvested ear corn sample;
   (b) shelling the ear corn sample into shelled corn seed;
   (c) autonomously sorting with a machine the shelled corn seed based on one or more characteristics automatically non-destructively sensed from the shelled corn seed by a sensor associated with the machine;
   (d) automatically conveying and maintaining with an apparatus controlled by a controller, in isolation from other seed, a selected sub-set of the sorted shelled corn seed while automatically maintaining with a computer an association of the sub-set of the sorted shelled corn with the identity of the validated ear corn sample; and
   (e) accumulating the isolated sub-set of sorted shelled corn seed for further use with the association of the isolated sub-set of sorted shelled corn with the identity of the validated ear corn sample.

2. The method of claim 1 wherein the autonomous sorting comprises color sorting the shelled corn based on pre-programmed criteria.

3. The method of claim 1 wherein the characteristics are selected from the set comprising weight, color, moisture, chemical properties, physical properties, and temperature.

4. The method of claim 1 wherein the sensing is by spectroscopy.

5. The method of claim 4 where the spectroscopy is near infrared spectroscopy.

6. The method of claim 1 further comprising cleaning the seed.

7. The method of claim 1 further comprising scalping the shelled corn prior to sorting.

8. The method of claim 1 further comprising sizing the shelled corn prior to sorting.

9. The method of claim 8 wherein the sizing is by size of the seed.

10. The method of claim 8 wherein the sizing is by shape of the seed.

11. The method of claim 1 further comprising counting the autonomously sorted shelled seed.

12. The method of claim 11 further comprising bagging a pre-determined quantity of the counted seed.

13. The method of claim 1 further comprising automatically controlling and tracking the conveyance of the corn during the process.

14. The method of claim 1 further comprising controlling the timing of conveyance of the seed.

15. The method of claim 1 further comprising cleaning the sample on a perforated sizing screen having perimeter dimensions and opposite sides, and dislodging material from the sizing screen by moving one of a surface and one of said opposite sides of the sizing screen relative to the other.

16. The method of claim 15 wherein said sizing screen is a substantially flat screen and said surface is flat and substantially corresponds in perimeter dimensions to the perimeter dimensions of the sizing screen.

17. A method of handling corn seed comprising:
(a) validating the identity of a previously harvested ear corn sample;
(b) shelling the ear corn sample into shelled corn seed;
(c) cleaning the shelled corn seed on a perforated sizing screen having perimeter dimensions and opposite sides, and dislodging material from the sizing screen by moving one of a surface and one of said opposite sides of the sizing screen relative to the other, wherein said sizing screen is a substantially flat screen and said surface is flat and substantially corresponds in perimeter dimensions to the perimeter dimensions of the sizing screen;
(c) autonomously sorting the shelled corn seed based on one or more characteristics automatically non-destructively sensed from the shelled corn seed;
(d) automatically conveying and maintaining, in isolation from other seed, a selected sub-set of the sorted shelled corn seed; and
(e) accumulating the isolated sub-set of sorted shelled corn seed for further use.

\* \* \* \* \*